US008465163B2

(12) United States Patent
Blank et al.

(10) Patent No.: US 8,465,163 B2
(45) Date of Patent: Jun. 18, 2013

(54) INTERIOR REARVIEW MIRROR SYSTEM

(71) Applicant: Donnelly Corporation, Holland, MI (US)

(72) Inventors: Rodney K. Blank, Zeeland, MI (US); Kenneth L. Schierbeek, Zeeland, MI (US); Niall R. Lynam, Holland, MI (US)

(73) Assignee: Donnelly Corporation, Holland, MI (US)

( * ) Notice: Subject to any disclaimer, the term of this patent is extended or adjusted under 35 U.S.C. 154(b) by 0 days.

(21) Appl. No.: 13/646,959

(22) Filed: Oct. 8, 2012

(65) Prior Publication Data

US 2013/0046444 A1 Feb. 21, 2013

Related U.S. Application Data

(63) Continuation of application No. 12/906,519, filed on Oct. 18, 2010, now Pat. No. 8,282,226, which is a continuation of application No. 12/766,160, filed on Apr. 23, 2010, now Pat. No. 7,815,326, which is a continuation of application No. 12/575,726, filed on Oct. 8, 2009, now Pat. No. 7,726,822, which is a continuation of application No. 12/370,043, filed on Feb. 12, 2009, now Pat. No. 7,600,878, which is a continuation of application No. 12/029,073, filed on Feb. 11, 2008, now Pat. No. 7,490,944, which is a continuation of application No. 11/305,637, filed on Dec. 16, 2005, now Pat. No. 7,329,013, which is a continuation-in-part of application No. 10/456,599, filed on Jun. 6, 2003, now Pat. No. 7,004,593, said application No. 12/906,519 is a continuation-in-part of application No. 11/226,628, filed on Sep. 14, 2005, now abandoned.

(60) Provisional application No. 60/636,931, filed on Dec. 17, 2004, provisional application No. 60/420,010, filed on Oct. 21, 2002, provisional application No. 60/398,240, filed on Jul. 24, 2002, provisional application No. 60/386,373, filed on Jun. 6, 2002, provisional application No. 60/692,113, filed on Jun. 20, 2005, provisional application No. 60/677,990, filed on May 5, 2005, provisional application No. 60/653,787, filed on Feb. 17, 2005, provisional application No. 60/642,227, filed on Jan. 7, 2005, provisional application No. 60/638,250, filed on Dec. 21, 2004, provisional application No. 60/624,091, filed on Nov. 1, 2004, provisional application No. 60/609,642, filed on Sep. 14, 2004.

(51) Int. Cl.
*G02B 7/182* (2006.01)

(52) U.S. Cl.
USPC .......................................................... 359/879

(58) Field of Classification Search
USPC .................... 359/871–879; 340/438; 250/239
See application file for complete search history.

(56) References Cited

U.S. PATENT DOCUMENTS

| | | | |
|---|---|---|---|
| 1,096,452 | A | 5/1914 | Perrin |
| 1,563,258 | A | 11/1925 | Cunningham |
| 2,069,368 | A | 2/1937 | Horinstein |
| 2,166,303 | A | 7/1939 | Hodny et al. |
| 2,263,382 | A | 11/1941 | Gotzinger |
| 2,414,223 | A | 1/1947 | DeVirgilis |
| 2,457,348 | A | 12/1948 | Chambers |
| 2,561,582 | A | 7/1951 | Marbel |
| 2,580,014 | A | 12/1951 | Gazda |
| 3,004,473 | A | 10/1961 | Arthur et al. |
| 3,075,430 | A | 1/1963 | Woodward et al. |
| 3,141,393 | A | 7/1964 | Platt |
| 3,152,216 | A | 10/1964 | Woodward |
| 3,162,008 | A | 12/1964 | Berger et al. |
| 3,185,020 | A | 5/1965 | Thelen |
| 3,266,016 | A | 8/1966 | Maruyama et al. |
| 3,280,701 | A | 10/1966 | Donnelly et al. |
| 3,432,225 | A | 3/1969 | Rock |
| 3,451,741 | A | 6/1969 | Manos |
| 3,453,038 | A | 7/1969 | Kissa et al. |
| 3,467,465 | A | 9/1969 | Van Noord |
| 3,473,867 | A | 10/1969 | Byrnes |
| 3,480,781 | A | 11/1969 | Mandalakas |
| 3,499,112 | A | 3/1970 | Heilmeier et al. |

| | | | | | |
|---|---|---|---|---|---|
| 3,499,702 A | 3/1970 | Goldmacher et al. | 4,538,063 A | 8/1985 | Bulat |
| 3,521,941 A | 7/1970 | Deb et al. | 4,546,551 A | 10/1985 | Franks |
| 3,543,018 A | 11/1970 | Barcus et al. | 4,555,694 A | 11/1985 | Yanagishima et al. |
| 3,557,265 A | 1/1971 | Chisholm et al. | 4,561,625 A | 12/1985 | Weaver |
| 3,565,985 A | 2/1971 | Schrenk et al. | 4,572,619 A | 2/1986 | Reininger et al. |
| 3,612,654 A | 10/1971 | Klein | 4,580,196 A | 4/1986 | Task |
| 3,614,210 A | 10/1971 | Caplan | 4,580,875 A | 4/1986 | Bechtel et al. |
| 3,628,851 A | 12/1971 | Robertson | 4,581,827 A | 4/1986 | Higashi |
| 3,676,668 A | 7/1972 | Collins et al. | 4,588,267 A | 5/1986 | Pastore |
| 3,680,951 A | 8/1972 | Jordan et al. | 4,603,946 A | 8/1986 | Kato et al. |
| 3,689,695 A | 9/1972 | Rosenfield et al. | 4,623,222 A | 11/1986 | Itoh et al. |
| 3,711,176 A | 1/1973 | Alfrey, Jr. et al. | 4,625,210 A | 11/1986 | Sagl |
| 3,712,710 A | 1/1973 | Castellion et al. | 4,626,850 A | 12/1986 | Chey |
| 3,748,017 A | 7/1973 | Yamamura et al. | 4,630,040 A | 12/1986 | Haertling |
| 3,781,090 A | 12/1973 | Sumita | 4,630,109 A | 12/1986 | Barton |
| 3,806,229 A | 4/1974 | Schoot et al. | 4,630,904 A | 12/1986 | Pastore |
| 3,807,832 A | 4/1974 | Castellion | 4,634,835 A | 1/1987 | Suzuki |
| 3,807,833 A | 4/1974 | Graham et al. | 4,635,033 A | 1/1987 | Inukai et al. |
| 3,821,590 A | 6/1974 | Kosman et al. | 4,636,782 A | 1/1987 | Nakamura et al. |
| 3,837,129 A | 9/1974 | Losell | 4,638,287 A | 1/1987 | Umebayashi et al. |
| 3,860,847 A | 1/1975 | Carley | 4,646,210 A | 2/1987 | Skogler et al. |
| 3,862,798 A | 1/1975 | Hopkins | 4,652,090 A | 3/1987 | Uchikawa et al. |
| 3,870,404 A | 3/1975 | Wilson et al. | 4,655,549 A | 4/1987 | Suzuki et al. |
| 3,876,287 A | 4/1975 | Sprokel | 4,664,479 A | 5/1987 | Hiroshi |
| 3,932,024 A | 1/1976 | Yaguchi et al. | 4,665,311 A | 5/1987 | Cole |
| 3,940,822 A | 3/1976 | Emerick et al. | 4,665,430 A | 5/1987 | Hiroyasu |
| 3,956,017 A | 5/1976 | Shigemasa | 4,669,827 A | 6/1987 | Fukada et al. |
| 3,978,190 A | 8/1976 | Kurz, Jr. et al. | 4,671,615 A | 6/1987 | Fukada et al. |
| 3,985,424 A | 10/1976 | Steinacher | 4,671,619 A | 6/1987 | Kamimori et al. |
| 4,006,546 A | 2/1977 | Anderson et al. | 4,678,281 A | 7/1987 | Bauer |
| 4,035,681 A | 7/1977 | Savage | 4,679,906 A | 7/1987 | Brandenburg |
| 4,040,727 A | 8/1977 | Ketchpel | 4,682,083 A | 7/1987 | Alley |
| 4,052,712 A | 10/1977 | Ohama et al. | 4,692,798 A | 9/1987 | Seko et al. |
| 4,075,468 A | 2/1978 | Marcus | 4,694,295 A | 9/1987 | Miller et al. |
| 4,088,400 A | 5/1978 | Assouline et al. | 4,697,883 A | 10/1987 | Suzuki et al. |
| 4,093,364 A | 6/1978 | Miller | 4,701,022 A | 10/1987 | Jacob |
| 4,097,131 A | 6/1978 | Nishiyama | 4,702,566 A | 10/1987 | Tukude et al. |
| 4,109,235 A | 8/1978 | Bouthors | 4,704,740 A | 11/1987 | McKee et al. |
| 4,139,234 A | 2/1979 | Morgan | 4,711,544 A | 12/1987 | Iino et al. |
| 4,159,866 A | 7/1979 | Wunsch et al. | 4,712,879 A | 12/1987 | Lynam et al. |
| 4,161,653 A | 7/1979 | Bedini et al. | 4,713,685 A | 12/1987 | Nishimura et al. |
| 4,171,875 A | 10/1979 | Taylor et al. | RE32,576 E | 1/1988 | Pastore |
| 4,174,152 A | 11/1979 | Giglia et al. | 4,718,756 A | 1/1988 | Lancaster |
| 4,200,361 A | 4/1980 | Malvano et al. | 4,721,364 A | 1/1988 | Itoh et al. |
| 4,202,607 A | 5/1980 | Washizuka et al. | 4,729,068 A | 3/1988 | Ohe |
| 4,211,955 A | 7/1980 | Ray | 4,729,076 A | 3/1988 | Masami et al. |
| 4,214,266 A | 7/1980 | Myers | 4,731,669 A | 3/1988 | Hayashi et al. |
| 4,219,760 A | 8/1980 | Ferro | 4,733,335 A | 3/1988 | Serizawa et al. |
| 4,221,955 A | 9/1980 | Joslyn | 4,733,336 A | 3/1988 | Skogler et al. |
| 4,228,490 A | 10/1980 | Thillays | 4,740,838 A | 4/1988 | Mase et al. |
| 4,247,870 A | 1/1981 | Gabel et al. | 4,761,061 A | 8/1988 | Nishiyama et al. |
| 4,257,703 A | 3/1981 | Goodrich | 4,773,740 A | 9/1988 | Kawakami et al. |
| 4,274,078 A | 6/1981 | Isobe et al. | 4,780,752 A | 10/1988 | Angerstein et al. |
| 4,277,804 A | 7/1981 | Robison | 4,781,436 A | 11/1988 | Armbruster |
| 4,281,899 A | 8/1981 | Oskam | 4,789,774 A | 12/1988 | Koch et al. |
| 4,288,814 A | 9/1981 | Talley et al. | 4,789,904 A | 12/1988 | Peterson |
| RE30,835 E | 12/1981 | Giglia | 4,793,690 A | 12/1988 | Gahan et al. |
| 4,306,768 A | 12/1981 | Egging | 4,793,695 A | 12/1988 | Wada et al. |
| 4,310,851 A | 1/1982 | Pierrat | 4,794,261 A | 12/1988 | Rosen |
| 4,331,382 A | 5/1982 | Graff | D299,491 S | 1/1989 | Masuda |
| 4,338,000 A | 7/1982 | Kamimori et al. | 4,799,768 A | 1/1989 | Gahan |
| 4,377,613 A | 3/1983 | Gordon | 4,803,599 A | 2/1989 | Trine et al. |
| 4,398,805 A | 8/1983 | Cole | 4,807,096 A | 2/1989 | Skogler et al. |
| 4,419,386 A | 12/1983 | Gordon | 4,820,933 A | 4/1989 | Hong et al. |
| 4,420,238 A | 12/1983 | Felix | 4,825,232 A | 4/1989 | Howdle |
| 4,425,717 A | 1/1984 | Marcus | 4,826,289 A | 5/1989 | Vandenbrink et al. |
| 4,435,042 A | 3/1984 | Wood et al. | 4,827,086 A | 5/1989 | Rockwell |
| 4,435,048 A | 3/1984 | Kamimori et al. | 4,837,551 A | 6/1989 | Iino |
| 4,436,371 A | 3/1984 | Wood et al. | 4,842,378 A | 6/1989 | Flasck et al. |
| 4,438,348 A | 3/1984 | Casper et al. | 4,845,402 A | 7/1989 | Smith |
| 4,443,057 A | 4/1984 | Bauer et al. | 4,847,772 A | 7/1989 | Michalopoulos et al. |
| 4,446,171 A | 5/1984 | Thomas | 4,855,161 A | 8/1989 | Moser et al. |
| 4,465,339 A | 8/1984 | Baucke et al. | 4,855,550 A | 8/1989 | Schultz, Jr. |
| 4,473,695 A | 9/1984 | Wrighton et al. | 4,859,813 A | 8/1989 | Rockwell |
| 4,490,227 A | 12/1984 | Bitter | 4,859,867 A | 8/1989 | Larson et al. |
| 4,491,390 A | 1/1985 | Tong-Shen | 4,860,171 A | 8/1989 | Kojima |
| 4,499,451 A | 2/1985 | Suzuki et al. | 4,862,594 A | 9/1989 | Schierbeek et al. |
| 4,521,079 A | 6/1985 | Leenhouts et al. | 4,871,917 A | 10/1989 | O'Farrell et al. |
| 4,524,941 A | 6/1985 | Wood et al. | 4,872,051 A | 10/1989 | Dye |

| Patent No. | Date | Name |
|---|---|---|
| 4,882,466 A | 11/1989 | Friel |
| 4,882,565 A | 11/1989 | Gallmeyer |
| 4,883,349 A | 11/1989 | Mittelhäuser |
| 4,884,135 A | 11/1989 | Schiffman |
| 4,886,960 A | 12/1989 | Molyneux et al. |
| 4,889,412 A | 12/1989 | Clerc et al. |
| 4,891,828 A | 1/1990 | Kawazoe |
| 4,892,345 A | 1/1990 | Rachael, III |
| 4,902,103 A | 2/1990 | Miyake et al. |
| 4,902,108 A | 2/1990 | Byker |
| 4,906,085 A | 3/1990 | Sugihara et al. |
| 4,909,606 A | 3/1990 | Wada et al. |
| 4,910,591 A | 3/1990 | Petrossian et al. |
| 4,916,374 A | 4/1990 | Schierbeek et al. |
| 4,917,477 A | 4/1990 | Bechtel et al. |
| 4,926,170 A | 5/1990 | Beggs et al. |
| 4,930,742 A | 6/1990 | Schofield et al. |
| 4,933,814 A | 6/1990 | Sanai |
| 4,935,665 A | 6/1990 | Murata |
| 4,936,533 A | 6/1990 | Adams et al. |
| 4,937,796 A | 6/1990 | Tendler |
| 4,937,945 A | 7/1990 | Schofield et al. |
| 4,943,796 A | 7/1990 | Lee |
| 4,948,242 A | 8/1990 | Desmond et al. |
| 4,953,305 A | 9/1990 | Van Lente et al. |
| 4,956,591 A | 9/1990 | Schierbeek et al. |
| 4,957,349 A | 9/1990 | Clerc et al. |
| 4,959,247 A | 9/1990 | Moser et al. |
| 4,959,865 A | 9/1990 | Stettiner et al. |
| 4,970,653 A | 11/1990 | Kenue |
| 4,973,844 A | 11/1990 | O'Farrell et al. |
| 4,974,122 A | 11/1990 | Shaw |
| 4,978,196 A | 12/1990 | Suzuki et al. |
| 4,983,951 A | 1/1991 | Igarashi et al. |
| 4,985,809 A | 1/1991 | Matsui et al. |
| 4,987,357 A | 1/1991 | Masaki |
| 4,989,956 A | 2/1991 | Wu et al. |
| 4,996,083 A | 2/1991 | Moser et al. |
| 5,001,386 A | 3/1991 | Sullivan et al. |
| 5,001,558 A | 3/1991 | Burley et al. |
| 5,005,213 A | 4/1991 | Hanson et al. |
| 5,006,971 A | 4/1991 | Jenkins |
| 5,014,167 A | 5/1991 | Roberts |
| 5,016,988 A | 5/1991 | Iimura |
| 5,016,996 A | 5/1991 | Ueno |
| 5,017,903 A | 5/1991 | Krippelz, Sr. |
| 5,018,839 A | 5/1991 | Yamamoto et al. |
| 5,027,200 A | 6/1991 | Petrossian et al. |
| 5,037,182 A | 8/1991 | Groves et al. |
| 5,038,255 A | 8/1991 | Nishihashi et al. |
| 5,052,163 A | 10/1991 | Czekala |
| 5,056,899 A | 10/1991 | Warszawski |
| 5,057,974 A | 10/1991 | Mizobe |
| 5,058,851 A | 10/1991 | Lawlor et al. |
| 5,059,015 A | 10/1991 | Tran |
| 5,066,108 A | 11/1991 | McDonald |
| 5,066,112 A | 11/1991 | Lynam et al. |
| 5,069,535 A | 12/1991 | Baucke et al. |
| 5,070,323 A | 12/1991 | Iino et al. |
| 5,073,012 A | 12/1991 | Lynam |
| 5,076,673 A | 12/1991 | Lynam et al. |
| 5,076,674 A | 12/1991 | Lynam |
| 5,078,480 A | 1/1992 | Warszawski |
| 5,096,287 A | 3/1992 | Kakinami et al. |
| 5,100,095 A | 3/1992 | Haan et al. |
| 5,101,139 A | 3/1992 | Lechter |
| 5,105,127 A | 4/1992 | Lavaud et al. |
| 5,115,346 A | 5/1992 | Lynam |
| 5,119,220 A | 6/1992 | Narita et al. |
| 5,121,200 A | 6/1992 | Choi |
| 5,122,619 A | 6/1992 | Dlubak |
| 5,123,077 A | 6/1992 | Endo et al. |
| 5,124,845 A | 6/1992 | Shimojo |
| 5,124,890 A | 6/1992 | Choi et al. |
| 5,128,799 A | 7/1992 | Byker |
| 5,130,898 A | 7/1992 | Akahane |
| 5,131,154 A | 7/1992 | Schierbeek et al. |
| 5,134,507 A | 7/1992 | Ishii |
| 5,134,549 A | 7/1992 | Yokoyama |
| 5,135,298 A | 8/1992 | Feltman |
| 5,136,483 A | 8/1992 | Schöniger et al. |
| 5,140,455 A | 8/1992 | Varaprasad et al. |
| 5,140,465 A | 8/1992 | Yasui et al. |
| 5,142,407 A | 8/1992 | Varaprasad et al. |
| 5,145,609 A | 9/1992 | Varaprasad et al. |
| 5,148,306 A | 9/1992 | Yamada et al. |
| 5,150,232 A | 9/1992 | Gunkima et al. |
| 5,151,816 A | 9/1992 | Varaprasad et al. |
| 5,151,824 A | 9/1992 | O'Farrell |
| 5,154,617 A | 10/1992 | Suman et al. |
| 5,158,638 A | 10/1992 | Osanami et al. |
| 5,160,200 A | 11/1992 | Cheselske |
| 5,160,201 A | 11/1992 | Wrobel |
| 5,166,815 A | 11/1992 | Elderfield |
| 5,168,378 A | 12/1992 | Black et al. |
| 5,173,881 A | 12/1992 | Sindle |
| 5,177,031 A | 1/1993 | Buchmann et al. |
| 5,178,448 A | 1/1993 | Adams et al. |
| 5,179,471 A | 1/1993 | Caskey et al. |
| 5,183,099 A | 2/1993 | Bechu |
| 5,184,956 A | 2/1993 | Langlais et al. |
| 5,189,537 A | 2/1993 | O'Farrell |
| 5,193,029 A | 3/1993 | Schofield et al. |
| 5,197,562 A | 3/1993 | Kakinami et al. |
| 5,202,950 A | 4/1993 | Arego et al. |
| 5,207,492 A | 5/1993 | Roberts |
| 5,210,967 A | 5/1993 | Brown |
| 5,212,819 A | 5/1993 | Wada |
| 5,214,408 A | 5/1993 | Asayama |
| 5,217,794 A | 6/1993 | Schrenk |
| 5,223,814 A | 6/1993 | Suman |
| 5,223,844 A | 6/1993 | Mansell et al. |
| 5,229,975 A | 7/1993 | Truesdell et al. |
| 5,230,400 A | 7/1993 | Kakinami et al. |
| 5,233,461 A | 8/1993 | Dornan et al. |
| 5,235,316 A | 8/1993 | Qualizza |
| 5,239,405 A | 8/1993 | Varaprasad et al. |
| 5,239,406 A | 8/1993 | Lynam |
| 5,243,417 A | 9/1993 | Pollard |
| 5,245,422 A | 9/1993 | Borcherts et al. |
| 5,252,354 A | 10/1993 | Cronin et al. |
| 5,253,109 A | 10/1993 | O'Farrell et al. |
| 5,255,442 A | 10/1993 | Schierbeek et al. |
| 5,260,626 A | 11/1993 | Takase et al. |
| 5,277,986 A | 1/1994 | Cronin et al. |
| 5,280,555 A | 1/1994 | Ainsburg |
| 5,285,060 A | 2/1994 | Larson et al. |
| 5,289,321 A | 2/1994 | Secor |
| 5,296,924 A | 3/1994 | de Saint Blancard et al. |
| 5,303,075 A | 4/1994 | Wada et al. |
| 5,303,205 A | 4/1994 | Gauthier et al. |
| 5,304,980 A | 4/1994 | Maekawa |
| 5,305,012 A | 4/1994 | Faris |
| 5,307,136 A | 4/1994 | Saneyoshi |
| 5,313,335 A | 5/1994 | Gray et al. |
| 5,325,096 A | 6/1994 | Pakett |
| 5,325,386 A | 6/1994 | Jewell et al. |
| 5,327,288 A | 7/1994 | Wellington et al. |
| 5,330,149 A | 7/1994 | Haan et al. |
| 5,331,312 A | 7/1994 | Kudoh |
| 5,331,358 A | 7/1994 | Schurle et al. |
| 5,339,075 A | 8/1994 | Abst et al. |
| 5,339,529 A | 8/1994 | Lindberg |
| 5,341,437 A | 8/1994 | Nakayama |
| D351,370 S | 10/1994 | Lawlor et al. |
| 5,354,965 A | 10/1994 | Lee |
| 5,355,118 A | 10/1994 | Fukuhara |
| 5,355,245 A | 10/1994 | Lynam |
| 5,355,284 A | 10/1994 | Roberts |
| 5,361,190 A | 11/1994 | Roberts et al. |
| 5,363,294 A | 11/1994 | Yamamoto et al. |
| 5,371,659 A | 12/1994 | Pastrick et al. |
| 5,373,482 A | 12/1994 | Gauthier |
| 5,379,146 A | 1/1995 | Defendini |
| 5,386,285 A | 1/1995 | Asayama |
| 5,386,306 A | 1/1995 | Gunjima et al. |
| 5,400,158 A | 3/1995 | Ohnishi et al. |
| 5,402,103 A | 3/1995 | Tashiro |

| | | | | | | |
|---|---|---|---|---|---|---|
| 5,406,395 A | 4/1995 | Wilson et al. | | 5,594,222 A | 1/1997 | Caldwell |
| 5,406,414 A | 4/1995 | O'Farrell et al. | | 5,594,560 A | 1/1997 | Jelley et al. |
| 5,408,353 A | 4/1995 | Nichols et al. | | 5,594,615 A | 1/1997 | Spijkerman et al. |
| 5,408,357 A | 4/1995 | Beukema | | 5,602,542 A | 2/1997 | Widmann |
| 5,410,346 A | 4/1995 | Saneyoshi et al. | | 5,602,670 A | 2/1997 | Keegan |
| 5,414,439 A | 5/1995 | Groves et al. | | 5,603,104 A | 2/1997 | Phelps, III et al. |
| 5,414,461 A | 5/1995 | Kishi et al. | | 5,608,550 A | 3/1997 | Epstein et al. |
| 5,416,313 A | 5/1995 | Larson et al. | | 5,609,652 A | 3/1997 | Yamada et al. |
| 5,416,478 A | 5/1995 | Morinaga | | 5,610,380 A | 3/1997 | Nicolaisen |
| 5,418,610 A | 5/1995 | Fischer | | 5,610,756 A | 3/1997 | Lynam et al. |
| 5,422,756 A | 6/1995 | Weber | | 5,611,966 A | 3/1997 | Varaprasad et al. |
| 5,424,726 A | 6/1995 | Beymer | | 5,614,885 A | 3/1997 | Van Lente et al. |
| 5,424,865 A | 6/1995 | Lynam | | 5,615,023 A | 3/1997 | Yang |
| 5,424,952 A | 6/1995 | Asayama | | 5,615,857 A | 4/1997 | Hook |
| 5,426,524 A | 6/1995 | Wada et al. | | 5,617,085 A | 4/1997 | Tsutsumi et al. |
| 5,426,723 A | 6/1995 | Horsley | | 5,619,374 A | 4/1997 | Roberts |
| 5,430,431 A | 7/1995 | Nelson | | 5,619,375 A | 4/1997 | Roberts |
| 5,432,496 A | 7/1995 | Lin | | 5,621,571 A | 4/1997 | Bantli et al. |
| 5,432,626 A | 7/1995 | Sasuga et al. | | 5,626,800 A | 5/1997 | Williams et al. |
| 5,436,741 A | 7/1995 | Crandall | | 5,631,089 A | 5/1997 | Center, Jr. et al. |
| 5,437,931 A | 8/1995 | Tsai et al. | | 5,631,638 A | 5/1997 | Kaspar et al. |
| 5,439,305 A | 8/1995 | Santo | | 5,631,639 A | 5/1997 | Hibino et al. |
| 5,444,478 A | 8/1995 | Lelong et al. | | 5,632,092 A | 5/1997 | Blank et al. |
| 5,446,576 A | 8/1995 | Lynam et al. | | 5,632,551 A | 5/1997 | Roney et al. |
| 5,455,716 A | 10/1995 | Suman et al. | | 5,634,709 A | 6/1997 | Iwama |
| 5,461,361 A | 10/1995 | Moore | | 5,640,216 A | 6/1997 | Hasegawa et al. |
| D363,920 S | 11/1995 | Roberts et al. | | 5,642,238 A | 6/1997 | Sala |
| 5,469,187 A | 11/1995 | Yaniv | | 5,644,851 A | 7/1997 | Blank et al. |
| 5,469,298 A | 11/1995 | Suman et al. | | 5,646,614 A | 7/1997 | Abersfelder et al. |
| 5,475,366 A | 12/1995 | Van Lente et al. | | 5,649,756 A | 7/1997 | Adams et al. |
| 5,475,494 A | 12/1995 | Nishida et al. | | 5,649,758 A | 7/1997 | Dion |
| 5,481,409 A | 1/1996 | Roberts | | 5,650,765 A | 7/1997 | Park |
| 5,483,453 A | 1/1996 | Uemura et al. | | 5,650,929 A | 7/1997 | Potter et al. |
| 5,485,161 A | 1/1996 | Vaughn | | 5,661,455 A | 8/1997 | Van Lente et al. |
| 5,485,378 A | 1/1996 | Franke et al. | | 5,661,651 A | 8/1997 | Geschke et al. |
| 5,487,522 A | 1/1996 | Hook | | 5,661,804 A | 8/1997 | Dykema et al. |
| 5,488,496 A | 1/1996 | Pine | | 5,662,375 A | 9/1997 | Adams et al. |
| 5,497,305 A | 3/1996 | Pastrick et al. | | 5,666,157 A | 9/1997 | Aviv |
| 5,497,306 A | 3/1996 | Pastrick | | 5,667,289 A | 9/1997 | Akahane et al. |
| 5,500,760 A | 3/1996 | Varaprasad et al. | | 5,668,663 A | 9/1997 | Varaprasad et al. |
| 5,506,701 A | 4/1996 | Ichikawa | | 5,668,675 A | 9/1997 | Fredricks |
| 5,509,606 A | 4/1996 | Breithaupt et al. | | 5,669,698 A | 9/1997 | Veldman et al. |
| 5,510,983 A | 4/1996 | Iino | | 5,669,699 A | 9/1997 | Pastrick et al. |
| 5,515,448 A | 5/1996 | Nishitani | | 5,669,704 A | 9/1997 | Pastrick |
| 5,519,621 A | 5/1996 | Wortham | | 5,669,705 A | 9/1997 | Pastrick et al. |
| 5,521,744 A | 5/1996 | Mazurek | | 5,670,935 A | 9/1997 | Schofield et al. |
| 5,521,760 A | 5/1996 | DeYoung et al. | | 5,671,996 A | 9/1997 | Bos et al. |
| 5,523,811 A | 6/1996 | Wada et al. | | 5,673,994 A | 10/1997 | Fant, Jr. et al. |
| 5,523,877 A | 6/1996 | Lynam | | 5,673,999 A | 10/1997 | Koenck |
| 5,525,264 A | 6/1996 | Cronin et al. | | 5,677,598 A | 10/1997 | De Hair et al. |
| 5,525,977 A | 6/1996 | Suman | | 5,679,283 A | 10/1997 | Tonar et al. |
| 5,528,422 A | 6/1996 | Roberts | | 5,680,123 A | 10/1997 | Lee |
| 5,528,474 A | 6/1996 | Roney et al. | | 5,680,245 A | 10/1997 | Lynam |
| 5,529,138 A | 6/1996 | Shaw et al. | | 5,680,263 A | 10/1997 | Zimmermann et al. |
| 5,530,240 A | 6/1996 | Larson et al. | | 5,686,975 A | 11/1997 | Lipton |
| 5,530,420 A | 6/1996 | Tsuchiya et al. | | 5,686,979 A | 11/1997 | Weber et al. |
| 5,530,421 A | 6/1996 | Marshall et al. | | 5,689,241 A | 11/1997 | Clarke, Sr. et al. |
| 5,535,056 A | 7/1996 | Caskey et al. | | 5,689,370 A | 11/1997 | Tonar et al. |
| 5,535,144 A | 7/1996 | Kise | | 5,691,848 A | 11/1997 | Van Lente et al. |
| 5,539,397 A | 7/1996 | Asanuma et al. | | 5,692,819 A | 12/1997 | Mitsutake et al. |
| 5,541,590 A | 7/1996 | Nishio | | 5,696,529 A | 12/1997 | Evanicky et al. |
| 5,550,677 A | 8/1996 | Schofield et al. | | 5,696,567 A | 12/1997 | Wada et al. |
| 5,555,172 A | 9/1996 | Potter | | 5,699,044 A | 12/1997 | Van Lente et al. |
| 5,561,333 A | 10/1996 | Darius | | 5,699,188 A | 12/1997 | Gilbert et al. |
| 5,566,224 A | 10/1996 | ul Azam et al. | | 5,703,568 A | 12/1997 | Hegyi |
| 5,567,360 A | 10/1996 | Varaprasad et al. | | 5,708,410 A | 1/1998 | Blank et al. |
| 5,568,316 A | 10/1996 | Schrenk et al. | | 5,708,415 A | 1/1998 | Van Lente et al. |
| 5,570,127 A | 10/1996 | Schmidt | | 5,708,857 A | 1/1998 | Ishibashi |
| 5,572,354 A | 11/1996 | Desmond et al. | | 5,715,093 A | 2/1998 | Schierbeek et al. |
| 5,574,426 A | 11/1996 | Shisgal et al. | | 5,724,187 A | 3/1998 | Varaprasad et al. |
| 5,574,443 A | 11/1996 | Hsieh | | 5,724,316 A | 3/1998 | Brunts |
| 5,575,552 A | 11/1996 | Faloon et al. | | 5,729,194 A | 3/1998 | Spears et al. |
| 5,576,687 A | 11/1996 | Blank et al. | | 5,737,226 A | 4/1998 | Olson et al. |
| 5,576,854 A | 11/1996 | Schmidt et al. | | 5,741,966 A | 4/1998 | Handfield et al. |
| 5,576,975 A | 11/1996 | Sasaki et al. | | 5,744,227 A | 4/1998 | Bright et al. |
| 5,578,404 A | 11/1996 | Kliem | | 5,745,050 A | 4/1998 | Nakagawa |
| 5,587,236 A | 12/1996 | Agrawal et al. | | 5,745,266 A | 4/1998 | Smith |
| 5,587,699 A | 12/1996 | Faloon et al. | | 5,748,172 A | 5/1998 | Song et al. |
| 5,593,221 A | 1/1997 | Evanicky et al. | | 5,748,287 A | 5/1998 | Takahashi et al. |

| Patent | Date | Name |
|---|---|---|
| 5,751,211 A | 5/1998 | Shirai et al. |
| 5,751,246 A | 5/1998 | Hertel |
| 5,751,390 A | 5/1998 | Crawford et al. |
| 5,751,489 A | 5/1998 | Caskey et al. |
| 5,754,099 A | 5/1998 | Nishimura et al. |
| D394,833 S | 6/1998 | Muth |
| 5,760,828 A | 6/1998 | Cortes |
| 5,760,931 A | 6/1998 | Saburi et al. |
| 5,760,962 A | 6/1998 | Schofield et al. |
| 5,761,094 A | 6/1998 | Olson et al. |
| 5,762,823 A | 6/1998 | Hikmet |
| 5,764,139 A | 6/1998 | Nojima et al. |
| 5,765,940 A | 6/1998 | Levy et al. |
| 5,767,793 A | 6/1998 | Agravante et al. |
| 5,768,020 A | 6/1998 | Nagao |
| 5,775,762 A | 7/1998 | Vitito |
| 5,777,779 A | 7/1998 | Hashimoto et al. |
| 5,780,160 A | 7/1998 | Allemand et al. |
| 5,786,772 A | 7/1998 | Schofield et al. |
| 5,788,357 A | 8/1998 | Muth et al. |
| 5,790,298 A | 8/1998 | Tonar |
| 5,790,502 A | 8/1998 | Horinouchi et al. |
| 5,790,973 A | 8/1998 | Blaker et al. |
| 5,793,308 A | 8/1998 | Rosinski et al. |
| 5,793,420 A | 8/1998 | Schmidt |
| 5,796,094 A | 8/1998 | Schofield et al. |
| 5,796,176 A | 8/1998 | Kramer et al. |
| 5,798,057 A | 8/1998 | Hikmet |
| 5,798,575 A | 8/1998 | O'Farrell et al. |
| 5,798,688 A | 8/1998 | Schofield |
| 5,800,918 A | 9/1998 | Chartier et al. |
| 5,802,727 A | 9/1998 | Blank et al. |
| 5,803,579 A | 9/1998 | Turnbull et al. |
| 5,805,330 A | 9/1998 | Byker et al. |
| 5,805,367 A | 9/1998 | Kanazawa |
| 5,806,879 A | 9/1998 | Hamada et al. |
| 5,806,965 A | 9/1998 | Deese |
| 5,808,197 A | 9/1998 | Dao |
| 5,808,566 A | 9/1998 | Behr et al. |
| 5,808,589 A | 9/1998 | Fergason |
| 5,808,713 A | 9/1998 | Broer et al. |
| 5,808,777 A | 9/1998 | Lynam et al. |
| 5,808,778 A | 9/1998 | Bauer et al. |
| 5,812,321 A | 9/1998 | Schierbeek et al. |
| 5,813,745 A | 9/1998 | Fant, Jr. et al. |
| 5,818,625 A | 10/1998 | Forgette et al. |
| 5,820,097 A | 10/1998 | Spooner |
| 5,820,245 A | 10/1998 | Desmond et al. |
| 5,822,023 A | 10/1998 | Suman et al. |
| 5,823,654 A | 10/1998 | Pastrick et al. |
| 5,825,527 A | 10/1998 | Forgette et al. |
| 5,835,166 A | 11/1998 | Hall et al. |
| 5,837,994 A | 11/1998 | Stam et al. |
| 5,844,505 A | 12/1998 | Van Ryzin |
| 5,848,373 A | 12/1998 | DeLorme et al. |
| 5,850,176 A | 12/1998 | Kinoshita et al. |
| 5,850,205 A | 12/1998 | Blouin |
| 5,863,116 A | 1/1999 | Pastrick et al. |
| 5,864,419 A | 1/1999 | Lynam |
| 5,867,801 A | 2/1999 | Denny |
| 5,871,275 A | 2/1999 | O'Farrell et al. |
| 5,871,843 A | 2/1999 | Yoneda et al. |
| 5,877,707 A | 3/1999 | Kowalick |
| 5,877,897 A | 3/1999 | Schofield et al. |
| 5,878,353 A | 3/1999 | ul Azam et al. |
| 5,878,370 A | 3/1999 | Olson |
| 5,879,074 A | 3/1999 | Pastrick |
| 5,883,605 A | 3/1999 | Knapp |
| 5,883,739 A | 3/1999 | Ashihara et al. |
| 5,888,431 A | 3/1999 | Tonar et al. |
| 5,894,196 A | 4/1999 | McDermott |
| D409,540 S | 5/1999 | Muth |
| 5,899,551 A | 5/1999 | Neijzen et al. |
| 5,899,956 A | 5/1999 | Chan |
| 5,904,729 A | 5/1999 | Ruzicka |
| 5,910,854 A | 6/1999 | Varaprasad et al. |
| 5,914,815 A | 6/1999 | Bos |
| 5,917,664 A | 6/1999 | O'Neill et al. |
| 5,918,180 A | 6/1999 | Dimino |
| 5,922,176 A | 7/1999 | Caskey |
| 5,923,027 A | 7/1999 | Stam et al. |
| 5,923,457 A | 7/1999 | Byker et al. |
| 5,924,212 A | 7/1999 | Domanski |
| 5,926,087 A | 7/1999 | Busch et al. |
| 5,927,792 A | 7/1999 | Welling et al. |
| 5,928,572 A | 7/1999 | Tonar et al. |
| 5,929,786 A | 7/1999 | Schofield et al. |
| 5,935,702 A | 8/1999 | Macquart et al. |
| 5,936,774 A | 8/1999 | Street |
| 5,938,320 A | 8/1999 | Crandall |
| 5,938,321 A | 8/1999 | Bos et al. |
| 5,938,721 A | 8/1999 | Dussell et al. |
| 5,940,011 A | 8/1999 | Agravante et al. |
| 5,940,120 A | 8/1999 | Frankhouse et al. |
| 5,940,201 A | 8/1999 | Ash et al. |
| 5,942,895 A | 8/1999 | Popovic et al. |
| 5,947,586 A | 9/1999 | Weber |
| 5,949,331 A | 9/1999 | Schofield et al. |
| 5,949,506 A | 9/1999 | Jones et al. |
| 5,956,079 A | 9/1999 | Ridgley |
| 5,956,181 A | 9/1999 | Lin |
| 5,959,367 A | 9/1999 | O'Farrell et al. |
| 5,959,555 A | 9/1999 | Furuta |
| 5,959,577 A | 9/1999 | Fan et al. |
| 5,963,247 A | 10/1999 | Banitt |
| 5,963,284 A | 10/1999 | Jones et al. |
| 5,965,247 A | 10/1999 | Jonza et al. |
| 5,968,538 A | 10/1999 | Snyder, Jr. |
| 5,971,552 A | 10/1999 | O'Farrell et al. |
| 5,973,760 A | 10/1999 | Dehmlow |
| 5,975,715 A | 11/1999 | Bauder |
| 5,984,482 A | 11/1999 | Rumsey et al. |
| 5,986,730 A | 11/1999 | Hansen et al. |
| 5,990,469 A | 11/1999 | Bechtel et al. |
| 5,990,625 A | 11/1999 | Meissner et al. |
| 5,995,180 A | 11/1999 | Moriwaki et al. |
| 5,998,617 A | 12/1999 | Srinivasa et al. |
| 5,998,929 A | 12/1999 | Bechtel et al. |
| 6,000,823 A | 12/1999 | Desmond et al. |
| 6,001,486 A | 12/1999 | Varaprasad et al. |
| 6,002,511 A | 12/1999 | Varaprasad et al. |
| 6,002,983 A | 12/1999 | Alland et al. |
| 6,005,724 A | 12/1999 | Todd |
| 6,007,222 A | 12/1999 | Thau |
| 6,008,486 A | 12/1999 | Stam et al. |
| 6,008,871 A | 12/1999 | Okumura |
| 6,009,359 A | 12/1999 | El-Hakim et al. |
| 6,016,035 A | 1/2000 | Eberspächer et al. |
| 6,016,215 A | 1/2000 | Byker |
| 6,019,411 A | 2/2000 | Carter et al. |
| 6,019,475 A | 2/2000 | Lynam et al. |
| 6,020,987 A | 2/2000 | Baumann et al. |
| 6,021,371 A | 2/2000 | Fultz |
| 6,023,229 A | 2/2000 | Bugno et al. |
| 6,025,872 A | 2/2000 | Ozaki et al. |
| 6,028,537 A | 2/2000 | Suman et al. |
| 6,037,689 A | 3/2000 | Bingle et al. |
| 6,040,939 A | 3/2000 | Demiryont et al. |
| 6,042,253 A | 3/2000 | Fant, Jr. et al. |
| 6,042,934 A | 3/2000 | Guiselin et al. |
| 6,045,243 A | 4/2000 | Muth et al. |
| 6,045,643 A | 4/2000 | Byker et al. |
| 6,046,766 A | 4/2000 | Sakata |
| 6,046,837 A | 4/2000 | Yamamoto |
| 6,049,171 A | 4/2000 | Stam et al. |
| D425,466 S | 5/2000 | Todd et al. |
| 6,060,989 A | 5/2000 | Gehlot |
| 6,061,002 A | 5/2000 | Weber et al. |
| 6,062,920 A | 5/2000 | Jordan et al. |
| 6,064,508 A | 5/2000 | Forgette et al. |
| 6,065,840 A | 5/2000 | Caskey et al. |
| 6,066,920 A | 5/2000 | Torihara et al. |
| 6,067,111 A | 5/2000 | Hahn et al. |
| 6,067,500 A | 5/2000 | Morimoto et al. |
| 6,068,380 A | 5/2000 | Lynn et al. |
| D426,506 S | 6/2000 | Todd et al. |
| D426,507 S | 6/2000 | Todd et al. |
| D427,128 S | 6/2000 | Mathieu |

| | | | | | | |
|---|---|---|---|---|---|---|
| 6,072,391 | A | 6/2000 | Suzuki et al. | 6,172,600 B1 | 1/2001 | Kakinami et al. |
| 6,074,077 | A | 6/2000 | Pastrick et al. | 6,172,601 B1 | 1/2001 | Wada et al. |
| 6,074,777 | A | 6/2000 | Reimers et al. | 6,172,613 B1 | 1/2001 | DeLine et al. |
| 6,076,948 | A | 6/2000 | Bukosky et al. | 6,173,501 B1 | 1/2001 | Blank et al. |
| 6,078,355 | A | 6/2000 | Zengel | 6,175,164 B1 | 1/2001 | O'Farrell et al. |
| 6,078,865 | A | 6/2000 | Koyanagi | 6,175,300 B1 | 1/2001 | Kendrick |
| D428,372 | S | 7/2000 | Todd et al. | 6,176,602 B1 | 1/2001 | Pastrick et al. |
| D428,373 | S | 7/2000 | Todd et al. | 6,178,034 B1 | 1/2001 | Allemand et al. |
| 6,082,881 | A | 7/2000 | Hicks | 6,178,377 B1 | 1/2001 | Ishihara et al. |
| 6,084,700 | A | 7/2000 | Knapp et al. | 6,181,387 B1 | 1/2001 | Rosen |
| 6,086,131 | A | 7/2000 | Bingle et al. | 6,182,006 B1 | 1/2001 | Meek |
| 6,086,229 | A | 7/2000 | Pastrick | 6,183,119 B1 | 2/2001 | Desmond et al. |
| 6,087,012 | A | 7/2000 | Varaprasad et al. | 6,184,679 B1 | 2/2001 | Popovic et al. |
| 6,087,953 | A | 7/2000 | DeLine et al. | 6,184,781 B1 | 2/2001 | Ramakesavan |
| 6,091,343 | A | 7/2000 | Dykema et al. | 6,185,492 B1 | 2/2001 | Kagawa et al. |
| 6,093,976 | A | 7/2000 | Kramer et al. | 6,185,501 B1 | 2/2001 | Smith et al. |
| 6,094,618 | A | 7/2000 | Harada | 6,188,505 B1 | 2/2001 | Lomprey et al. |
| D428,842 | S | 8/2000 | Todd et al. | 6,191,704 B1 | 2/2001 | Takenaga et al. |
| D429,202 | S | 8/2000 | Todd et al. | 6,193,379 B1 | 2/2001 | Tonar et al. |
| D430,088 | S | 8/2000 | Todd et al. | 6,193,912 B1 | 2/2001 | Thieste et al. |
| 6,097,023 | A | 8/2000 | Schofield et al. | 6,195,194 B1 | 2/2001 | Roberts et al. |
| 6,097,316 | A | 8/2000 | Liaw et al. | 6,196,688 B1 | 3/2001 | Caskey et al. |
| 6,099,131 | A | 8/2000 | Fletcher et al. | 6,198,409 B1 | 3/2001 | Schofield et al. |
| 6,099,155 | A | 8/2000 | Pastrick et al. | 6,199,014 B1 | 3/2001 | Walker et al. |
| 6,102,546 | A | 8/2000 | Carter | 6,199,810 B1 | 3/2001 | Wu et al. |
| 6,102,559 | A | 8/2000 | Nold et al. | 6,200,010 B1 | 3/2001 | Anders |
| 6,104,552 | A | 8/2000 | Thau et al. | 6,201,642 B1 | 3/2001 | Bos |
| 6,106,121 | A | 8/2000 | Buckley et al. | 6,206,553 B1 | 3/2001 | Boddy et al. |
| 6,111,498 | A | 8/2000 | Jobes, I et al. | 6,207,083 B1 | 3/2001 | Varaprasad et al. |
| 6,111,683 | A | 8/2000 | Cammenga et al. | 6,210,008 B1 | 4/2001 | Hoekstra et al. |
| 6,111,684 | A | 8/2000 | Forgette et al. | 6,210,012 B1 | 4/2001 | Broer |
| 6,111,685 | A | 8/2000 | Tench et al. | 6,212,470 B1 | 4/2001 | Seymour et al. |
| 6,111,696 | A | 8/2000 | Allen et al. | 6,217,181 B1 | 4/2001 | Lynam et al. |
| 6,115,086 | A | 9/2000 | Rosen | 6,218,934 B1 | 4/2001 | Regan |
| 6,115,651 | A | 9/2000 | Cruz | 6,222,447 B1 | 4/2001 | Schofield et al. |
| 6,116,743 | A | 9/2000 | Hoek | 6,222,460 B1 | 4/2001 | DeLine et al. |
| 6,118,219 | A | 9/2000 | Okigami et al. | 6,222,689 B1 | 4/2001 | Higuchi et al. |
| 6,122,597 | A | 9/2000 | Saneyoshi et al. | 6,227,689 B1 | 5/2001 | Miller |
| 6,122,921 | A | 9/2000 | Brezoczky et al. | 6,232,937 B1 | 5/2001 | Jacobsen et al. |
| 6,124,647 | A | 9/2000 | Marcus et al. | 6,236,514 B1 | 5/2001 | Sato |
| 6,124,886 | A | 9/2000 | DeLine et al. | 6,239,851 B1 | 5/2001 | Hatazawa et al. |
| 6,127,919 | A | 10/2000 | Wylin | 6,239,898 B1 | 5/2001 | Byker et al. |
| 6,127,945 | A | 10/2000 | Mura-Smith | 6,239,899 B1 | 5/2001 | DeVries et al. |
| 6,128,576 | A | 10/2000 | Nishimoto et al. | 6,243,003 B1 | 6/2001 | DeLine et al. |
| 6,130,421 | A | 10/2000 | Bechtel et al. | 6,244,716 B1 | 6/2001 | Steenwyk et al. |
| 6,130,448 | A | 10/2000 | Bauer et al. | 6,245,262 B1 | 6/2001 | Varaprasad et al. |
| 6,132,072 | A | 10/2000 | Turnbull et al. | 6,247,820 B1 | 6/2001 | Van Order |
| 6,137,620 | A | 10/2000 | Guarr et al. | 6,249,214 B1 | 6/2001 | Kashiwazaki |
| 6,139,171 | A | 10/2000 | Waldmann | 6,249,310 B1 | 6/2001 | Lefkowitz |
| 6,139,172 | A | 10/2000 | Bos et al. | 6,249,369 B1 | 6/2001 | Theiste et al. |
| 6,140,933 | A | 10/2000 | Bugno et al. | 6,250,148 B1 | 6/2001 | Lynam |
| 6,142,656 | A | 11/2000 | Kurth | 6,250,766 B1 | 6/2001 | Strumolo et al. |
| 6,146,003 | A | 11/2000 | Thau | 6,250,783 B1 | 6/2001 | Stidham et al. |
| 6,147,934 | A | 11/2000 | Arikawa et al. | 6,255,639 B1 | 7/2001 | Stam et al. |
| 6,148,261 | A | 11/2000 | Obradovich et al. | 6,257,746 B1 | 7/2001 | Todd et al. |
| 6,149,287 | A | 11/2000 | Pastrick et al. | 6,259,412 B1 | 7/2001 | Duroux |
| 6,150,014 | A | 11/2000 | Chu et al. | 6,259,475 B1 | 7/2001 | Ramachandran et al. |
| 6,151,065 | A | 11/2000 | Steed et al. | 6,260,608 B1 | 7/2001 | Kim |
| 6,151,539 | A | 11/2000 | Bergholz et al. | 6,262,842 B1 | 7/2001 | Ouderkirk et al. |
| 6,152,551 | A | 11/2000 | Annas | 6,264,353 B1 | 7/2001 | Caraher et al. |
| 6,152,590 | A | 11/2000 | Furst et al. | 6,265,968 B1 | 7/2001 | Betzitza et al. |
| 6,154,149 | A | 11/2000 | Tyckowski et al. | 6,268,803 B1 | 7/2001 | Gunderson et al. |
| 6,154,306 | A | 11/2000 | Varaprasad et al. | 6,268,837 B1 | 7/2001 | Kobayashi et al. |
| 6,157,294 | A | 12/2000 | Urai et al. | 6,269,308 B1 | 7/2001 | Kodaka et al. |
| 6,157,418 | A | 12/2000 | Rosen | 6,271,901 B1 | 8/2001 | Ide et al. |
| 6,157,424 | A | 12/2000 | Eichenlaub | 6,274,221 B2 | 8/2001 | Smith et al. |
| 6,157,480 | A | 12/2000 | Anderson et al. | 6,276,821 B1 | 8/2001 | Pastrick et al. |
| 6,158,655 | A | 12/2000 | DeVries, Jr. et al. | 6,276,822 B1 | 8/2001 | Bedrosian et al. |
| 6,161,865 | A | 12/2000 | Rose et al. | 6,277,471 B1 | 8/2001 | Tang |
| 6,164,564 | A | 12/2000 | Franco et al. | 6,278,271 B1 | 8/2001 | Schott |
| 6,166,625 | A | 12/2000 | Teowee et al. | 6,278,377 B1 | 8/2001 | DeLine et al. |
| 6,166,629 | A | 12/2000 | Hamma et al. | 6,278,941 B1 | 8/2001 | Yokoyama |
| 6,166,834 | A | 12/2000 | Taketomi et al. | 6,280,068 B1 | 8/2001 | Mertens et al. |
| 6,166,847 | A | 12/2000 | Tench et al. | 6,280,069 B1 | 8/2001 | Pastrick et al. |
| 6,166,848 | A | 12/2000 | Cammenga et al. | 6,281,804 B1 | 8/2001 | Haller et al. |
| 6,167,255 | A | 12/2000 | Kennedy, III et al. | 6,286,965 B1 | 9/2001 | Caskey et al. |
| 6,167,755 | B1 | 1/2001 | Damson et al. | 6,286,984 B1 | 9/2001 | Berg |
| 6,169,955 | B1 | 1/2001 | Fultz | 6,289,332 B2 | 9/2001 | Menig et al. |
| 6,170,956 | B1 | 1/2001 | Rumsey et al. | 6,290,378 B1 | 9/2001 | Buchalla et al. |

| | | | | | | |
|---|---|---|---|---|---|---|
| 6,291,905 | B1 | 9/2001 | Drummond et al. | 6,424,272 | B1 | 7/2002 | Gutta et al. |
| 6,291,906 | B1 | 9/2001 | Marcus et al. | 6,424,273 | B1 | 7/2002 | Gutta et al. |
| 6,294,989 | B1 | 9/2001 | Schofield et al. | 6,424,786 | B1 | 7/2002 | Beeson et al. |
| 6,296,379 | B1 | 10/2001 | Pastrick | 6,424,892 | B1 | 7/2002 | Matsuoka |
| 6,297,781 | B1 | 10/2001 | Turnbull et al. | 6,426,492 | B1 | 7/2002 | Bos et al. |
| 6,299,333 | B1 | 10/2001 | Pastrick et al. | 6,426,568 | B2 | 7/2002 | Turnbull et al. |
| 6,300,879 | B1 | 10/2001 | Regan et al. | 6,427,349 | B1 | 8/2002 | Blank et al. |
| 6,301,039 | B1 | 10/2001 | Tench | 6,428,172 | B1 | 8/2002 | Hutzel et al. |
| 6,304,173 | B2 | 10/2001 | Pala et al. | 6,433,676 | B2 | 8/2002 | DeLine et al. |
| 6,305,807 | B1 | 10/2001 | Schierbeek | 6,433,680 | B1 | 8/2002 | Ho |
| 6,310,611 | B1 | 10/2001 | Caldwell | 6,433,914 | B1 | 8/2002 | Lomprey et al. |
| 6,310,714 | B1 | 10/2001 | Lomprey et al. | 6,437,688 | B1 | 8/2002 | Kobayashi |
| 6,310,738 | B1 | 10/2001 | Chu | 6,438,491 | B1 | 8/2002 | Farmer |
| 6,313,454 | B1 | 11/2001 | Bos et al. | 6,439,755 | B1 | 8/2002 | Fant, Jr. et al. |
| 6,314,295 | B1 | 11/2001 | Kawamoto | 6,441,872 | B1 | 8/2002 | Ho |
| 6,315,440 | B1 | 11/2001 | Satoh | 6,441,943 | B1 | 8/2002 | Roberts et al. |
| 6,317,057 | B1 | 11/2001 | Lee | 6,441,963 | B2 | 8/2002 | Murakami et al. |
| 6,317,180 | B1 | 11/2001 | Kuroiwa et al. | 6,441,964 | B1 | 8/2002 | Chu et al. |
| 6,317,248 | B1 | 11/2001 | Agrawal et al. | 6,445,287 | B1 | 9/2002 | Schofield et al. |
| 6,318,870 | B1 | 11/2001 | Spooner et al. | 6,447,128 | B1 | 9/2002 | Lang et al. |
| 6,320,176 | B1 | 11/2001 | Schofield et al. | 6,449,082 | B1 | 9/2002 | Agrawal et al. |
| 6,320,282 | B1 | 11/2001 | Caldwell | 6,452,533 | B1 | 9/2002 | Yamabuchi et al. |
| 6,320,612 | B1 | 11/2001 | Young | 6,452,572 | B1 | 9/2002 | Fan et al. |
| 6,324,295 | B1 | 11/2001 | Valery et al. | 6,456,438 | B1 | 9/2002 | Lee et al. |
| 6,326,613 | B1 | 12/2001 | Heslin et al. | 6,462,795 | B1 | 10/2002 | Clarke |
| 6,326,900 | B2 | 12/2001 | DeLine et al. | 6,463,369 | B2 | 10/2002 | Sadano et al. |
| 6,329,925 | B1 | 12/2001 | Skiver et al. | 6,466,701 | B1 | 10/2002 | Ejiri et al. |
| 6,330,511 | B2 | 12/2001 | Ogura et al. | 6,471,362 | B1 | 10/2002 | Carter et al. |
| 6,331,066 | B1 | 12/2001 | Desmond et al. | 6,472,977 | B1 | 10/2002 | Pöchmüller |
| 6,333,759 | B1 | 12/2001 | Mazzilli | 6,472,979 | B1 | 10/2002 | Schofield et al. |
| 6,335,680 | B1 | 1/2002 | Matsuoka | 6,473,001 | B1 | 10/2002 | Blum |
| 6,336,737 | B1 | 1/2002 | Thau | 6,474,853 | B2 | 11/2002 | Pastrick et al. |
| 6,340,850 | B2 | 1/2002 | O'Farrell et al. | 6,476,731 | B1 | 11/2002 | Miki et al. |
| 6,341,523 | B2 | 1/2002 | Lynam | 6,476,855 | B1 | 11/2002 | Yamamoto |
| 6,344,805 | B1 | 2/2002 | Yasui et al. | 6,477,460 | B2 | 11/2002 | Kepler |
| 6,346,698 | B1 | 2/2002 | Turnbull | 6,477,464 | B2 | 11/2002 | McCarthy et al. |
| 6,347,880 | B1 | 2/2002 | Fürst et al. | 6,483,429 | B1 | 11/2002 | Yasui et al. |
| 6,348,858 | B2 | 2/2002 | Weis et al. | 6,483,438 | B2 | 11/2002 | DeLine et al. |
| 6,351,708 | B1 | 2/2002 | Takagi et al. | 6,483,613 | B1 | 11/2002 | Woodgate et al. |
| 6,353,392 | B1 | 3/2002 | Schofield et al. | 6,487,500 | B2 | 11/2002 | Lemelson et al. |
| 6,356,206 | B1 | 3/2002 | Takenaga et al. | 6,494,602 | B2 | 12/2002 | Pastrick et al. |
| 6,356,376 | B1 | 3/2002 | Tonar et al. | 6,498,620 | B2 | 12/2002 | Schofield et al. |
| 6,356,389 | B1 | 3/2002 | Nilsen et al. | 6,501,387 | B2 | 12/2002 | Skiver et al. |
| 6,357,883 | B1 | 3/2002 | Strumolo et al. | 6,512,203 | B2 | 1/2003 | Jones et al. |
| 6,362,121 | B1 | 3/2002 | Chopin et al. | 6,512,624 | B2 | 1/2003 | Tonar et al. |
| 6,362,548 | B1 | 3/2002 | Bingle et al. | 6,513,252 | B1 | 2/2003 | Schierbeek et al. |
| 6,363,326 | B1 | 3/2002 | Scully | 6,515,378 | B2 | 2/2003 | Drummond et al. |
| 6,366,013 | B1 | 4/2002 | Leenders et al. | 6,515,581 | B1 | 2/2003 | Ho |
| 6,366,213 | B2 | 4/2002 | DeLine et al. | 6,515,582 | B1 | 2/2003 | Teowee |
| 6,369,701 | B1 | 4/2002 | Yoshida et al. | 6,515,597 | B1 | 2/2003 | Wada et al. |
| 6,370,329 | B1 | 4/2002 | Teuchert | 6,516,664 | B2 | 2/2003 | Lynam |
| 6,371,636 | B1 | 4/2002 | Wesson | 6,518,691 | B1 | 2/2003 | Baba |
| 6,379,013 | B1 | 4/2002 | Bechtel et al. | 6,519,209 | B1 | 2/2003 | Arikawa et al. |
| 6,379,788 | B2 | 4/2002 | Choi et al. | 6,520,667 | B1 | 2/2003 | Mousseau |
| 6,382,805 | B1 | 5/2002 | Miyabukuro | 6,522,451 | B1 | 2/2003 | Lynam |
| 6,385,139 | B1 | 5/2002 | Arikawa et al. | 6,522,969 | B2 | 2/2003 | Kannonji |
| 6,386,742 | B1 | 5/2002 | DeLine et al. | 6,525,707 | B1 | 2/2003 | Kaneko et al. |
| 6,390,529 | B1 | 5/2002 | Bingle et al. | 6,534,884 | B2 | 3/2003 | Marcus et al. |
| 6,390,626 | B2 | 5/2002 | Knox | 6,538,709 | B1 | 3/2003 | Kurihara et al. |
| 6,390,635 | B2 | 5/2002 | Whitehead et al. | 6,539,306 | B2 | 3/2003 | Turnbull et al. |
| 6,396,397 | B1 | 5/2002 | Bos et al. | 6,542,085 | B1 | 4/2003 | Yang |
| 6,396,408 | B2 | 5/2002 | Drummond et al. | 6,542,182 | B1 | 4/2003 | Chautorash |
| 6,396,637 | B2 | 5/2002 | Roest et al. | 6,543,163 | B1 | 4/2003 | Ginsberg |
| 6,407,468 | B1 | 6/2002 | LeVesque et al. | 6,545,598 | B1 | 4/2003 | de Villeroche |
| 6,407,847 | B1 | 6/2002 | Poll et al. | 6,549,253 | B1 | 4/2003 | Robbie et al. |
| 6,408,247 | B1 | 6/2002 | Ichikawa et al. | 6,549,335 | B1 | 4/2003 | Trapani et al. |
| 6,411,204 | B1 | 6/2002 | Bloomfield et al. | 6,550,949 | B1 | 4/2003 | Bauer et al. |
| 6,412,959 | B1 | 7/2002 | Tseng | 6,552,326 | B2 | 4/2003 | Turnbull |
| 6,412,973 | B1 | 7/2002 | Bos et al. | 6,552,653 | B2 | 4/2003 | Nakaho et al. |
| 6,414,910 | B1 | 7/2002 | Kaneko et al. | 6,553,308 | B1 | 4/2003 | Uhlmann et al. |
| 6,415,230 | B1 | 7/2002 | Maruko et al. | 6,559,761 | B1 | 5/2003 | Miller et al. |
| 6,416,208 | B2 | 7/2002 | Pastrick et al. | 6,559,902 | B1 | 5/2003 | Kusuda et al. |
| 6,417,786 | B2 | 7/2002 | Learman et al. | 6,560,004 | B2 | 5/2003 | Theiste et al. |
| 6,418,376 | B1 | 7/2002 | Olson | 6,560,027 | B2 | 5/2003 | Meine |
| 6,419,300 | B1 | 7/2002 | Pavao et al. | 6,566,821 | B2 | 5/2003 | Nakatsuka et al. |
| 6,420,036 | B1 | 7/2002 | Varaprasad et al. | 6,567,060 | B1 | 5/2003 | Sekiguchi |
| 6,420,800 | B1 | 7/2002 | LeVesque et al. | 6,567,708 | B1 | 5/2003 | Bechtel et al. |
| 6,420,975 | B1 | 7/2002 | DeLine et al. | 6,568,839 | B1 | 5/2003 | Pastrick et al. |
| 6,421,081 | B1 | 7/2002 | Markus | 6,572,233 | B1 | 6/2003 | Northman et al. |

| | | |
|---|---|---|
| 6,573,957 B1 | 6/2003 | Suzuki |
| 6,573,963 B2 | 6/2003 | Ouderkirk et al. |
| 6,575,582 B2 | 6/2003 | Tenmyo |
| 6,575,643 B2 | 6/2003 | Takahashi |
| 6,578,989 B2 | 6/2003 | Osumi et al. |
| 6,580,373 B1 | 6/2003 | Ohashi |
| 6,580,479 B1 | 6/2003 | Sekiguchi et al. |
| 6,580,562 B2 | 6/2003 | Aoki et al. |
| 6,581,007 B2 | 6/2003 | Hasegawa et al. |
| 6,583,730 B2 | 6/2003 | Lang et al. |
| 6,591,192 B2 | 7/2003 | Okamura et al. |
| 6,592,230 B2 | 7/2003 | Dupay |
| 6,593,565 B2 | 7/2003 | Heslin et al. |
| 6,593,984 B2 | 7/2003 | Arakawa et al. |
| 6,594,065 B2 | 7/2003 | Byker et al. |
| 6,594,067 B2 | 7/2003 | Poll et al. |
| 6,594,090 B2 | 7/2003 | Kruschwitz et al. |
| 6,594,583 B2 | 7/2003 | Ogura et al. |
| 6,594,614 B2 | 7/2003 | Studt et al. |
| 6,595,649 B2 | 7/2003 | Hoekstra et al. |
| 6,597,489 B1 | 7/2003 | Guarr et al. |
| 6,606,183 B2 | 8/2003 | Ikai et al. |
| 6,611,202 B2 | 8/2003 | Schofield et al. |
| 6,611,227 B1 | 8/2003 | Nebiyeloul-Kifle et al. |
| 6,611,759 B2 | 8/2003 | Brosche |
| 6,612,723 B2 | 9/2003 | Futhey et al. |
| 6,614,387 B1 | 9/2003 | Deadman |
| 6,614,419 B1 | 9/2003 | May |
| 6,614,579 B2 | 9/2003 | Roberts et al. |
| 6,615,438 B1 | 9/2003 | Franco et al. |
| 6,616,313 B2 | 9/2003 | Fürst et al. |
| 6,616,764 B2 | 9/2003 | Krämer et al. |
| 6,618,672 B2 | 9/2003 | Sasaki et al. |
| 6,621,616 B1 | 9/2003 | Bauer et al. |
| 6,624,936 B2 | 9/2003 | Kotchick et al. |
| 6,627,918 B2 | 9/2003 | Getz et al. |
| 6,630,888 B2 | 10/2003 | Lang et al. |
| 6,636,190 B2 | 10/2003 | Hirakata et al. |
| 6,636,258 B2 | 10/2003 | Strumolo |
| 6,638,582 B1 | 10/2003 | Uchiyama et al. |
| 6,639,360 B2 | 10/2003 | Roberts et al. |
| 6,642,840 B2 | 11/2003 | Lang et al. |
| 6,642,851 B2 | 11/2003 | Deline et al. |
| 6,646,697 B1 | 11/2003 | Sekiguchi et al. |
| 6,648,477 B2 | 11/2003 | Hutzel et al. |
| 6,650,457 B2 | 11/2003 | Busscher et al. |
| 6,657,607 B1 | 12/2003 | Evanicky et al. |
| 6,661,482 B2 | 12/2003 | Hara |
| 6,661,830 B1 | 12/2003 | Reed et al. |
| 6,663,262 B2 | 12/2003 | Boyd et al. |
| 6,665,592 B2 | 12/2003 | Kodama |
| 6,669,109 B2 | 12/2003 | Ivanov et al. |
| 6,669,285 B1 | 12/2003 | Park et al. |
| 6,670,207 B1 | 12/2003 | Roberts |
| 6,670,910 B2 | 12/2003 | Delcheccolo et al. |
| 6,670,935 B2 | 12/2003 | Yeon et al. |
| 6,670,941 B2 | 12/2003 | Albu et al. |
| 6,671,080 B2 | 12/2003 | Poll et al. |
| 6,672,731 B2 | 1/2004 | Schnell et al. |
| 6,672,734 B2 | 1/2004 | Lammers |
| 6,672,744 B2 | 1/2004 | DeLine et al. |
| 6,672,745 B1 | 1/2004 | Bauer et al. |
| 6,674,370 B2 | 1/2004 | Rodewald et al. |
| 6,675,075 B1 | 1/2004 | Engelsberg et al. |
| 6,678,083 B1 | 1/2004 | Anstee |
| 6,678,614 B2 | 1/2004 | McCarthy et al. |
| 6,679,608 B2 | 1/2004 | Bechtel et al. |
| 6,683,539 B2 | 1/2004 | Trajkovic et al. |
| 6,683,969 B1 | 1/2004 | Nishigaki et al. |
| 6,685,348 B2 | 2/2004 | Pastrick et al. |
| 6,690,262 B1 | 2/2004 | Winnett |
| 6,690,268 B2 | 2/2004 | Schofield et al. |
| 6,690,413 B1 | 2/2004 | Moore |
| 6,690,438 B2 | 2/2004 | Sekiguchi |
| 6,693,517 B2 | 2/2004 | McCarthy et al. |
| 6,693,518 B2 | 2/2004 | Kumata et al. |
| 6,693,519 B2 | 2/2004 | Keirstead |
| 6,693,524 B1 | 2/2004 | Payne |
| 6,700,692 B2 | 3/2004 | Tonar et al. |
| 6,704,434 B1 | 3/2004 | Sakoh et al. |
| 6,709,136 B2 | 3/2004 | Pastrick et al. |
| 6,713,783 B1 | 3/2004 | Mase et al. |
| 6,717,109 B1 | 4/2004 | Macher et al. |
| 6,717,610 B1 | 4/2004 | Bos et al. |
| 6,717,712 B2 | 4/2004 | Lynam et al. |
| 6,719,215 B2 | 4/2004 | Drouillard |
| 6,724,446 B2 | 4/2004 | Motomura et al. |
| 6,726,337 B2 | 4/2004 | Whitehead et al. |
| 6,727,807 B2 | 4/2004 | Trajkovic et al. |
| 6,727,808 B1 | 4/2004 | Uselmann et al. |
| 6,727,844 B1 | 4/2004 | Zimmermann et al. |
| 6,731,332 B1 | 5/2004 | Yasui et al. |
| 6,734,807 B2 | 5/2004 | King |
| 6,736,526 B2 | 5/2004 | Matsuba et al. |
| 6,737,629 B2 | 5/2004 | Nixon et al. |
| 6,737,630 B2 | 5/2004 | Turnbull |
| 6,737,964 B2 | 5/2004 | Samman et al. |
| 6,738,088 B1 | 5/2004 | Uskolovsky et al. |
| 6,742,904 B2 | 6/2004 | Bechtel et al. |
| 6,744,353 B2 | 6/2004 | Sjönell |
| 6,746,775 B1 | 6/2004 | Boire et al. |
| 6,747,716 B2 | 6/2004 | Kuroiwa et al. |
| 6,748,211 B1 | 6/2004 | Isaac et al. |
| 6,749,308 B1 | 6/2004 | Niendorf et al. |
| 6,755,542 B2 | 6/2004 | Bechtel et al. |
| 6,756,912 B2 | 6/2004 | Skiver et al. |
| 6,757,039 B2 | 6/2004 | Ma |
| 6,757,109 B2 | 6/2004 | Bos |
| D493,131 S | 7/2004 | Lawlor et al. |
| D493,394 S | 7/2004 | Lawlor et al. |
| 6,759,113 B1 | 7/2004 | Tang |
| 6,759,945 B2 | 7/2004 | Richard |
| 6,760,157 B1 | 7/2004 | Allen et al. |
| 6,765,480 B2 | 7/2004 | Tseng |
| 6,773,116 B2 | 8/2004 | De Vaan et al. |
| 6,774,356 B2 | 8/2004 | Heslin et al. |
| 6,774,810 B2 | 8/2004 | DeLine et al. |
| 6,778,904 B2 | 8/2004 | Iwami et al. |
| 6,779,900 B1 | 8/2004 | Nolan-Brown |
| 6,781,738 B2 | 8/2004 | Kikuchi et al. |
| 6,782,718 B2 | 8/2004 | Lingle et al. |
| 6,784,129 B2 | 8/2004 | Seto et al. |
| 6,797,396 B1 | 9/2004 | Liu et al. |
| 6,800,871 B2 | 10/2004 | Matsuda et al. |
| 6,801,127 B2 | 10/2004 | Mizusawa et al. |
| 6,801,244 B2 | 10/2004 | Takeda et al. |
| 6,801,283 B2 | 10/2004 | Koyama et al. |
| 6,805,474 B2 | 10/2004 | Walser et al. |
| 6,806,452 B2 | 10/2004 | Bos et al. |
| 6,806,922 B2 | 10/2004 | Ishitaka |
| 6,810,323 B1 | 10/2004 | Bullock et al. |
| 6,812,463 B2 | 11/2004 | Okada |
| 6,812,907 B1 | 11/2004 | Gennetten et al. |
| 6,819,231 B2 | 11/2004 | Berberich et al. |
| 6,823,261 B2 | 11/2004 | Sekiguchi |
| 6,824,281 B2 | 11/2004 | Schofield et al. |
| 6,831,268 B2 | 12/2004 | Bechtel et al. |
| 6,832,848 B2 | 12/2004 | Pastrick |
| 6,834,969 B2 | 12/2004 | Bade et al. |
| 6,836,725 B2 | 12/2004 | Millington et al. |
| 6,838,980 B2 | 1/2005 | Gloger et al. |
| 6,842,189 B2 | 1/2005 | Park |
| 6,842,276 B2 | 1/2005 | Poll et al. |
| 6,845,805 B1 | 1/2005 | Köster |
| 6,846,098 B2 | 1/2005 | Bourdelais et al. |
| 6,847,424 B2 | 1/2005 | Gotoh et al. |
| 6,847,487 B2 | 1/2005 | Burgner |
| 6,848,817 B2 | 2/2005 | Bos et al. |
| 6,849,165 B2 | 2/2005 | Klöppel et al. |
| 6,853,491 B1 | 2/2005 | Ruhle et al. |
| 6,859,148 B2 | 2/2005 | Miller et al. |
| 6,861,789 B2 | 3/2005 | Wei |
| 6,870,655 B1 | 3/2005 | Northman et al. |
| 6,870,656 B2 | 3/2005 | Tonar et al. |
| 6,871,982 B2 | 3/2005 | Holman et al. |
| 6,877,888 B2 | 4/2005 | DeLine et al. |
| 6,882,287 B2 | 4/2005 | Schofield |
| 6,889,064 B2 | 5/2005 | Baratono et al. |

| Patent | Type | Date | Inventor |
|---|---|---|---|
| 6,891,563 | B2 | 5/2005 | Schofield et al. |
| 6,891,677 | B2 | 5/2005 | Nilsen et al. |
| 6,898,518 | B2 | 5/2005 | Padmanabhan |
| 6,902,284 | B2 | 6/2005 | Hutzel et al. |
| 6,904,348 | B2 | 6/2005 | Drummond et al. |
| 6,906,620 | B2 | 6/2005 | Nakai et al. |
| 6,906,632 | B2 | 6/2005 | DeLine et al. |
| 6,909,486 | B2 | 6/2005 | Wang et al. |
| 6,910,779 | B2 | 6/2005 | Abel et al. |
| 6,912,001 | B2 | 6/2005 | Okamoto et al. |
| 6,912,396 | B2 | 6/2005 | Sziraki et al. |
| 6,914,521 | B2 | 7/2005 | Rothkop |
| 6,916,099 | B2 | 7/2005 | Su et al. |
| 6,917,404 | B2 | 7/2005 | Baek |
| 6,918,674 | B2 | 7/2005 | Drummond et al. |
| 6,922,902 | B2 * | 8/2005 | Schierbeek et al. ............ 33/356 |
| 6,923,080 | B1 | 8/2005 | Dobler et al. |
| 6,928,180 | B2 | 8/2005 | Stam et al. |
| 6,928,366 | B2 | 8/2005 | Ockerse et al. |
| 6,930,737 | B2 | 8/2005 | Weindorf et al. |
| 6,933,837 | B2 | 8/2005 | Gunderson et al. |
| 6,934,067 | B2 | 8/2005 | Ash et al. |
| 6,940,423 | B2 | 9/2005 | Takagi et al. |
| 6,946,978 | B2 | 9/2005 | Schofield |
| 6,947,576 | B2 | 9/2005 | Stam et al. |
| 6,947,577 | B2 | 9/2005 | Stam et al. |
| 6,949,772 | B2 | 9/2005 | Shimizu et al. |
| 6,950,035 | B2 | 9/2005 | Tanaka et al. |
| 6,951,410 | B2 | 10/2005 | Parsons |
| 6,951,681 | B2 | 10/2005 | Hartley et al. |
| 6,952,312 | B2 | 10/2005 | Weber et al. |
| 6,958,495 | B2 | 10/2005 | Nishijima et al. |
| 6,958,683 | B2 | 10/2005 | Mills et al. |
| 6,959,994 | B2 | 11/2005 | Fujikawa et al. |
| 6,961,178 | B2 | 11/2005 | Sugino et al. |
| 6,961,661 | B2 | 11/2005 | Sekiguchi |
| 6,963,438 | B2 | 11/2005 | Busscher et al. |
| 6,968,273 | B2 | 11/2005 | Ockerse et al. |
| 6,971,181 | B2 | 12/2005 | Ohm et al. |
| 6,972,888 | B2 | 12/2005 | Poll et al. |
| 6,974,236 | B2 | 12/2005 | Tenmyo |
| 6,975,215 | B2 | 12/2005 | Schofield et al. |
| 6,977,702 | B2 | 12/2005 | Wu |
| 6,980,092 | B2 | 12/2005 | Turnbull et al. |
| 6,985,291 | B2 | 1/2006 | Watson et al. |
| 6,989,736 | B2 | 1/2006 | Berberich et al. |
| 6,992,573 | B2 | 1/2006 | Blank et al. |
| 6,992,718 | B1 | 1/2006 | Takahara |
| 6,992,826 | B2 | 1/2006 | Wang |
| 6,995,687 | B2 | 2/2006 | Lang et al. |
| 6,997,571 | B2 | 2/2006 | Tenmyo |
| 7,001,058 | B2 | 2/2006 | Inditsky |
| 7,004,592 | B2 | 2/2006 | Varaprasad et al. |
| 7,004,593 | B2 | 2/2006 | Weller et al. |
| 7,005,974 | B2 | 2/2006 | McMahon et al. |
| 7,006,173 | B1 | 2/2006 | Hiyama et al. |
| 7,008,090 | B2 | 3/2006 | Blank |
| 7,009,751 | B2 | 3/2006 | Tonar et al. |
| 7,012,543 | B2 | 3/2006 | DeLine et al. |
| 7,012,727 | B2 | 3/2006 | Hutzel et al. |
| 7,023,331 | B2 | 4/2006 | Kodama |
| 7,029,156 | B2 | 4/2006 | Suehiro et al. |
| 7,030,738 | B2 | 4/2006 | Ishii |
| 7,030,775 | B2 | 4/2006 | Sekiguchi |
| 7,038,577 | B2 | 5/2006 | Pawlicki et al. |
| 7,041,965 | B2 | 5/2006 | Heslin et al. |
| 7,042,616 | B2 | 5/2006 | Tonar et al. |
| 7,046,418 | B2 | 5/2006 | Lin et al. |
| 7,046,448 | B2 | 5/2006 | Burgner |
| 7,050,908 | B1 | 5/2006 | Schwartz et al. |
| 7,057,505 | B2 | 6/2006 | Iwamoto |
| 7,057,681 | B2 | 6/2006 | Hinata et al. |
| 7,063,893 | B2 | 6/2006 | Hoffman |
| 7,064,882 | B2 | 6/2006 | Tonar et al. |
| 7,068,289 | B2 | 6/2006 | Satoh et al. |
| 7,074,486 | B2 | 7/2006 | Boire et al. |
| 7,081,810 | B2 | 7/2006 | Henderson et al. |
| 7,085,633 | B2 | 8/2006 | Nishira et al. |
| 7,092,052 | B2 | 8/2006 | Okamoto et al. |
| 7,095,432 | B2 | 8/2006 | Nakayama et al. |
| 7,095,567 | B2 | 8/2006 | Troxell et al. |
| 7,106,213 | B2 | 9/2006 | White |
| 7,106,392 | B2 | 9/2006 | You |
| 7,108,409 | B2 | 9/2006 | DeLine et al. |
| 7,110,021 | B2 | 9/2006 | Nobori et al. |
| 7,114,554 | B2 | 10/2006 | Bergman et al. |
| 7,121,028 | B2 | 10/2006 | Shoen et al. |
| 7,125,131 | B2 | 10/2006 | Olczak |
| 7,130,727 | B2 | 10/2006 | Liu et al. |
| 7,132,064 | B2 | 11/2006 | Li et al. |
| 7,136,091 | B2 | 11/2006 | Ichikawa et al. |
| 7,138,974 | B2 | 11/2006 | Hirakata et al. |
| 7,149,613 | B2 | 12/2006 | Stam et al. |
| 7,150,552 | B2 | 12/2006 | Weidel |
| 7,151,515 | B2 | 12/2006 | Kim et al. |
| 7,151,997 | B2 | 12/2006 | Uhlmann et al. |
| 7,153,588 | B2 | 12/2006 | McMan et al. |
| 7,154,657 | B2 | 12/2006 | Poll et al. |
| 7,158,881 | B2 | 1/2007 | McCarthy et al. |
| 7,160,017 | B2 | 1/2007 | Lee et al. |
| 7,161,567 | B2 | 1/2007 | Homma et al. |
| 7,167,796 | B2 | 1/2007 | Taylor et al. |
| 7,168,830 | B2 | 1/2007 | Pastrick et al. |
| 7,175,291 | B1 | 2/2007 | Li |
| 7,176,790 | B2 | 2/2007 | Yamazaki |
| 7,184,190 | B2 | 2/2007 | McCabe et al. |
| 7,185,995 | B2 | 3/2007 | Hatanaka et al. |
| 7,187,498 | B2 | 3/2007 | Bengoechea et al. |
| 7,188,963 | B2 | 3/2007 | Schofield et al. |
| 7,193,764 | B2 | 3/2007 | Lin et al. |
| 7,195,381 | B2 | 3/2007 | Lynam et al. |
| 7,199,767 | B2 | 4/2007 | Spero |
| 7,202,987 | B2 | 4/2007 | Varaprasad et al. |
| 7,206,697 | B2 | 4/2007 | Olney et al. |
| 7,209,277 | B2 | 4/2007 | Tonar et al. |
| 7,215,238 | B2 | 5/2007 | Buck et al. |
| 7,215,473 | B2 | 5/2007 | Fleming |
| 7,221,363 | B2 | 5/2007 | Roberts et al. |
| 7,221,365 | B1 | 5/2007 | Lévesque et al. |
| 7,224,324 | B2 | 5/2007 | Quist et al. |
| 7,227,472 | B1 | 6/2007 | Roe |
| 7,230,523 | B2 | 6/2007 | Harter, Jr. et al. |
| 7,232,231 | B2 | 6/2007 | Shih |
| 7,232,594 | B2 | 6/2007 | Miroshin et al. |
| 7,233,304 | B1 | 6/2007 | Aratani et al. |
| 7,235,918 | B2 | 6/2007 | McCullough et al. |
| 7,241,030 | B2 | 7/2007 | Mok et al. |
| 7,241,037 | B2 | 7/2007 | Mathieu et al. |
| 7,245,207 | B1 | 7/2007 | Dayan et al. |
| 7,245,231 | B2 | 7/2007 | Kiefer et al. |
| 7,245,336 | B2 | 7/2007 | Hiyama et al. |
| 7,248,283 | B2 | 7/2007 | Takagi et al. |
| 7,248,305 | B2 | 7/2007 | Ootsuta et al. |
| 7,249,860 | B2 | 7/2007 | Kulas et al. |
| 7,251,079 | B2 | 7/2007 | Capaldo et al. |
| 7,253,723 | B2 | 8/2007 | Lindahl et al. |
| 7,255,451 | B2 | 8/2007 | McCabe et al. |
| 7,255,465 | B2 | 8/2007 | DeLine et al. |
| 7,259,036 | B2 | 8/2007 | Borland et al. |
| 7,262,406 | B2 | 8/2007 | Heslin et al. |
| 7,262,916 | B2 | 8/2007 | Kao et al. |
| 7,265,342 | B2 | 9/2007 | Heslin et al. |
| 7,268,841 | B2 | 9/2007 | Kasajima et al. |
| 7,269,327 | B2 | 9/2007 | Tang |
| 7,269,328 | B2 | 9/2007 | Tang |
| 7,271,951 | B2 | 9/2007 | Weber et al. |
| 7,274,501 | B2 | 9/2007 | McCabe et al. |
| 7,281,491 | B2 | 10/2007 | Iwamaru |
| 7,286,280 | B2 | 10/2007 | Whitehead et al. |
| 7,287,868 | B2 | 10/2007 | Carter et al. |
| 7,289,037 | B2 | 10/2007 | Uken et al. |
| 7,290,919 | B2 | 11/2007 | Pan et al. |
| 7,292,208 | B1 | 11/2007 | Park et al. |
| 7,300,183 | B2 | 11/2007 | Kiyomoto et al. |
| 7,302,344 | B2 | 11/2007 | Olney et al. |
| 7,304,661 | B2 | 12/2007 | Ishikura |
| 7,308,341 | B2 | 12/2007 | Schofield et al. |
| 7,310,177 | B2 | 12/2007 | McCabe et al. |

| | | |
|---|---|---|
| 7,311,428 B2 | 12/2007 | DeLine et al. |
| 7,316,485 B2 | 1/2008 | Roose |
| 7,317,386 B2 | 1/2008 | Lengning et al. |
| 7,318,664 B2 | 1/2008 | Hatanaka et al. |
| 7,323,819 B2 | 1/2008 | Hong et al. |
| 7,324,043 B2 | 1/2008 | Purden et al. |
| 7,324,172 B2 | 1/2008 | Yamazaki |
| 7,324,174 B2 | 1/2008 | Hafuka et al. |
| 7,324,261 B2 | 1/2008 | Tonar et al. |
| 7,327,225 B2 | 2/2008 | Nicholas et al. |
| 7,327,226 B2 | 2/2008 | Turnbull et al. |
| 7,327,855 B1 | 2/2008 | Chen |
| 7,328,103 B2 | 2/2008 | McCarthy et al. |
| 7,329,013 B2 | 2/2008 | Blank et al. |
| 7,329,850 B2 | 2/2008 | Drummond et al. |
| 7,331,415 B2 | 2/2008 | Hawes et al. |
| 7,338,177 B2 | 3/2008 | Lynam |
| 7,342,707 B2 | 3/2008 | Roberts et al. |
| 7,344,284 B2 | 3/2008 | Lynam et al. |
| 7,349,143 B2 | 3/2008 | Tonar et al. |
| 7,349,144 B2 | 3/2008 | Varaprasad et al. |
| 7,349,582 B2 | 3/2008 | Takeda et al. |
| 7,355,524 B2 | 4/2008 | Schofield |
| 7,360,932 B2 | 4/2008 | Uken et al. |
| 7,362,505 B2 | 4/2008 | Hikmet et al. |
| 7,368,714 B2 | 5/2008 | Remillard et al. |
| 7,370,983 B2 | 5/2008 | DeWind et al. |
| 7,372,611 B2 | 5/2008 | Tonar et al. |
| 7,375,895 B2 | 5/2008 | Brynielsson |
| 7,379,224 B2 | 5/2008 | Tonar et al. |
| 7,379,225 B2 | 5/2008 | Tonar et al. |
| 7,379,243 B2 | 5/2008 | Horsten et al. |
| 7,379,814 B2 | 5/2008 | Ockerse et al. |
| 7,379,817 B1 | 5/2008 | Tyson et al. |
| 7,380,633 B2 | 6/2008 | Shen et al. |
| 7,389,171 B2 | 6/2008 | Rupp |
| 7,391,563 B2 | 6/2008 | McCabe et al. |
| 7,396,147 B2 | 7/2008 | Munro |
| 7,411,637 B2 | 8/2008 | Weiss |
| 7,411,732 B2 | 8/2008 | Kao et al. |
| 7,412,328 B2 | 8/2008 | Uhlmann et al. |
| 7,417,781 B2 | 8/2008 | Tonar et al. |
| 7,420,159 B2 | 9/2008 | Heslin et al. |
| 7,420,756 B2 | 9/2008 | Lynam |
| 7,429,998 B2 | 9/2008 | Kawauchi et al. |
| 7,446,462 B2 | 11/2008 | Lim et al. |
| 7,446,650 B2 | 11/2008 | Scholfield et al. |
| 7,446,924 B2 | 11/2008 | Schofield et al. |
| 7,448,776 B2 | 11/2008 | Tang |
| 7,452,090 B2 | 11/2008 | Weller et al. |
| 7,453,057 B2 | 11/2008 | Drummond et al. |
| 7,455,412 B2 | 11/2008 | Rottcher |
| 7,460,007 B2 | 12/2008 | Schofield et al. |
| 7,467,883 B2 | 12/2008 | DeLine et al. |
| 7,468,651 B2 | 12/2008 | DeLine et al. |
| 7,471,438 B2 | 12/2008 | McCabe et al. |
| 7,474,963 B2 | 1/2009 | Taylor et al. |
| 7,477,439 B2 | 1/2009 | Tonar et al. |
| 7,480,149 B2 | 1/2009 | DeWard et al. |
| 7,488,080 B2 | 2/2009 | Skiver et al. |
| 7,488,099 B2 | 2/2009 | Fogg et al. |
| 7,489,374 B2 | 2/2009 | Utsumi et al. |
| 7,490,007 B2 | 2/2009 | Taylor et al. |
| 7,490,943 B2 | 2/2009 | Kikuchi et al. |
| 7,490,944 B2 | 2/2009 | Blank et al. |
| 7,494,231 B2 | 2/2009 | Varaprasad et al. |
| 7,495,719 B2 | 2/2009 | Adachi et al. |
| 7,496,439 B2 | 2/2009 | McCormick |
| 7,502,156 B2 | 3/2009 | Tonar et al. |
| 7,505,047 B2 | 3/2009 | Yoshimura |
| 7,505,188 B2 | 3/2009 | Niiyama et al. |
| 7,511,607 B2 | 3/2009 | Hubbard et al. |
| 7,511,872 B2 | 3/2009 | Tonar et al. |
| 7,525,604 B2 | 4/2009 | Xue |
| 7,525,715 B2 | 4/2009 | McCabe et al. |
| 7,526,103 B2 | 4/2009 | Schofield et al. |
| 7,533,998 B2 | 5/2009 | Schofield et al. |
| 7,538,316 B2 | 5/2009 | Heslin et al. |
| 7,540,620 B2 | 6/2009 | Weller et al. |
| 7,541,570 B2 | 6/2009 | Drummond et al. |
| 7,542,193 B2 | 6/2009 | McCabe et al. |
| 7,543,946 B2 | 6/2009 | Ockerse et al. |
| 7,543,947 B2 | 6/2009 | Varaprasad et al. |
| 7,545,429 B2 | 6/2009 | Travis |
| 7,547,467 B2 | 6/2009 | Olson et al. |
| 7,548,291 B2 | 6/2009 | Lee et al. |
| 7,551,354 B2 | 6/2009 | Horsten et al. |
| 7,561,181 B2 | 7/2009 | Schofield et al. |
| 7,562,985 B2 | 7/2009 | Cortenraad et al. |
| 7,567,291 B2 | 7/2009 | Bechtel et al. |
| 7,571,038 B2 | 8/2009 | Butler et al. |
| 7,571,042 B2 | 8/2009 | Taylor et al. |
| 7,572,017 B2 | 8/2009 | Varaprasad et al. |
| 7,572,490 B2 | 8/2009 | Park et al. |
| 7,579,939 B2 | 8/2009 | Schofield et al. |
| 7,579,940 B2 | 8/2009 | Schofield et al. |
| 7,580,795 B2 | 8/2009 | McCarthy et al. |
| 7,581,859 B2 | 9/2009 | Lynam |
| 7,581,867 B2 | 9/2009 | Lee et al. |
| 7,583,184 B2 | 9/2009 | Schofield et al. |
| 7,586,566 B2 | 9/2009 | Nelson et al. |
| 7,586,666 B2 | 9/2009 | McCabe et al. |
| 7,589,883 B2 | 9/2009 | Varaprasad et al. |
| 7,589,893 B2 | 9/2009 | Rottcher |
| 7,600,878 B2 | 10/2009 | Blank et al. |
| 7,605,883 B2 | 10/2009 | Yamaki et al. |
| 7,619,508 B2 | 11/2009 | Lynam et al. |
| 7,623,202 B2 | 11/2009 | Araki et al. |
| 7,626,749 B2 | 12/2009 | Baur et al. |
| 7,629,996 B2 | 12/2009 | Rademacher et al. |
| 7,633,567 B2 | 12/2009 | Yamada et al. |
| 7,636,188 B2 | 12/2009 | Baur et al. |
| 7,636,195 B2 | 12/2009 | Nieuwkerk et al. |
| 7,636,930 B2 | 12/2009 | Chang |
| 7,643,200 B2 | 1/2010 | Varaprasad et al. |
| 7,643,927 B2 | 1/2010 | Hils |
| 7,651,228 B2 | 1/2010 | Skiver et al. |
| 7,658,521 B2 | 2/2010 | DeLine et al. |
| 7,663,798 B2 | 2/2010 | Tonar et al. |
| 7,667,579 B2 | 2/2010 | DeLine et al. |
| 7,670,016 B2 | 3/2010 | Weller et al. |
| 7,688,495 B2 | 3/2010 | Tonar et al. |
| 7,695,174 B2 | 4/2010 | Takayanagi et al. |
| 7,696,964 B2 | 4/2010 | Lankhorst et al. |
| 7,706,046 B2 | 4/2010 | Bauer et al. |
| 7,710,631 B2 | 5/2010 | McCabe et al. |
| 7,711,479 B2 | 5/2010 | Taylor et al. |
| 7,724,434 B2 | 5/2010 | Cross et al. |
| 7,726,822 B2 | 6/2010 | Blank et al. |
| 7,728,276 B2 | 6/2010 | Drummond et al. |
| 7,728,721 B2 | 6/2010 | Schofield et al. |
| 7,728,927 B2 | 6/2010 | Nieuwkerk et al. |
| 7,731,403 B2 | 6/2010 | Lynam et al. |
| 7,734,392 B2 | 6/2010 | Schofield et al. |
| 7,742,864 B2 | 6/2010 | Sekiguchi |
| 7,746,534 B2 | 6/2010 | Tonar et al. |
| 7,771,061 B2 | 8/2010 | Varaprasad et al. |
| 7,787,077 B2 | 8/2010 | Kondoh et al. |
| 7,791,694 B2 | 9/2010 | Molsen et al. |
| 7,795,675 B2 | 9/2010 | Darwish et al. |
| 7,815,326 B2 | 10/2010 | Blank et al. |
| 7,821,697 B2 | 10/2010 | Varaprasad et al. |
| 7,822,543 B2 | 10/2010 | Taylor et al. |
| 7,826,123 B2 | 11/2010 | McCabe et al. |
| 7,830,583 B2 | 11/2010 | Neuman et al. |
| 7,832,882 B2 | 11/2010 | Weller et al. |
| 7,842,154 B2 | 11/2010 | Lynam |
| 7,854,514 B2 | 12/2010 | Conner et al. |
| 7,855,755 B2 | 12/2010 | Weller et al. |
| 7,859,565 B2 | 12/2010 | Schofield et al. |
| 7,859,737 B2 | 12/2010 | McCabe et al. |
| 7,864,398 B2 | 1/2011 | Dozeman et al. |
| 7,864,399 B2 | 1/2011 | McCabe et al. |
| 7,871,169 B2 | 1/2011 | Varaprasad et al. |
| 7,873,593 B2 | 1/2011 | Schofield et al. |
| 7,888,629 B2 | 2/2011 | Heslin et al. |
| 7,898,398 B2 | 3/2011 | DeLine et al. |
| 7,898,719 B2 | 3/2011 | Schofield et al. |

| | | |
|---|---|---|
| 7,903,324 B2 | 3/2011 | Kobayashi et al. |
| 7,903,335 B2 | 3/2011 | Nieuwkerk et al. |
| 7,906,756 B2 | 3/2011 | Drummond et al. |
| 7,911,547 B2 | 3/2011 | Brott et al. |
| 7,914,188 B2 | 3/2011 | DeLine et al. |
| 7,916,009 B2 | 3/2011 | Schofield et al. |
| 7,916,380 B2 | 3/2011 | Tonar et al. |
| 7,918,570 B2 | 4/2011 | Weller et al. |
| 7,926,960 B2 | 4/2011 | Skiver et al. |
| 7,937,667 B2 | 5/2011 | Kramer et al. |
| 7,965,336 B2 | 6/2011 | Bingle et al. |
| 7,965,357 B2 | 6/2011 | Van De Witte et al. |
| 7,980,711 B2 | 7/2011 | Takayanagi et al. |
| 7,994,471 B2 | 8/2011 | Heslin et al. |
| 8,000,894 B2 | 8/2011 | Taylor et al. |
| 8,004,768 B2 | 8/2011 | Takayanagi et al. |
| 8,019,505 B2 | 9/2011 | Schofield et al. |
| 8,027,691 B2 | 9/2011 | Bernas et al. |
| 8,031,225 B2 | 10/2011 | Watanabe et al. |
| 8,040,376 B2 | 10/2011 | Yamada et al. |
| 8,044,776 B2 | 10/2011 | Schofield et al. |
| 8,047,667 B2 | 11/2011 | Weller et al. |
| 8,049,640 B2 | 11/2011 | Uken et al. |
| 8,063,753 B2 | 11/2011 | Deline et al. |
| 8,072,318 B2 | 12/2011 | Lynam et al. |
| 8,083,386 B2 | 12/2011 | Lynam |
| 8,094,002 B2 | 1/2012 | Schofield et al. |
| 8,095,260 B1 | 1/2012 | Schofield et al. |
| 8,095,310 B2 | 1/2012 | Taylor et al. |
| 8,100,568 B2 | 1/2012 | Deline et al. |
| 8,106,347 B2 | 1/2012 | Drummond et al. |
| 8,121,787 B2 | 2/2012 | Taylor et al. |
| 8,134,117 B2 | 3/2012 | Heslin et al. |
| 8,144,033 B2 | 3/2012 | Chinomi et al. |
| 8,154,418 B2 | 4/2012 | Peterson et al. |
| 8,162,493 B2 | 4/2012 | Skiver et al. |
| 8,164,817 B2 | 4/2012 | Varaprasad et al. |
| 8,169,307 B2 | 5/2012 | Nakamura et al. |
| 8,177,376 B2 | 5/2012 | Weller et al. |
| 8,179,236 B2 | 5/2012 | Weller et al. |
| 8,179,437 B2 | 5/2012 | Schofield et al. |
| 8,179,586 B2 | 5/2012 | Schofield et al. |
| 8,194,132 B2 | 6/2012 | Dayan et al. |
| 8,194,133 B2 | 6/2012 | De Wind et al. |
| 8,217,887 B2 | 7/2012 | Sangam et al. |
| 8,228,588 B2 | 7/2012 | McCabe et al. |
| 8,237,909 B2 | 8/2012 | Ostreko et al. |
| 8,282,224 B2 | 10/2012 | Anderson et al. |
| 8,294,975 B2 | 10/2012 | Varaprasad et al. |
| 8,304,711 B2 | 11/2012 | Drummond et al. |
| 2001/0026316 A1 | 10/2001 | Senatore |
| 2001/0035853 A1 | 11/2001 | Hoelen et al. |
| 2002/0049535 A1 | 4/2002 | Rigo et al. |
| 2002/0085155 A1 | 7/2002 | Arikawa |
| 2002/0092958 A1 | 7/2002 | Lusk |
| 2002/0118321 A1 | 8/2002 | Ge |
| 2002/0133144 A1 | 9/2002 | Chan et al. |
| 2002/0149727 A1 | 10/2002 | Wang |
| 2002/0154007 A1 | 10/2002 | Yang |
| 2003/0002165 A1 | 1/2003 | Mathias et al. |
| 2003/0007261 A1 | 1/2003 | Hutzel et al. |
| 2003/0030724 A1 | 2/2003 | Okamoto |
| 2003/0069690 A1 | 4/2003 | Correia et al. |
| 2003/0090568 A1 | 5/2003 | Pico |
| 2003/0090569 A1 | 5/2003 | Poechmueller |
| 2003/0098908 A1 | 5/2003 | Misaiji et al. |
| 2003/0103142 A1 | 6/2003 | Hitomi et al. |
| 2003/0122929 A1 | 7/2003 | Minaudo et al. |
| 2003/0133014 A1 | 7/2003 | Mendoza |
| 2003/0137586 A1 | 7/2003 | Lewellen |
| 2003/0156193 A1 | 8/2003 | Nakamura |
| 2003/0169158 A1 | 9/2003 | Paul, Jr. |
| 2003/0179293 A1 | 9/2003 | Oizumi |
| 2003/0202096 A1 | 10/2003 | Kim |
| 2003/0206256 A1 | 11/2003 | Drain et al. |
| 2003/0214576 A1 | 11/2003 | Koga |
| 2003/0214584 A1 | 11/2003 | Ross, Jr. |
| 2003/0227546 A1 | 12/2003 | Hilborn et al. |
| 2004/0004541 A1 | 1/2004 | Hong |
| 2004/0027695 A1 | 2/2004 | Lin |
| 2004/0036768 A1 | 2/2004 | Green |
| 2004/0080404 A1 | 4/2004 | White |
| 2004/0239243 A1 | 12/2004 | Roberts et al. |
| 2004/0239849 A1 | 12/2004 | Wang |
| 2005/0018738 A1 | 1/2005 | Duan et al. |
| 2005/0024591 A1 | 2/2005 | Lian et al. |
| 2005/0117095 A1 | 6/2005 | Ma |
| 2005/0168995 A1 | 8/2005 | Kittelmann et al. |
| 2005/0237440 A1 | 10/2005 | Sugimura et al. |
| 2005/0270766 A1 | 12/2005 | Kung et al. |
| 2006/0001641 A1 | 1/2006 | Degwekar et al. |
| 2006/0050018 A1 | 3/2006 | Hutzel et al. |
| 2006/0061008 A1 | 3/2006 | Karner et al. |
| 2006/0076860 A1 | 4/2006 | Hoss |
| 2006/0139953 A1 | 6/2006 | Chou et al. |
| 2006/0187378 A1 | 8/2006 | Bong et al. |
| 2006/0279522 A1 | 12/2006 | Kurihara |
| 2007/0064108 A1 | 3/2007 | Haler |
| 2007/0080585 A1 | 4/2007 | Lyu |
| 2007/0086097 A1 | 4/2007 | Motomiya et al. |
| 2007/0183037 A1 | 8/2007 | De Boer et al. |
| 2007/0262732 A1 | 11/2007 | Shen |
| 2008/0042938 A1 | 2/2008 | Cok |
| 2008/0068520 A1 | 3/2008 | Minikey et al. |
| 2009/0002491 A1 | 1/2009 | Haler |
| 2009/0040778 A1 | 2/2009 | Takayanagi et al. |
| 2009/0052003 A1 | 2/2009 | Schofield et al. |
| 2009/0096937 A1 | 4/2009 | Bauer et al. |
| 2009/0201137 A1 | 8/2009 | Weller et al. |
| 2009/0258221 A1 | 10/2009 | Diehl et al. |
| 2009/0262192 A1 | 10/2009 | Schofield et al. |
| 2009/0296190 A1 | 12/2009 | Anderson et al. |
| 2010/0045899 A1 | 2/2010 | Ockerse |
| 2010/0195226 A1 | 8/2010 | Heslin et al. |
| 2010/0245701 A1 | 9/2010 | Sato et al. |
| 2010/0246017 A1 | 9/2010 | Tonar et al. |
| 2010/0277786 A1 | 11/2010 | Anderson et al. |
| 2010/0289995 A1 | 11/2010 | Hwang et al. |

FOREIGN PATENT DOCUMENTS

| | | |
|---|---|---|
| AU | A-40317/95 | 2/1995 |
| CN | 1189224 | 7/1998 |
| DE | 941408 | 4/1956 |
| DE | 944531 | 7/1956 |
| DE | 7323996 | 11/1973 |
| DE | 2808260 | 8/1979 |
| DE | 3248511 A1 | 7/1984 |
| DE | 3301945 | 7/1984 |
| DE | 3614882 | 11/1987 |
| DE | 3720848 | 1/1989 |
| DE | 9306989.8 U1 | 7/1993 |
| DE | 4329983 | 8/1995 |
| DE | 4444443 A1 | 6/1996 |
| DE | 29703084 U1 | 6/1997 |
| DE | 29805142 U1 | 5/1998 |
| DE | 19741896 | 4/1999 |
| DE | 19755008 | 7/1999 |
| DE | 29902344 U1 | 7/1999 |
| DE | 19934999 | 2/2001 |
| DE | 19943355 | 3/2001 |
| DE | 20118868 | 3/2002 |
| DE | 10131459 | 1/2003 |
| DE | 102005000650 | 7/2006 |
| EP | 0299509 A2 | 1/1989 |
| EP | 0513476 A1 | 11/1992 |
| EP | 0524766 | 1/1993 |
| EP | 0729864 A1 | 12/1995 |
| EP | 0728618 A2 | 8/1996 |
| EP | 0825477 | 2/1998 |
| EP | 0830985 | 3/1998 |
| EP | 0928723 A2 | 7/1999 |
| EP | 937601 A2 | 8/1999 |
| EP | 1075986 | 2/2001 |
| EP | 1097848 A | 5/2001 |
| EP | 1152285 A2 | 11/2001 |
| EP | 1193773 | 3/2002 |
| EP | 1256833 | 11/2002 |
| EP | 0899157 | 10/2004 |

| | | |
|---|---|---|
| EP | 1315639 | 2/2006 |
| FR | 1021987 A | 2/1953 |
| FR | 1461419 | 12/1966 |
| FR | 2585991 | 2/1987 |
| FR | 2672857 A1 | 8/1992 |
| FR | 2673499 A1 | 9/1992 |
| FR | 2759045 | 8/1998 |
| GB | 810010 | 3/1959 |
| GB | 934037 | 8/1963 |
| GB | 1008411 | 10/1965 |
| GB | 1136134 | 12/1968 |
| GB | 1553376 | 9/1979 |
| GB | 2137573 A | 10/1984 |
| GB | 2161440 | 1/1986 |
| GB | 2192370 | 1/1988 |
| GB | 2222991 | 3/1990 |
| GB | 2255539 A | 11/1992 |
| GB | 2351055 A | 12/2000 |
| GB | 2362494 | 11/2001 |
| JP | 50-000638 A | 1/1975 |
| JP | 52-146988 | 11/1977 |
| JP | 55-039843 | 3/1980 |
| JP | 57-30639 | 2/1982 |
| JP | 57-102602 | 6/1982 |
| JP | 57-208530 | 12/1982 |
| JP | 58-020954 | 2/1983 |
| JP | 58-030729 | 2/1983 |
| JP | 58-110334 | 6/1983 |
| JP | 58-180347 | 10/1983 |
| JP | 58-209635 | 12/1983 |
| JP | 59-114139 | 7/1984 |
| JP | 60-212730 | 10/1985 |
| JP | 60-261275 | 12/1985 |
| JP | 61-127186 | 6/1986 |
| JP | 61-260217 | 11/1986 |
| JP | 62-043543 | 2/1987 |
| JP | 62-075619 | 4/1987 |
| JP | 62-122487 | 6/1987 |
| JP | 62-131232 | 6/1987 |
| JP | 63-02753 | 1/1988 |
| JP | 63-085525 | 4/1988 |
| JP | 63-106730 | 5/1988 |
| JP | 63-106731 | 5/1988 |
| JP | 63-274286 | 11/1988 |
| JP | 64-14700 | 1/1989 |
| JP | 01-123587 | 5/1989 |
| JP | 01-130578 | 5/1989 |
| JP | 02-122844 | 10/1990 |
| JP | 03-028947 | 3/1991 |
| JP | 03-28947 | 3/1991 |
| JP | 03-052097 | 3/1991 |
| JP | 30-061192 | 3/1991 |
| JP | 03-110855 | 5/1991 |
| JP | 03-198026 | 8/1991 |
| JP | 03-243914 | 10/1991 |
| JP | 04-114587 | 4/1992 |
| JP | 04-245886 | 9/1992 |
| JP | 05-080716 | 4/1993 |
| JP | 05-183194 | 7/1993 |
| JP | 05-213113 | 8/1993 |
| JP | 05-257142 | 10/1993 |
| JP | 60-80953 A | 3/1994 |
| JP | 61-07035 A | 4/1994 |
| JP | 62-27318 A | 8/1994 |
| JP | 06-318734 | 11/1994 |
| JP | 07-146467 | 6/1995 |
| JP | 07-175035 | 7/1995 |
| JP | 07-191311 | 7/1995 |
| JP | 07-266928 | 10/1995 |
| JP | 07-267002 | 10/1995 |
| JP | 07-277072 | 10/1995 |
| JP | 07-281150 | 10/1995 |
| JP | 07-281185 | 10/1995 |
| JP | 08-008083 | 1/1996 |
| JP | 08-083581 | 3/1996 |
| JP | 08-216789 | 8/1996 |
| JP | 08-227769 | 9/1996 |
| JP | 09-033886 | 2/1997 |
| JP | 09-260074 | 3/1997 |
| JP | 05-077657 | 7/1997 |
| JP | 09-220976 | 8/1997 |
| JP | 09-230827 | 9/1997 |
| JP | 09-266078 | 10/1997 |
| JP | 09-288262 | 11/1997 |
| JP | 10-076880 | 3/1998 |
| JP | 10-190960 | 7/1998 |
| JP | 10-199480 | 7/1998 |
| JP | 10-206643 | 8/1998 |
| JP | 10-221692 | 8/1998 |
| JP | 10-239659 | 9/1998 |
| JP | 10-276298 | 10/1998 |
| JP | 11-038381 | 2/1999 |
| JP | 11-067485 | 3/1999 |
| JP | 11-078693 | 3/1999 |
| JP | 11-109337 | 4/1999 |
| JP | 11-160539 | 6/1999 |
| JP | 11-212073 | 8/1999 |
| JP | 11-283759 | 10/1999 |
| JP | 11-298058 | 10/1999 |
| JP | 11-305197 | 11/1999 |
| JP | 2000-131681 | 5/2000 |
| JP | 2000-153736 | 6/2000 |
| JP | 2000-159014 | 6/2000 |
| JP | 2000-255321 | 9/2000 |
| JP | 2000-330107 | 11/2000 |
| JP | 2001-083509 | 3/2001 |
| JP | 2001-097116 | 4/2001 |
| JP | 2001-222005 | 8/2001 |
| JP | 2002-072901 | 3/2002 |
| JP | 2002-120649 | 4/2002 |
| JP | 2002-122860 | 4/2002 |
| JP | 2002-162626 | 6/2002 |
| JP | 2002-352611 | 12/2002 |
| JP | 2003-182454 | 3/2003 |
| JP | 2003-267129 | 9/2003 |
| JP | 2004-182156 | 7/2004 |
| JP | 2005-148119 | 6/2005 |
| JP | 2005-280526 | 10/2005 |
| JP | 2005-327600 | 11/2005 |
| JP | 38-46073 | 11/2006 |
| JP | 2008-083657 | 4/2008 |
| KR | 20060038856 | 5/2006 |
| KR | 100663930 | 1/2007 |
| WO | WO 82/02448 | 7/1982 |
| WO | WO 86/06179 | 10/1986 |
| WO | WO 94/19212 | 9/1994 |
| WO | WO 96/21581 | 7/1996 |
| WO | WO 98/14974 | 4/1998 |
| WO | WO 98/38547 | 9/1998 |
| WO | WO 99/15360 | 4/1999 |
| WO | WO 00/23826 | 4/2000 |
| WO | WO 00/52661 | 9/2000 |
| WO | WO 00/55685 | 9/2000 |
| WO | WO 01/01192 | 1/2001 |
| WO | WO 02/18174 | 3/2002 |
| WO | WO 02/49881 | 6/2002 |
| WO | WO 03/021343 | 3/2003 |
| WO | WO 03/078941 | 9/2003 |

OTHER PUBLICATIONS

Stewart, James W.; HP SnapLED: LED Assemblies for Automotive Signal Applications; Nov. 1, 1998; Hewlett-Packard Journal; vol. 50, No. 1, www.hpl.hp.com/hpjournal/98nov/nov98al.pdf.

Edgar, Julian; Goodbye 12 Volts . . . Hello 42 Volts!; Oct. 5, 1999; Autospeed 50; Issue 50; www.autospeed.co.nz/cros/A_0319/article.html.

Kobe, Gerry; 42 Volts Goes Underhood; Mar. 2000; Automotive Industries; Cahners Publishing Company; www.findarticles.com/p/articles/mi_m3012/is_3_180/ai_61361677.

Jewett, Dale; Aug. 2000; Automotive Industries; Cahners Publishing Company; www.findarticles.com/p/articles/mi_m3012/is_8_180ai_64341779.

National Semiconductor, LM78S40, Universal Switching Regulator Subsystem, National Semiconductor Corporation, Apr. 1996, p. 6.

Dana H. Ballard and Christopher M. Brown, Computer Vision, Prentice-Hall, Englewood Cliffs, New Jersey, 5 pages, 1982.

G. Wang, D. Renshaw, P.B. Denyer and M. Lu, CMOS Video Cameras, article, 1991, 4 pages, University of Edinburgh, UK.

International Search Report dated Oct. 6, 2003, 1 page, received from the International Searching Authority in connection with International Application No. PCT/US03/17804.

European Supplementary Search Report dated Mar. 7, 2008, 2 pages, received from the European Patent Office in connection with European Patent Application No. 03736877.6.

\* cited by examiner

*Primary Examiner* — Euncha Cherry

(74) *Attorney, Agent, or Firm* — Gardner, Linn, Burkhart & Flory, LLP

(57) ABSTRACT

An interior rearview mirror system for a vehicle includes an interior rearview mirror assembly having compass circuitry having a multi-axis sensor and associated circuitry. At least a portion of the compass circuitry is established on a semiconductor substrate using CMOS technology. The multi-axis sensor comprises at least first and second magnetoresponsive sensing elements. The magnetoresponsive sensing elements may be disposed in the mirror casing and move in tandem with the mirror casing and the reflective element when the mirror casing is adjusted by the driver of the vehicle. Processing of an algorithm by a microprocessor of the interior rearview mirror system determines a directional heading of the equipped vehicle responsive to a sensing of a magnetic field by the magnetoresponsive sensing elements and automatically compensates for a deviating magnetic field. An information display may display the directional heading of the equipped vehicle.

50 Claims, 5 Drawing Sheets

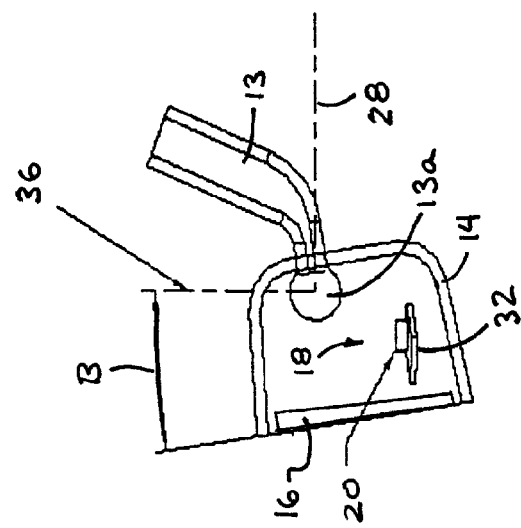
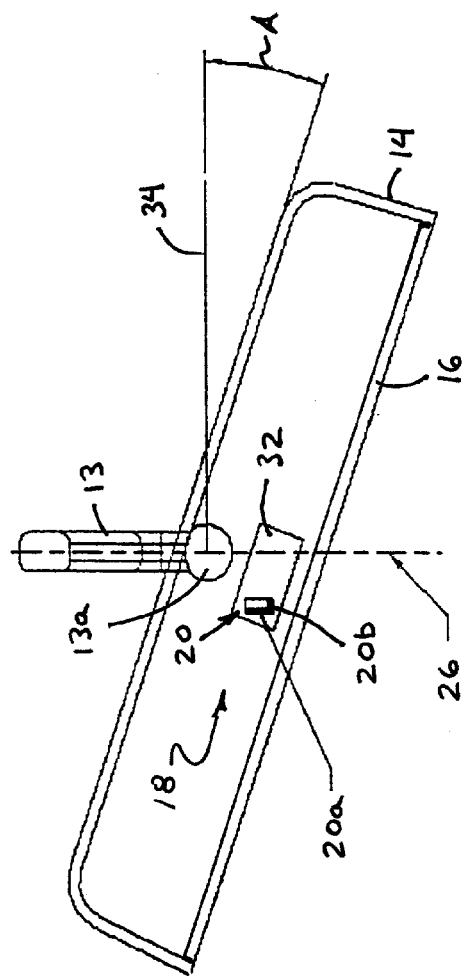

INTERIOR REARVIEW MIRROR SYSTEM

CROSS REFERENCE TO RELATED APPLICATIONS

The present application is a continuation of U.S. patent application Ser. No. 12/906,519, filed Oct. 18, 2010, now U.S. Pat. No. 8,282,226, which is a continuation of U.S. patent application Ser. No. 12/766,160, filed Apr. 23, 2010, now U.S. Pat. No. 7,815,326, which is a continuation of U.S. patent application Ser. No. 12/575,726, filed Oct. 8, 2009, now U.S. Pat. No. 7,726,822, which is a continuation of U.S. patent application Ser. No. 12/370,043, filed Feb. 12, 2009, now U.S. Pat. No. 7,600,878, which is a continuation of U.S. patent application Ser. No. 12/029,073, filed Feb. 11, 2008, now U.S. Pat. No. 7,490,944, which is a continuation of U.S. patent application Ser. No. 11/305,637, filed Dec. 16, 2005, now U.S. Pat. No. 7,329,013, which claims benefit of U.S. provisional application Ser. No. 60/636,931, filed Dec. 17, 2004, and U.S. patent application Ser. No. 11/305,637 is a continuation-in-part of U.S. patent application Ser. No. 10/456,599, filed Jun. 6, 2003, now U.S. Pat. No. 7,004,593, which claims the benefit of U.S. provisional applications, Ser. No. 60/420,010, filed Oct. 21, 2002; Ser. No. 60/398,240, filed Jul. 24, 2002; and Ser. No. 60/386,373, filed Jun. 6, 2002, which are all hereby incorporated herein by reference in their entireties; and U.S. patent application Ser. No. 12/906,519 is also a continuation-in-part of U.S. patent application Ser. No. 11/226,628, filed Sep. 14, 2005, abandoned, which claims the benefit of U.S. provisional applications, Ser. No. 60/692,113, filed Jun. 20, 2005; Ser. No. 60/677,990, filed May 5, 2005; Ser. No. 60/653,787, filed Feb. 17, 2005; Ser. No. 60/642,227, filed Jan. 7, 2005; Ser. No. 60/638,250, filed Dec. 21, 2004; Ser. No. 60/624,091, filed Nov. 1, 2004, and Ser. No. 60/609,642, filed Sep. 14, 2004.

FIELD OF THE INVENTION

The present invention relates generally to interior rearview mirror assemblies for vehicles and, more particularly, to an interior rearview mirror assembly which includes a compass system.

BACKGROUND OF THE INVENTION

Interior rearview mirror assemblies which include a directional or compass display are known, such as the types disclosed in U.S. Pat. No. 5,802,727, which is hereby incorporated herein by reference. Typically, such mirror assemblies include a compass sensor, such as a magnetoresistive sensor, a magnetocapacitive sensor, a magnetoinductive sensor, a Hall effect sensor, or a flux gate sensor or the like, which is fixedly attached to the mirror mount that attaches the mirror assembly to a mirror assembly mounting element, such as a conventional mounting button mounted on an interior surface of the windshield of the vehicle. The mirror assemblies also include processing circuitry and a compass information display, typically included in the interior mirror casing (that includes the mirror reflector) which is pivotally adjustable by the driver to suit his or her rearward field of view.

Predominantly, compass mirror assemblies in the market today involve the fixed placement of the compass sensor (and any locally associated sensor circuitry), such as at the mirror mount where the mirror attaches to the windshield or headliner of the vehicle. The compass system typically involves a cable/harness connection to the processing circuitry (which is typically in the pivotable housing of the mirror assembly), which may include the compass compensation circuitry and the like, which feeds or connects to a display (such as a vacuum fluorescent (VF) display or the like) that is typically included in the adjustable mirror casing (such as behind the reflective element so as to display from behind and through the reflective element, or at an eyebrow or chin region of the bezel area of the mirror casing). The display then typically displays an output of the directional heading of the vehicle to the driver or passenger of the vehicle, such as an eight point display, such as N, S, E, W, NE, NW, SE, SW, or the like.

It has been proposed in the art to mount the compass sensor within the movable housing of the rearview mirror assembly. Processes have also been proposed to compensate for movement of the sensor during normal use of the mirror, such as when the mirror head or casing is adjusted by the driver. Such proposed systems, such as described in U.S. Pat. Nos. 6,140,933 and 6,023,229, which are hereby incorporated herein by reference, are often implemented with a specially adapted single ball mount or single pivot mirror assembly. Such compass mirror assemblies can be costly and often involve special tooling and complicated adaptation of the mirror assembly itself and the casing of the mirror assembly. Also, such compass systems as described in the patents referenced above are not readily adapted for use with double ball or double pivot mirror assemblies. Other compass systems and compass compensation systems, such as the types described in U.S. Pat. Nos. 4,581,827; 5,339,529; 5,455,716; 5,699,044; 5,737,226; and 5,808,197, and/or in PCT Publication No. WO 2004/076971 A2, published Sep. 10, 2004; and/or in PCT Publication No. WO 2003/044540, published May 30, 2003; and/or in PCT Publication No. WO 2003/074969, published Sep. 12, 2003 (which are all hereby incorporated herein by reference), may be implemented in interior rearview mirror assemblies, but may be costly and difficult to implement within the movable mirror head of an interior rearview mirror assembly with a single or double ball mounting arrangement.

Therefore, there is a need in the art for an interior rearview mirror assembly having a compass system associated therewith that overcomes the shortcomings of the prior art.

SUMMARY OF THE INVENTION

The present invention is intended to provide an interior rearview mirror system which includes a compass system having a display which indicates the general direction in which the vehicle is traveling.

According to an aspect of the present invention, a mirror and compass system includes an interior rearview mirror assembly having a reflective element and a casing that are adjustable relative to a mounting structure. A compass sensor having at least two magnetoresponsive sensing elements is positioned within the mirror casing and at a position and orientation that reduces the effect of adjustment of the mirror on the compass sensor output.

The compass sensor is preferably positioned at a generally central location of the mirror and at or near the centerline of the mirror head. Preferably, the compass sensor is positioned at or near a lower region of the mirror casing to position the sensor remotely from the roof of the vehicle and any wiring or lights or the like that may be positioned at the roof of the vehicle, in order to reduce the effect of such items on the compass sensor performance.

Preferably, the compass sensor is oriented such that one of the sensing elements is generally along a longitudinal axis of the vehicle and the other sensing element is generally along a cross car axis of the vehicle when the mirror is oriented at a typical in-use position (such as at an angle of about 20 degrees rotation toward the driver side and at an angle of about 9 degrees tilt downward). Optionally, the system may determine when a prismatic mirror is flipped or toggled between the daytime and nighttime orientations and may compensate or adjust the processing of the compass sensor output to compensate for the known movement (such as about 4½ degrees upward or downward) of the mirror head/reflective element and compass sensor.

Optionally, the compass sensor may be positioned in close proximity to the mirror ball of the mounting arm (the ball that is received in the socket at the mirror casing or reflective element or toggle portion of the mirror assembly) so as to reduce movement of the compass sensor when the mirror is adjusted, in order to reduce the effects of mirror adjustment on the compass sensor performance. Optionally, the compass sensor may be generally fixedly positioned relative to the mirror ball of the mounting arm so that the compass sensor is generally fixed and do not move during adjustments of the mirror head/reflective element when the driver grasps and moves the mirror head/reflective element to adjust to his or her preferred field of view rearward through the rear window of the vehicle.

Optionally, the mirror and compass system may operate to enter a rapid compensating and aggressive calibration mode in response to a detection of an abrupt movement of the mirror head and compass sensor. The system may determine when such an abrupt movement is indicative of a mirror adjustment (such as an adjustment between the daytime and nighttime orientations for a prismatic mirror or an adjustment of the mirror by a person who has just entered the vehicle or started the vehicle ignition), and then may enter the aggressive calibration mode in response to such a determination. The system thus may discern, such as algorithmically via software and/or aided via a movement/mechanical adjust detector/sensor element, between a change in sensor output that is indicative of a mirror adjustment and a change in sensor output that is indicative of a change in vehicle direction and may enter the aggressive calibration mode when the change in sensor output is indicative of a mirror adjustment. Such a mirror adjustment typically occurs rapidly (such as in less than one second) and has a predictable range and/or direction, so that the compass system can discern when a change in sensor output is indicative of a mirror adjustment versus a detection of a magnetic field anomaly or the like or versus a change in directional heading of the vehicle.

According to another aspect of the present invention, an interior rearview mirror system for a vehicle includes an interior rearview mirror assembly, a casing having a reflective element, a compass sensor and a control. The casing is adjustable relative to a mounting structure that mounts the interior rearview mirror assembly to an interior portion of the vehicle. The compass sensor has a first magnetoresponsive sensing element and a second magnetoresponsive sensing element. The compass sensor is disposed within the mirror casing. The control receives a first signal indicative of a magnetic field sensed by the first magnetoresponsive sensing element and receives a second signal indicative of a magnetic field sensed by the second magnetoresponsive sensing element. The control determines a directional heading of the vehicle based on the first and second signals. The control automatically compensates for a deviating magnetic field of the vehicle and generates a signal indicative of the directional heading of the vehicle. The control determines that the casing is adjusted by an occupant of the vehicle in response to a change in the first and second signals being indicative of an abrupt movement of the casing about the mounting structure by an occupant of the vehicle (such as when the driver or occupant of the vehicle adjusts the mirror reflective element to provide a desired reflector rearward field of view). The control is operable to enter a rapid compensating mode to compensate for the mirror adjustment in response to the control determining that the casing is adjusted by an occupant of the vehicle.

According to another aspect of the present invention, an interior rearview mirror system for a vehicle includes an interior rearview mirror assembly, a casing having a reflective element, a compass sensor and a control. The casing is adjustable relative to a mounting structure that mounts the interior rearview mirror assembly to an interior portion of the vehicle. The compass sensor has a first magnetoresponsive sensing element and a second magnetoresponsive sensing element. The compass sensor is disposed within the mirror casing. The control receives a first signal indicative of a magnetic field sensed by the first magnetoresponsive sensing element and a second signal indicative of a magnetic field sensed by the second magnetoresponsive sensing element. The control determines a directional heading of the vehicle based on the first and second signals and automatically compensates for a deviating magnetic field of the vehicle and generates a signal indicative of the directional heading of the vehicle. The control is operable to enter a rapid compensating mode in response to an ignition cycle of the vehicle. The control automatically exits the rapid compensating mode and enters a less aggressive calibration mode that distinguishes the Earth's magnetic field from magnetic anomalies and non-abrupt changes in the vehicle magnetic signature. The control automatically exits the rapid compensating mode after a predetermined period of time has elapsed since the ignition cycle.

Therefore, the present invention provides a mirror and compass system that positions the compass sensor within the movable head portion of the mirror assembly. The compass sensor is positioned in a manner that reduces the effects of mirror adjustment on the sensor performance. The system may adjust processing in response to known movements of the mirror head to compensate for such known movements. The system may enter an aggressive calibration mode to calibrate the compass sensor when the mirror has been adjusted by a user. The compass system may distinguish between the anomaly signature or pattern and the mirror adjustment signature or pattern and may enter the calibration mode when the mirror adjustment is detected.

These and other objects, advantages, purposes and features of the present invention will become apparent upon review of the following specification in conjunction with the drawings.

BRIEF DESCRIPTION OF THE DRAWINGS

FIG. 4 is a top plan view of the interior rearview mirror assembly of the present invention;

FIG. 5 is a sectional view of the interior rearview mirror assembly of FIG. 4;

DESCRIPTION OF THE PREFERRED EMBODIMENTS

Figure 1:
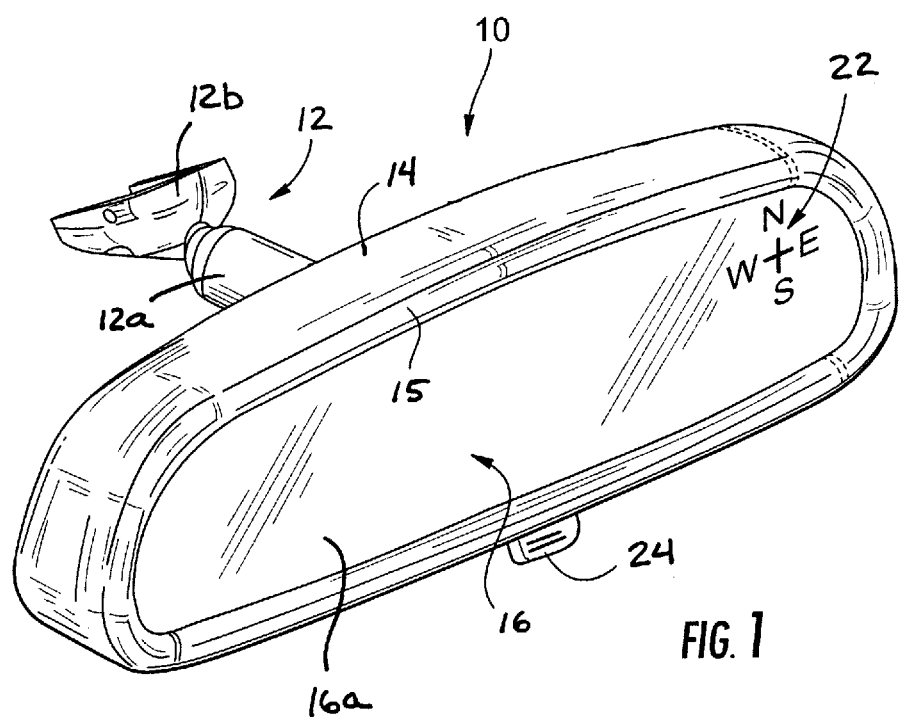
FIG. 1 is a forward facing elevation of an interior rearview mirror assembly in accordance with the present invention, as facing forward with respect to a direction of travel of a vehicle.
Figure 3:
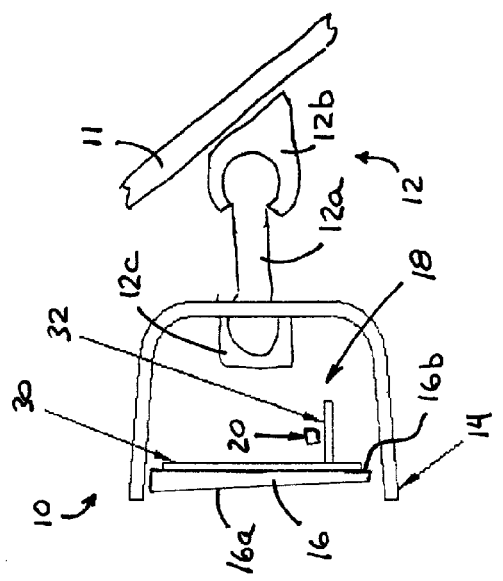
FIG. 3 is a sectional view of the interior rearview mirror assembly taken along the line III-III in FIG. 2.
Figure 2:
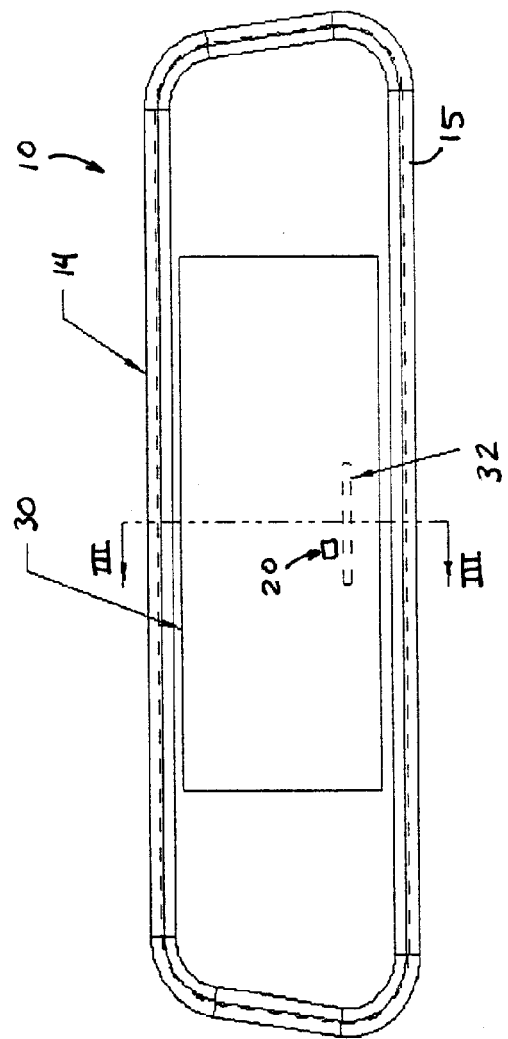
FIG. 2 is a forward facing elevation of a interior rearview mirror assembly of the present invention.

Referring now to the drawings and the illustrative embodiments depicted therein, a compassized prismatic interior rearview mirror assembly or system 10 includes a double pivot or double ball mounting arrangement 12 for pivotally or adjustably mounting a casing 14, bezel portion 15 and prismatic reflective element 16 of mirror assembly 10 relative to an interior portion of a vehicle, such as to an interior surface of a windshield 11 of a vehicle or the like (FIGS. 1-3). The mirror assembly 10 includes a compass system 18, which includes a magnetoresponsive compass sensor 20 and a display 22 for providing a display or indication of the directional heading of the vehicle, such as at the reflective element 16 of the mirror.

The mirror casing or housing 14 may comprise a polypropylene material or the like and is adjustably mounted to a mirror mount (not shown) positioned at an interior portion of a vehicle, such as a mirror mounting button on a windshield of the vehicle or any other mounting member at the windshield or at a headliner or overhead console of the vehicle or the like. The mirror housing may be adjustably mounted at the vehicle via connection to a single or double ball mounting arrangement, or via connection to any other mounting arrangement, without affecting the scope of the present invention. The mirror housing 14 may then pivot or actuate around one or more ball and socket joints or connections to be adjusted relative to the interior portion of the vehicle to a desired orientation by the driver of the vehicle.

As shown in FIGS. 1 and 3, the double ball or double pivot mirror mounting arrangement 12 includes a mounting arm 12a which is pivotally mounted at opposite ends to a mirror mount 12b (mounted at the windshield or headliner of the vehicle, such as at a mounting button at the interior surface of the vehicle) and a mirror casing mount 12c. Examples of double pivot or double ball mounting arrangements are described in commonly assigned U.S. Pat. Nos. 4,646,210 and 6,331,066, which are hereby incorporated herein by reference. Preferably, the mirror mounting components provide a breakaway type connection or mount, such as the types disclosed in U.S. Pat. Nos. 6,774,810; 6,642,851; 6,483,438; 6,366,213; 6,326,900; 6,222,460; 6,172,613; 6,087,953; 5,820,097; 5,377,949; and/or 5,330,149, which are hereby incorporated herein by reference. Optionally, the mirror assembly may incorporate a mounting arrangement of the types described in U.S. provisional applications, Ser. No. 60/692,113, filed Jun. 20, 2005; Ser. No. 60/677,990, filed May 5, 2005; Ser. No. 60/653,787, filed Feb. 17, 2005; Ser. No. 60/642,227, filed Jan. 7, 2005; Ser. No. 60/638,250, filed Dec. 21, 2004; Ser. No. 60/624,091, filed Nov. 1, 2004, and Ser. No. 60/609,642, filed Sep. 14, 2004; and Ser. No. 60/729,430, filed Oct. 21, 2005; and/or PCT Application No. PCT/US04/015424, filed May 18, 2004 and published Dec. 2, 2004 as International Publication No. WO 2004/103772; and U.S. patent application Ser. No. 10/933,842, filed Sep. 3, 2004, now U.S. Pat. No. 7,249,860; and/or Ser. No. 11/226,628, filed Sep. 14, 2005 and published Mar. 23, 2006 as U.S. Publication No. US 2006-0061008, which are hereby incorporated by reference herein. Optionally, and as shown in FIGS. 3-5, the mounting arrangement may comprise a single ball mounting arrangement, without affecting the scope of the present invention.

In the illustrated embodiment, the reflective element 16 comprises a prismatic reflective element. The prismatic interior rearview mirror assembly may comprise any type of prismatic interior rearview mirror assembly, such as the types described in U.S. Pat. Nos. 6,318,870; 6,598,980; 5,327,288; 4,948,242; 4,826,289; 4,436,371; and 4,435,042; and PCT Application No. PCT/US2004/015424, filed May 18, 2004 and published Dec. 2, 2004 as International Publication No. WO 2004/103772; and U.S. patent application Ser. No. 10/933,842, filed Sep. 3, 2004, now U.S. Pat. No. 7,249,860, which are hereby incorporated herein by reference. Optionally, the prismatic reflective element may comprise a conventional prismatic reflective element or prism or may comprise a prismatic reflective element of the types described in U.S. patent application Ser. No. 10/528,269, filed Mar. 17, 2005, now U.S. Pat. No. 7,274,501; Ser. No. 10/709,434, filed May 5, 2004, now U.S. Pat. No. 7,420,756; Ser. No. 10/933,842, filed Sep. 3, 2004, now U.S. Pat. No. 7,249,860; Ser. No. 11/021,065, filed Dec. 23, 2004, now U.S. Pat. No. 7,255,451; and/or Ser. No. 10/993,302, filed Nov. 19, 2004, now U.S. Pat. No. 7,338,177; and/or PCT Application No. PCT/US03/29776, filed Sep. 19, 2003 and published Apr. 1, 2004 as International Publication No. WO 2004/026633; and/or PCT Application No. PCT/US2004/015424, filed May 18, 2004 and published Dec. 2, 2004, as International Publication No. WO 2004/103772; and U.S. provisional application, Ser. No. 60/525,952, filed Nov. 26, 2003, which are all hereby incorporated herein by reference, without affecting the scope of the present invention. A variety of mirror accessories and constructions are known in the art, such as those disclosed in U.S. Pat. Nos. 5,555,136; 5,582,383; 5,680,263; 5,984,482; 6,227,675; 6,229,319; and 6,315,421 (the entire disclosures of which are hereby incorporated by reference herein), that can benefit from the present invention.

The prismatic reflective element 16 may be formed from various materials such as plastic or glass, but preferably is glass, and preferably has a planar front surface 16a extending at an angle to a planar rear surface 16b (FIG. 3). Rear surface 16b is preferably coated with a reflective layer of metal such as chromium, aluminum or alloys thereof as is conventionally known in the industry. The mirror casing 14 is pivotable relative to mounting arm 12a and mirror mount 12b to pivot the reflective element 16 in order to reduce glare during nighttime conditions. When the mirror casing is pivoted (such as via adjustment or movement of a toggle tab or actuator 24) from a full reflectivity daytime position to a reduced reflectivity nighttime position, the reflective surface 16b is rotated or pivoted such that the uncoated front surface 16a of reflective element 16 is aligned for viewing by the vehicle driver instead of reflective surface 16b. Preferably, reflective surface 16b reflects at least about 60 percent to 95 percent of the light incident thereon, while the uncoated front surface 16a reflects about 4 percent of the light incident thereon, such that the reflective element significantly reduces glare from headlights or other bright lights rearward of the vehicle to the driver's eyes when pivoted to the nighttime position. Although shown and described as having a prismatic reflective element, it is envisioned that many aspects of the present invention may be equally suitable and applicable to electro-optic or electrochromic interior rearview mirror assemblies having electro-optic or electrochromic reflective elements, such as described below.

As shown in FIGS. 4 and 5, when installed in the vehicle and adjusted for viewing by a typical sized driver, the reflective element 16 is angled approximately 20 to 22 degrees toward the driver side (from a longitudinal axis 26 of the vehicle) and approximately 9 degrees downward (from a generally horizontal plane 28) toward the floor of the vehicle. This is the nominal or typical position of the reflective element when set to the daytime orientation. When the toggle 24 is flipped to set the reflective element to the nighttime orientation, the mirror head (including the reflective element and casing and circuit board and circuitry) is pivoted about 4½ degrees or thereabouts upward or downward. Typically, prism flip angles range from about 3½ degrees to about 5 degrees, and most typically are about 4¼ to about 4½ degrees.

The compass sensor 20 of compass system 18 functions to detect a directional heading of the vehicle relative to the Earth's magnetic field, as is known in the art. The compass system and sensor may utilize aspects of the compass systems described in U.S. patent application Ser. No. 10/352,691, filed Jan. 28, 2003, now U.S. Pat. No. 6,922,902; Ser. No. 10/933,842, filed Sep. 3, 2004, now U.S. Pat. No. 7,249,860; and/or Ser. No. 10/456,599, filed Jun. 6, 2003, now U.S. Pat. No. 7,004,593, and/or U.S. Pat. Nos. 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252; and 6,642,851, and/or PCT Application No. PCT/US2004/015424, filed May 18, 2004 and published Dec. 2, 2004, as International Publication No. WO 2004/103772, and/or European patent application, published Oct. 11, 2000 under Publication No. EP 0 1043566, and/or Ser. No. 11/226,628, filed Sep. 14, 2005 and published Mar. 23, 2006 as U.S. Publication No. US 2006-0061008; U.S. provisional applications, Ser. No. 60/624,091, filed Nov. 1, 2004; and/or Ser. No. 60/630,061, filed Nov. 22, 2004, which are all hereby incorporated herein by reference. The compass circuitry may include the compass sensor, such as a magneto-responsive sensor, such as a magneto-resistive sensor, such as the types disclosed in U.S. Pat. Nos. 5,255,442; 5,632,092; 5,802,727; 6,173,501; 6,427,349; and 6,513,252 (which are hereby incorporated herein by reference), a magneto-capacitive sensor, a Hall-effect sensor, such as the types described in U.S. Pat. Nos. 6,278,271; 5,942,895 and 6,184,679 (which are hereby incorporated herein by reference), a magneto-inductive sensor, such as described in U.S. Pat. No. 5,878,370 (which is hereby incorporated herein by reference), a magneto-impedance sensor, such as the types described in PCT Publication No. WO 2004/076971, published Sep. 10, 2004 (which is hereby incorporated herein by reference), or a flux-gate sensor or the like, and/or may comprise a compass chip, such as described in U.S. patent application Ser. No. 11/226,628, filed Sep. 14, 2005 and published Mar. 23, 2006 as U.S. Publication No. US 2006-0061008; and U.S. provisional applications, Ser. No. 60/624,091, filed Nov. 1, 2004; and/or Ser. No. 60/630,061, filed Nov. 22, 2004, which are hereby incorporated herein by reference.

The sensor circuitry and/or the circuitry in the mirror housing and associated with the compass sensor may include processing circuitry. For example, and as shown in FIGS. 1 and 2, compass system 18 may include a printed circuit board (PCB) 30, which may be mounted or positioned or bonded along the rear surface 16*b* of the reflective element 16. The printed circuit board 30 may include all of the processing circuitry and the compass sensor. The processing circuitry may include compensation methods, such as those described in U.S. Pat. Nos. 4,546,551; 5,699,044; 4,953,305; 5,255,442; 5,576,687; 5,632,092; 5,677,851; 5,708,410; 5,737,226; 5,802,727; 5,878,370; 6,087,953; 6,173,508; 6,222,460; 6,513,252; and 6,642,851, and U.S. patent application Ser. No. 10/352,691, filed Jan. 28, 2003, now U.S. Pat. No. 6,922,902; and Ser. No. 10/456,599, filed Jun. 6, 2003, now U.S. Pat. No. 7,004,593, and European patent application, published Oct. 11, 2000 under Publication No. EP 0 1043566, which are all hereby incorporated herein by reference. The compass sensor may be incorporated in or associated with a compass system and/or display system for displaying a directional heading of the vehicle to the driver, such as a compass system of the types described in U.S. Pat. Nos. 5,924,212; 4,862,594; 4,937,945; 5,131,154; 5,255,442; and/or 5,632,092, and/or U.S. patent application Ser. No. 10/456,599, filed Jun. 6, 2003, now U.S. Pat. No. 7,004,593, and/or Ser. No. 11/284,543, filed Nov. 22, 2005, now U.S. Pat. No. 7,370,983, and/or PCT Application No. PCT/US2004/015424, filed May 18, 2004 and published Dec. 2, 2004, as International Publication No. WO 2004/103772, and/or U.S. provisional applications, Ser. No. 60/630,061, filed Nov. 22, 2004; and/or Ser. No. 60/667,048, filed Mar. 31, 2005, which are all hereby incorporated herein by reference.

When an interior rearview mirror that includes a compass system (such as a known compass system) is first installed in a vehicle at a vehicle assembly plant (such as when the mirror assembly (including the compass sensor and circuitry) is attached to a mounting button at a vehicle windshield or other mounting portion at an interior portion of the vehicle) and first powered, known compass systems, which typically have the compass sensor fixedly mounted at the mirror foot or base or mount, include an initial calibration mode intended to allow the vehicle to be delivered from the assembly plant to an automobile dealership with the compass appropriately calibrated. Taking, for example, such a known interior mirror compass system currently supplied by the assignee to automakers, the compass system enters an aggressive calibration mode or rapid calibration/compensating mode (such as the Cal-1 mode as described in U.S. Pat. No. 6,513,252, and U.S. patent application Ser. No. 10/352,691, filed Jan. 28, 2003, now U.S. Pat. No. 6,922,902, which are hereby incorporated herein by reference) to calibrate the compass as the vehicle on the assembly line weaves and turns on the assembly conveyor line and as the vehicle is driven through the assembly plant and through the staging or storage lot and onto a truck for shipping to a dealer. In so doing, the assignee's compass system determines three cardinal points (other competitive compass systems require detection of all four cardinal (N, W, S, E) points) and then deduces the true directional heading of the vehicle, compensating for the magnetic deviation inherent in the vehicle. After the vehicle is shipped to a dealer and purchased, the compass system is calibrated and the correct heading is shown on the compass display typically provided at the mirror reflector or at the mirror bezel. After this initial Cal-1 or aggressive calibration has been completed, calibration and/or compensation for stray magnetic fields and other magnetic anomalies, such as typically encountered exterior the vehicle during driving (and from the likes of metal bridges, subway lines, cellular telephone towers, large metal structures and the like), are compensated for via other less aggressive calibration/compensation modes. Thus, for example, and referring to U.S. Pat. No. 6,513,252 and U.S. patent application Ser. No. 10/352,691, filed Jan. 28, 2003, now U.S. Pat. No. 6,922,902, and/or Ser. No. 10/456,599, filed Jun. 6, 2003, now U.S. Pat. No. 7,004,593, which are hereby incorporated herein by reference, the compass system may initially operate in the aggressive Cal-1 calibration mode, and then may later function in a less aggressive calibration/compensation mode, such as Cal-2 or Cal-3 calibration modes.

Using the compass system of the present invention, as the vehicle is typically driven on highways (and with the compass system of the present invention in its normal operating mode or non-calibration mode), the compass system is exposed to and may be affected by the various magnetic anomalies, such as from bridges, cell towers, and/or the like referenced above. Such magnetic anomalies, however, have a particular, and often predictable, anomaly signature and/or pattern. The magnetic anomalies may impact the compass system performance and may lead to temporary inaccurate compass readings and/or an erroneous compensation of the compass system, and thus lead to display of erroneous/inaccurate compass display headings.

The compass system of the present invention includes an algorithm expressed in software processed by a microprocessor that includes a mirror adjust detection routine. This mirror adjust detection routine takes advantage of the fact that magnetic anomalies/stray magnetic fields, which emanate from structures typically external to the vehicle as it passes by such structures and objects along a road or highway, are typically temporary and relatively short lived because of the speed of passage of the vehicle. The mirror adjust detection routine further takes account of the fact that mirror adjustments by a driver of a vehicle are relatively predictable events that occur abruptly and that remain adjusted typically for the duration of that particular journey. Thus, the mirror adjust detection routine of the present invention algorithmically reduces or prevents or suppresses confusion of a mirror adjust event from other stray magnetic field/magnetic anomaly effects that are external to the vehicle. For example, the compass system of the present invention (via software operated by a microprocessor of the control of the compass system) may distinguish and/or learn the pattern and signature of such stray magnetic fields/magnetic anomalies and may ignore such and/or avoid entering particular calibration mode or modes or portions of modes when such anomalies are detected and recognized/distinguished by the compass system.

Optionally, the compass sensing device or sensor 20 may comprise a two-axis sensor (comprising two magneto-responsive sensing elements disposed at a fixed angle relative to each other, such as orthogonally to each other, and disposed on a platform or circuit board or substrate 32 so that they are positioned generally parallel to the floor plane of the vehicle so as to be sensitive to the horizontal component of the Earth's magnetic field), or the sensor may comprise a three-axis sensor (comprising two magneto-responsive sensing elements disposed orthogonally to each other and disposed in the mirror casing cavity, and a third magneto-responsive sensing element, sometimes referred to as a z-axis sensing element, at a right angle (approximately ninety degrees) to the two sensing elements and disposed in the cavity, so that the three-axis sensor is sensitive to the horizontal component and to the vertical component of the Earth's magnetic field), without affecting the scope of the present invention. The third axis sensing element is an optional and not necessary addition to the sensor of the compass system of the present invention. However, the z-axis sensing element may be helpful in detecting and distinguishing magnetic anomalies exterior to the vehicle (as discussed above), but is not needed for the primary compass direction determination and/or the detection of a tilt or rotation of the mirror. The compass sensor may be arranged at a desired angle to provide enhanced sensing in the horizontal directions when the mirror assembly is installed in the vehicle, as discussed below.

In the illustrated embodiment of FIGS. 4 and 5, the compass sensor 20 includes a pair of sensing elements 20a, 20b positioned generally orthogonal to one another. The pair of generally orthogonal sensing elements are preferably oriented relative to the vehicle such that one of the sensing elements (20a) is generally parallel to the floor of the vehicle and pointing generally forwardly in the direction of travel of the vehicle, while the other sensing element (20b) is generally orthogonal or perpendicular to the first sensing element and preferably also generally parallel to the floor of the vehicle. The compass sensor provides an output signal to compass processing circuitry, which is operable to process the output signal to determine the vehicle heading and to actuate or control or adjust an output of the display in response to the output signal.

Optionally, and desirably, the compass sensor may be positioned at a compass sensor board or substrate 32 that may extend generally horizontally from the printed circuit board 30 at the rear of the reflective element 16. The compass sensor 20 may comprise a pair of generally orthogonal sensing elements and thus may provide a two axis sensing ability and function to provide direction sensing throughout the range of mirror adjustment with reduced or minimal impact on the accuracy of the directional sensing during such adjustment. The impact may be further reduced by various mounting arrangements or configurations and algorithms and the like, as discussed below.

As shown in FIGS. 2 and 4, the compass sensor is desirably positioned generally centrally from side to side within the mirror assembly, such as along a centerline of the mirror assembly or along the longitudinal axis 26, in order to reduce or minimize the affects or angular impact of the mirror adjustments on the compass sensor output. The compass sensor is also desirably positioned at or near a lower region of the circuit board and mirror assembly, so as to be positioned further from the upper sheet metal or roof of the vehicle and further from the overhead wiring or lighting, or other devices or systems that may provide dynamic magnetic disturbances, for enhanced performance of the compass sensor.

One of the sensing elements 20a of the compass sensor 20 is preferably oriented generally along or parallel to the longitudinal axis 26 of the vehicle and the other sensing element 20b is preferably oriented along or generally parallel to a lateral or cross-car axis 34 of the vehicle (in a side to side orientation and generally parallel to the vehicle floor), with the sensing elements being generally normal or at a right angle to one another. Optionally, and as shown in FIG. 4, the compass sensing elements 20a, 20b may be oriented relative to the mirror reflective element so that the sensing element 20a is generally parallel to the longitudinal axis 26 of the vehicle, while the other sensing element 20b is generally parallel to the lateral or cross-car axis 34 of the vehicle when the reflective element is angled or oriented at the typical viewing position. The orthogonally oriented compass sensing elements 20a, 20b are thus positioned at their optimal angle for the typical setting or position or orientation of the mirror assembly during typical use of the mirror assembly in the vehicle.

For example, and as shown in FIGS. 4 and 5, the reflective element is typically rotatably angled horizontally and sidewardly toward the driver at an angle A, which is typically about 20 degrees (for a typical driver) relative to the cross car axis, and the reflective element is typically tiltably angled vertically and downwardly at an angle B, which is typically about 9 degrees (for a typical driver) relative to a vertical plane 36. Because the mirror casing and reflective element may be pivoted to be angled generally toward the head of the driver of the vehicle, such as, for example, rotatably angled approximately 17-25 degrees toward the driver side of the vehicle and tiltably angled approximately 6 to 12 degrees downward, the compassized interior rearview mirror assembly of the present invention thus may be adapted to mount the compass sensor on a physical mount or tilt/rotation offset element at the printed circuit board which compensates for or approximates and effectively cancels the approximate angle of the mirror casing so as to orient the compass sensor generally in the desired orientation, even when the mirror casing and reflective element are angled toward the driver of the vehicle (such as described in U.S. patent application Ser. No. 10/456,599, filed Jun. 6, 2003, now U.S. Pat. No. 7,004,593, which is hereby incorporated herein by reference).

For example, a printed circuit board or equivalent may be positioned at and attached to the rear surface of the reflective element (the surface within the casing of the mirror assembly and facing away from the driver of the vehicle when the mirror assembly is installed in the vehicle), such as via adhesive or an attachment or backing plate or the like. The circuit board may comprise a generally flat, rectangular element or substrate with conductive traces and circuitry disposed thereon. When the mirror head and reflective element are arranged so that the reflective surface (the flat rear surface) of the reflective element is generally vertical, the circuit board is also generally vertically oriented. Where a compass sensor chip (which may include a pair of orthogonally oriented sensing elements arranged in a common plane) is disposed on and along the substrate or circuit board (PCB), the chip itself (and hence the sensing elements disposed therein) may be placed on the PCB in any orientation chosen by the PCB manufacturer. Thus, the compass sensor chip may be oriented such that the principal axis of one sensor is generally horizontal and toward a side of the vehicle, while the principal axis of the other sensor may be generally vertically oriented when the PCB is attached to a reflective element and the reflective element is generally vertically oriented. Thus, the actual placement of the compass chip itself thus may largely or substantially take care of or account for the rotational orientation of the mirror head.

Because it is desired to provide sensing in the x-y directions (or in a horizontal plane), the compass sensor is preferably disposed on a compass sensor mount or board that extends at an angle from the circuit board and/or rear surface of the reflective element so that the compass sensor elements are generally horizontal when the mirror assembly is installed in the vehicle at its nominal (such as about 20 degree sideward and 9 degree downward) orientation. Preferably, the compass sensor mount is mounted to the circuit board such that the compass sensor mount is oriented at about a 9 degree downward angle from being perpendicular or normal to the circuit board, such that the compass sensor mount or chip is substantially horizontal relative to the floor of the vehicle and thus the ground when the mirror head and reflective element are oriented at the typical or nominal orientation with about a 9 degree downward tilt toward the typical driver's head location. Likewise, the compass sensor is preferably mounted to the compass sensor mount at an angle so that the principal axes of the compass sensing elements are at a desired respective angle relative to the reflective element. For example, a first one of the sensing elements may be at an angle of about 20 degrees toward the driver side of the mirror assembly relative to the longitudinal axis of the vehicle, while a second sensing element may be generally orthogonal to the first sensing element and along the plane of the compass sensor mount. Thus, when the mirror head and reflective element are oriented at the typical or nominal orientation with about a 9 degree downward tilt and about a 20 degree sideward rotation toward the typical driver's head location, the sensing elements are oriented along a generally horizontal plane and are oriented such that the principal axis of the first sensing element is in the direction of travel of the vehicle, while the principal axis of the second sensing element is normal to the first principal axis and directed toward the side of the vehicle. The compass sensor mount may be mounted to the printed circuit board and/or the reflective element via a generally wedge-shaped mounting element or offset element (or via other mounting means) or the compass sensor itself may be attached to or mounted to the printed circuit board at the desired angle, such as via other mounting attachment means, to provide the desired orientation of the compass sensor relative to the reflective element. It is further envisioned that the tilt/rotation offset element may be otherwise formed (or the compass sensor may be otherwise mounted to the circuit board) to provide other offset angles depending on the particular application of the mirror assembly and the nominal orientation of the reflective element that directs the reflective element generally toward the location of a typical driver to provide the typical driver with the appropriate or desired field of view rearward and through the rear window of the vehicle.

Thus, by using the tilt/rotation offset element of the present invention, typically a plastic molding that, for example, attaches to the rear of the reflective element, an angled shelf or ledge is created upon which rests the compass sensor itself and/or its printed circuit board (PCB). Thus, when the interior rearview mirror assembly is installed in a vehicle, such as at the assembly plant (and adjusted at a generally nominal position for viewing by a driver, such that the algorithm can take over and generally or substantially calibrate the compass system as the vehicle is moved through the vehicle assembly plant), and/or is used by the average or typical driver, the tilt/rotation offset element compensates for the nominal 20 degree sideward rotation/9 degree downward tilt, such that the magneto-responsive sensing elements are oriented in the vehicle in which the mirror assembly is mounted with the principal axis of a first one of the magnetoresponsive sensing elements pointing directly forward through the windshield in the direction of travel of the vehicle, and with the principal axis of a second magnetoresponsive sensing element at 90 degrees relative thereto and pointed sidewardly toward a side of the vehicle, and with both the first and second principal axes/magnetoresponsive sensing elements lying in the same plane, and with that plane being generally horizontal with the floor of the vehicle and thus with the road being traveled. Thus, the tilt/rotation offset element and/or the physical tilt and rotation offset means (that may be tied to or separate from the offset element and/or sensor mount) of the present invention physically ensures that the compass sensor has at least two magnetoresponsive sensing elements oriented generally horizontal to the ground (with one facing forward of the vehicle and one facing orthogonally sideward). Thus, at the nominal (about 20 degree sideward/9 degree downward) mirror orientation or setting, the compass sensor is oriented in a known orientation relative to the Earth's horizontal magnetic field. The mirror adjust detection algorithm or routine of the present invention may reference against this as a base or reference orientation from which mirror/sensor adjustment is estimated and/or accommodated/compensated against.

Figure 6:
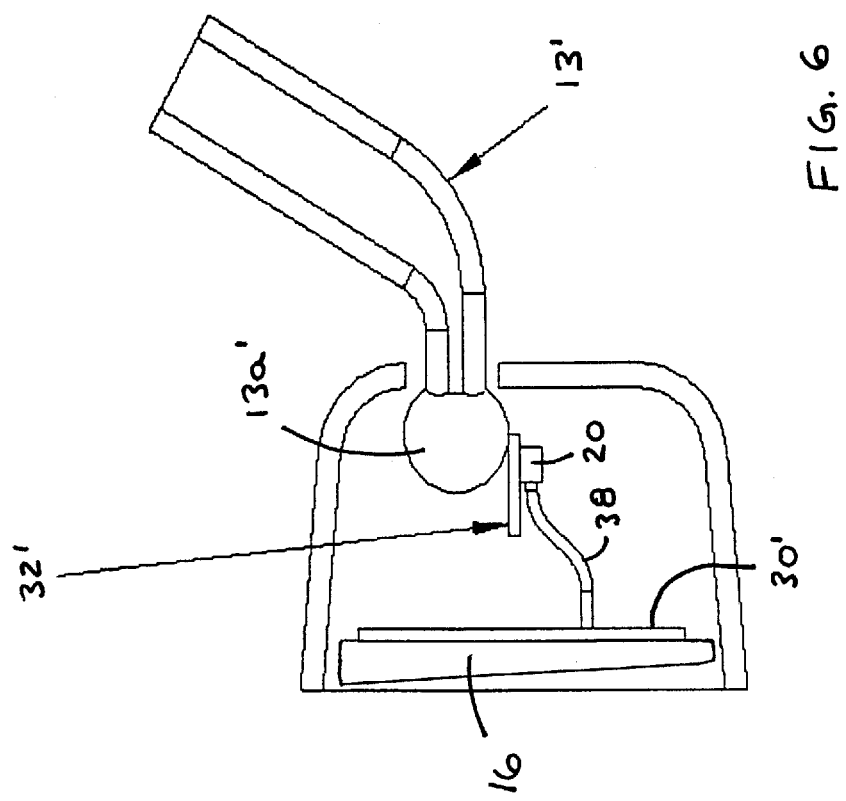
FIG. 6 is a sectional view of another interior rearview mirror assembly in accordance with the present invention.

Optionally, in order to reduce the affect of mirror adjustment on the compass sensor, the compass sensor may be mounted or positioned in close proximity to the mirror ball (the ball (referred to at 13*a* in FIG. 5) that is pivotally received at the mirror casing or toggle element of the mirror assembly). Optionally, the compass sensor may be fixedly positioned relative to the mirror ball (or may be mounted at the end of the mounting arm and mirror ball) so that there is reduced or little or no movement of the compass sensor during mirror adjustments of the reflective element, such as when the reflective element is toggled or flipped between the daytime and nighttime orientations. For example, and as shown in FIG. 6, the compass sensor may be disposed on a circuit board or platform 32' that is attached to a portion of the mirror ball 13*a'* of the mounting arm 13', such as at a lower portion of the ball (to position the sensors remote from the roof of the vehicle). An electrical connector or wire or lead 38 may connect the compass sensor to the circuitry and display elements at the circuit board 30' at the reflective element 16. As shown in FIG. 5, the mounting arm 13' is part of a single ball mounting arrangement, but may be a mounting arm of a double ball mounting arrangement, such as the type shown in FIGS. 1 and 3, without affecting the scope of the present invention.

Optionally, and as described in U.S. patent application Ser. No. 10/456,599, filed Jun. 6, 2003, now U.S. Pat. No. 7,004,593, which is hereby incorporated herein by reference, the printed circuit board 30 may be mounted at a physical mount at the reflective element to accommodate the approximate angle of the mirror casing. The physical mount may be a wedge shaped mounting element or bracket or any other means for orienting the compass sensor relative to the reflective element to accommodate for the typical angle of tilt of the mirror head toward a driver of a vehicle. The typical angle or tilt of the mirror head or casing may be calculated or otherwise determined or approximated and the physical mount may then be formed to compensate or cancel the typical angle of the mirror. The desired mounting orientation may vary depending on the particular vehicle in which the compassized mirror assembly is being installed, since the mirror assembly may be mounted at different heights along the windshield or at the headliner of different vehicle models. In lieu of a physical orientation as described above, software compensation, as known in the art, can be used to negate or cancel out the above effects.

Optionally, in applications where illumination sources or lights or any other electrically conducting/powered electrical accessory or the like may be sufficiently close to the compass sensor such that operation of the lights may impact the compass performance (due to the magnetic field generated by the current going through the lights), the lights may be controlled or modulated via a pulse width modulation (PWM) control, so that the lights are modulated between "on" and "off" settings by the PWM control. The PWM control may be optimized to minimize emissions and to maintain vehicle lighting requirements. The compass algorithm or control or microprocessor may monitor the PWM control and may enter a different operation mode when the lights are being PWM controlled. For example, the compass control may optimize the hardware for through put and may synchronize the light's PWM "off" time with the data collection by the compass sensors, in order to reduce or minimize the impact of the field generated by the current passing through the wires when the lights are on or energized. Preferably, the lighting requirements may be maintained while allowing sufficient time for the compass system signals to settle after the PWM signal for the light is shut down or off. The preferred or desirable settings may be selected based on a compromise between the emission of the illumination source or sources and the ability to successfully read the compass sensor signals or output at the desired accuracy.

As described above, adjustment of the mirror housing (that includes the mirror reflective element) about its pivot connection to its support (typically a double-ball support arm as described above, although a single-ball support arm can also be used, without affecting the scope of the present invention) to the windshield (or to a header region at the joint of the windshield and the roof of the interior cabin of the vehicle) can cause the compass direction sensing sensor attached to the rear of the mirror reflective element to also move. Thus, the compass control circuitry may detect a change in sensed compass directional signal (for example, about 3 degrees to about 8 degrees or thereabouts) when the mirror is adjusted by a driver of the vehicle. Should the vehicle be heading in a direction that is close to half-way between one octant or another in an eight-octant resolving compass display system, this adjustment by the driver of the mirror housing to set the rearward field of view of the mirror reflective element to suit that driver's needs/preference (typically occurring when the driver starts the journey) may cause the heading displayed to the driver to change from, for example, NW to N, because the adjustment by the driver of the mirror housing has changed the orientation/alignment of the magnetic field detecting elements of the compass sensor (for example, a magnetoresistive sensor or Hall effect sensor) relative to the Earth's magnetic field. Modern automatic automotive compass control systems, such as those described in U.S. Pat. Nos. 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; and 6,513,252, U.S. patent application Ser. No. 10/352,691, filed Jan. 28, 2003, now U.S. Pat. No. 6,922,902, and European patent application, published Oct. 11, 2000 under Publication No. EP 0 1043566, which are all hereby incorporated herein by reference, comprise processing circuitry that includes compensation methods that correct for such changes in sensed compass heading. Thus, and as indicated in U.S. Pat. No. 6,642,851, which is hereby incorporated herein by reference, such known compensation methods can be used to recalibrate the compass mirror system of the present invention after adjustment of the mirror housing by the driver.

Techniques and methods for compensating for such adjustments, such as suggested in U.S. Pat. No. 6,418,376 (the entire disclosure of which is hereby incorporated herein by reference), may be used in conjunction with the present invention. Such methods use a position sensor (such as a tilt sensor) that determines displacement of the mirror housing with respect to a generally horizontal plane. For example, the compass system of the present invention may incorporate a tilt sensor or position sensor or rotation sensor or sensing means or element (such as a tilt sensor, a clinometer or a protractor or the like) that is operable to detect the position or orientation or movement of the mirror and compass sensors relative to a generally horizontal plane and/or a generally vertical plane. For example, the compass system may incorporate an electronic tilt sensor or clinometer, such as the types commercially available from various sources, such as, for example, from Schaevitz® Sensors of Hampton, Va., such as an AccuStar® electronic clinometer or the like, and which may have a have a resolution of about 0.001 degrees and a range of about 60 degrees or thereabouts, and that may provide a analog, ratiometric, digital pulse width, or serial output. Optionally, for example, the compass system may incorporate an electrolytic tilt sensor, which includes electrically conductive fluid that remains substantially level as the sensor body is tilted, whereby the conductivity between a pair of electrodes within the sensor body is proportional to the length or amount of the electrode immersed in the conductive fluid, such that the degree of tilt may be determined. Such electrolytic tilt sensors are commercially available from various sources and may provide accurate pitch and roll measurements and enhanced repeatability, stability, and accuracy when operating at low frequencies. For example, a dual-axis, or 5-pin, sensor may be packaged in a cylindrical vial that stands between about ½ inch to about 1 inch high, and that provides an operating range of tilt from about ±10 degrees to about ±75 degrees. Optionally, the compass system may incorporate an AMR (anisotropic magnetoresistive) magnetic field sensor or the like, which may provide a tilt detection/ determination. Other tilt sensors, clinometers, protractors, electrolytic sensors and/or the like may be implemented with the compass system, without affecting the scope of the present invention.

Optionally, the mirror ball and/or mirror socket may include a transducer/sensor that may determine the orientation of the mirror ball relative to the mirror socket. As the ball rotates in the socket (such as due to adjustment of the mirror head/reflective element by the driver), the orientation of the ball relative to the socket is detected and transmitted or communicated to the control/microprocessor of the compass system. The compass system may then determine the angular adjustment and may adjust the sensor processing and/or compensate for the angular change in response to the detected angular change in the position/orientation of the mirror head relative to the ball of the mounting arm.

The control or circuitry or microprocessor may adjust the degree of compensation of the compass sensor output in response to the output or outputs of the position sensor/sensors. Optionally, other techniques, such as the techniques and methods described in U.S. Pat. Nos. 6,140,933 and 6,023,229, which are hereby incorporated herein by reference, may also or otherwise be implemented.

Optionally, a magnetic field emitter or radiator or generator may be placed in a known fixed location within the vehicle interior cabin (for example, the magnetic field emitter may be placed as part of the mirror foot or mount or base that fixedly attaches to the mirror mounting button or may be otherwise fixedly positioned relative to the vehicle). The magnetic field emitter may optionally be operated to emit a magnetic field in a pulsed and/or coded magnetic field signature. The magnetic field signature/signal emitted by the fixed magnetic field emitter or source will be picked up by the x-y orthogonally oriented magnetoresponsive sensing elements of the compass sensor (that are positioned within the movable mirror head and that move with the mirror head as it is pivoted about its single or double ball joint support), and thus that move relative to the fixed magnetic field emitter. Because the physical location of the fixed magnetic field emitter is known, the emitter can function as a homing beacon for the movable head/sensing elements, and thus a triangulation algorithm or the like can be used to determine the particular orientation of the sensing elements and any deviation from a known orientation. The compass sensor thus may detect the emitted magnetic field (such as when the emitter is pulsed) and the control or circuitry or microprocessor may process the compass sensor output (such as the output signal that corresponds to when the emitter is pulsed) to discern or distinguish the pulsed magnetic field or signature magnetic field as emitted by the fixed magnetic field emitter to determine the orientation of the mirror head and compass sensor relative to the fixed magnetic field emitter, and thus to determine the degree of adjustment of the mirror head or reflective element relative to the mounting base or known initial orientation or the like. The control may then adjust or alter the directional heading signal and/or the display output in response to the detection of a change in orientation or position of the mirror head relative to the fixed reference point.

Optionally, an algorithmic technique may be implemented whereby, when an abrupt change in detected heading is detected that is characteristic of an adjustment of the mirror housing by the driver of the vehicle, the automatic compass circuitry changes its calibration status from its ongoing state (that compensates for such heading changes over a prolonged period, and one that typically may span an ignition cycle of the vehicle or several vehicle ignition cycles) to a more aggressive, faster calibration stage (such as a Cal-1 or Cal-2 calibration mode as described in U.S. Pat. No. 6,513,252 and U.S. patent application Ser. No. 10/352,691, filed Jan. 28, 2003, now U.S. Pat. No. 6,922,902, which are hereby incorporated herein by reference) that more rapidly, and preferably within that same ignition cycle, recalibrates the compass system and so compensates for the driver's adjustment of the mirror housing/casing and for the concomitant movement of the compass sensor housed therein.

Thus, for example, when a change in compass heading is detected that is indicative of and characteristic of an adjustment of the mirror housing by the driver, such as to adjust the mirror to provide a desired rearward field of view (such adjustment causes an abnormal change of the compass output that is different, such as by magnitude and/or rate of change, than what would occur during normal driving), then the calibration changes to a faster or rapid or more aggressive compensation/calibration algorithm/method. Such mirror adjustments are typically within the range of plus or minus about 2 to 4 degrees upward or downward from the nominal downward angle (of about 9 degrees downward) of the mirror head/reflective element, and plus or minus about 3 to 5 degrees to either side from the nominal sideward angle (of about 20 degrees toward the driver side) of the mirror head/reflective element. Such mirror adjustments, which typically occur rapidly, such as within less than about one to two seconds or thereabouts, create their own known and predictable signature or pattern and thus may be detected and discerned by the compass system. Thus, and referring to U.S. Pat. No. 6,513,252 and U.S. patent application Ser. No. 10/352,691, filed Jan. 28, 2003, now U.S. Pat. No. 6,922,902, and/or Ser. No. 10/456,599, filed Jun. 6, 2003, now U.S. Pat. No. 7,004,593, which are hereby incorporated herein by reference, upon detection of a change in compass heading that is indicative of and characteristic of an adjustment of the mirror housing by the driver, the calibration of the compass system would reinitiate back from Cal-3 (or Cal-2) to the beginning of Cal-1. Note that a mechanical element such as a mechanical movement detector can be used to detect adjustment by the driver of the mirror housing, and the recalibration can be initiated in response to a signal output of such a mechanical element.

Desirably, if a mirror adjustment is detected that is beyond the normal range or zone of adjustment of the mirror (such as may occur if the passenger angles the mirror toward the passenger side to borrow the mirror or the mirror is otherwise rotated away from the driver, or such as may occur if the mirror is inadvertently hit or moved to a severely adjusted condition such that no reasonable driver would reasonably view rearwardly through the rear window with the mirror so adjusted), the compass system may detect and discern such egregious or non-normal movement/adjustment and may suspend the calibration activities because such movement/adjustment is an abnormal and typically temporary condition. The compass system may return to its normal and/or calibration mode of operation when the mirror head/reflective element is returned to within the normal range of angular adjustment/position/orientation, such as within a predetermined degree upward/downward and sideward of the nominal position/orientation.

For example, the compass compensation or calibration process may provide for initialization of a rapid or aggressive calibration stage in response to movement of the mirror housing by the driver grasping and moving the mirror head/reflective element to adjust to his or her preferred field of view rearward through the rear window of the vehicle. The compass circuitry may be operable to detect and discern or distinguish a change in the sensed heading which is characteristic of an adjustment of the mirror housing by a driver of the vehicle. The compass circuitry then may respond by reinitializing the compass calibration to the rapid or aggressive calibration stage or mode. The compass circuitry then may compensate for the movement of the compass sensor caused by the adjustment of the mirror housing via a microprocessor-based algorithm/software. After completion of the rapid calibration stage, such as after the compass sensor is re-calibrated or after a predetermined amount of time following the onset of the rapid or aggressive calibration stage, the compass circuitry may return to its normal operation.

Optionally, the compass circuitry/software can set or return to the beginning of the aggressive calibration stage (such as to the beginning of Cal-1 as described above) each time the mirror compass circuitry is initially powered, such as by a fresh ignition cycle of the vehicle. Thus, for example, should a driver or occupant of the vehicle adjust the interior rearview mirror orientation during the immediately previous ignition cycle, and thus potentially disturb the established proper compass calibration, then an aggressive and rapid recalibration may automatically occur at the start of the following or next ignition cycle (and thus any potential calibration misalignment may only be temporarily experienced by the driver). Optionally, such an aggressive recalibration may occur in response to actuation of a key fob or remote keyless entry device or remote starter device or the like.

Optionally, the degree of aggression of the rapid calibration stage may be effected by the time elapsed between the ignition activation (or actuation of the key fob or remote keyless entry device or the like) and the perceived or detected adjustment of the mirror. For example, if the circuitry detects an abrupt adjustment of the sensor orientation within a threshold time after the ignition is activated, then the control may determine that the change in orientation is due to a mirror adjustment (such as may occur when the driver first enters the vehicle and before or soon after shifting into drive or reverse) and thus may enter the rapid and aggressive calibration mode. Optionally, the microprocessor or control may include a first start protocol that causes the compass system to enter the aggressive calibration mode in response to the first ever startup of the vehicle ignition, such as typically occurs at the vehicle assembly plant.

Optionally, the compass system may acquire directional heading data at the activation of the ignition (or activation of a key fob or the like) and, if an adjustment of the mirror head is detected soon after such activation, the compass system may acquire heading data with the sensors at the new orientation. Because the initial heading data sampled after the ignition cycle may be correct data or may be indicative of the vehicle heading, the compass system may compensate or adjust the new data to account for the change in orientation of the compass sensor from the initial and adjusted position. The compass system thus may algorithmically adjust the compass heading or sensor processing to account for the perceived movement or adjustment of the mirror head without entering the aggressive calibration mode.

Optionally, the degree of aggression or entry into the rapid aggressive calibration mode may be affected by the speed of the vehicle when the change in orientation of the compass sensors is detected. For example, if an abrupt change in the orientation of the sensors is detected when the vehicle is stopped or moving at or below a threshold speed (such as at or below about 10 mph or thereabouts), the control may determine that the abrupt change may be due to an adjustment of the mirror head or reflective element, and thus may enter the rapid and aggressive calibration mode. Alternately, if the vehicle speed is detected (such as via a wheel speed sensor or the like) to be above a threshold speed (such as at or above about 60 mph or thereabouts), any change in the sensed direction may be determined to be a change in vehicle direction, since it is not likely that a driver would typically adjust the mirror position while driving at highway speeds.

Thus, when a mirror adjustment is detected that is within the expected range and/or time so as to be indicative of an adjustment of the mirror head/reflective element by the driver of the vehicle to adjust his or her field of view rearward through the rear window of the vehicle, the compass system of the present invention may enter the aggressive calibration mode and begin looking for cardinal directional headings (such as North, South, East or West), such as three or more of the cardinal directional points. The compass system may distinguish between deviations or signatures or patterns that are indicative of anomalies and signatures or patterns that are indicative of normal mirror adjustments by the driver and may enter the calibration mode when a mirror adjustment is detected.

The compass system may remain in the aggressive calibration mode for an aggressive calibration period. The aggressive calibration period may continue until, for example, the three cardinal points or more or less are detected so that the compass system is again considered recalibrated. Optionally, and desirably, the aggressive calibration period may terminate even if the compass system has not yet sensed three or more cardinal points, such as after a predetermined or threshold period of time has elapsed since detection of the adjustment, or after the ignition cycle is terminated or the ignition is turned off, and before detection of the third cardinal point, so that the compass system does not remain in the aggressive calibration mode for an excessive period of time. Because it is possible that the compass system may pick up an anomaly during the aggressive calibration mode (such as, for example, if the compass system detects the true North and West cardinal points, but detects an anomaly and erroneously considers the anomaly to be the East cardinal point), and thus may use the false signal and result in a premature exit of the calibration mode and an erroneous directional heading indication, it is desirable that the compass system return to the aggressive calibration mode at the onset of each ignition cycle, and/or the next ignition cycle following the detection of the mirror adjustment and aggressive calibration mode. Desirably, the compass system may initiate the aggressive calibration mode at the onset of each ignition cycle, and the compass system may remain in the aggressive calibration mode until three cardinal points (or more or less as desired) are detected or for a predetermined period of time following the ignition activation or when the ignition cycle is terminated.

Optionally, if an abrupt change upward or downward (or pivoting about a generally horizontal axis) is detected, the control circuitry may determine that such an adjustment is indicative of toggling or flipping the mirror reflective element between the daytime and nighttime orientations, and may account for the 4½ degree (or thereabouts, depending on the particular mirror application) change or adjustment via software compensation. Preferably, in such an embodiment, the nominal condition or orientation of the compass sensor is met when the mirror reflective element is at the daytime position or orientation. The determination of the downward or upward movement of the mirror assembly may be made irrespective of the vehicle speed, since such an adjustment (the flipping or toggling of the reflective element between the daytime and nighttime positions) may often occur while the driver is driving the vehicle at higher speeds.

The compass display 22 may provide a display region at the reflective element 16 which includes ports or portions, which may comprise icons, characters or letters or the like representative of only the cardinal directional points, such as, for example, the characters N, S, E, W, formed or etched in the reflective film coating of the reflective element (and forming a transparent window therein), such as via techniques such as disclosed in commonly assigned U.S. Pat. No. 4,882,565, issued to Gallmeyer on Nov. 21, 1989, and such as described in Ser. No. 10/456,599, filed Jun. 6, 2003, now U.S. Pat. No. 7,004,593. Optionally, however, reflective element may comprise a transflective or display on demand (DOD) reflective element, and the compass display may be a display on demand (DOD) type of display, such as disclosed in commonly assigned U.S. Pat. Nos. 6,690,268; 5,668,663 and 5,724,187, and U.S. patent application Ser. No. 10/054,633, filed Jan. 22, 2002, now U.S. Pat. No. 7,195,381, the entire disclosures of which are hereby incorporated by reference herein, without affecting the scope of the present invention.

The display may include a plurality of illumination sources, such as light emitting diodes and such as blue light emitting diodes, such as an OSRAM LBT673-M2N2-35 light emitting diode or the like, which are operable to illuminate one or more ports or regions or appropriate characters or letters (or through the transflective DOD reflective element) to indicate the direction in which the vehicle is driving, such as described in Ser. No. 10/456,599, filed Jun. 6, 2003, now U.S. Pat. No. 7,004,593. The display ports or characters of the display may include only the four cardinal directional points (such as, for example, the characters N, S, E, W) formed or etched in the reflective film coating of the reflective element (and forming a transparent window therein), or may include eight directional points, such as the four cardinal directional points and the four intercardinal points (such as, for example, the characters N, NE, E, SE, S, SW, W, NW), without affecting the scope of the present invention.

The reflective element 16 may also include a port or aperture or hole in the center area or region of the display area (or, as discussed above, may comprise a transflective or DOD reflective element) to accommodate a photo detector or sensor (not shown), such as a photo transistor, a photo resistor, a photo diode or the like, which may be operable to sense the ambient light levels surrounding the mirror assembly or the light from headlights of vehicles rearward of the subject vehicle. The photosensor may be positioned or mounted on the printed circuit board and may be positioned, aligned and directed to receive illumination through the aperture or hole in the reflective element coating at the display region or elsewhere on the reflective element or the casing (such as through an opening formed in a wall of the casing immediately adjacent to the location of the photosensor). The photo sensor may detect the ambient light levels generally surrounding the mirror assembly to provide for dimming of the output of the display in darkened lighting conditions, such as at nighttime conditions, in order to reduce the intensity of the display to reduce glare and distraction and annoyance to the driver of the vehicle. Optionally, such dimming of the display may be performed in response to an instrument panel dimming system of the vehicle, without affecting the scope of the present invention.

Optionally, the magnetoresponsive compass sensor or circuitry responsive to the Earth's magnetic field may be operable in conjunction with the global positioning system of the vehicle to provide directional heading data to the global positioning system, such as disclosed in U.S. patent application Ser. No. 10/422,378, filed Apr. 24, 2003, now U.S. Pat. No. 6,946,978, and/or Ser. No. 10/456,599, filed Jun. 6, 2003, now U.S. Pat. No. 7,004,593, which are hereby incorporated herein by reference. The compass sensor circuitry may provide such directional heading data to assist the global positioning system in maintaining tracking of the location of the vehicle, such as between waypoints or the like, when the satellite signal to the global positioning system is interrupted, such as may occur in cities between tall buildings (often referred to as "urban canyons") or the like. Other vehicle movement data may also be provided, such as vehicle speed data or vehicle odometer data or the like, to further assist in determining and tracking the location of the vehicle in situations where the satellite communication to the global positioning system of the vehicle may be temporarily interrupted or compromised. Optionally, an imaging system (such as described in U.S. patent application Ser. No. 10/422,378, filed Apr. 24, 2003, now U.S. Pat. No. 6,946,978, which is hereby incorporated herein by reference) may be used to further assist in determining and tracking the location of the vehicle in situations where the satellite communication to the global positioning system may be temporarily interrupted or compromised.

Optionally, the printed circuit board of the compass or mirror system (such as a printed circuit board of a compass module or pod or a printed circuit board of the mirror assembly) of the present invention may include another display element along or partially along an edge of the board and may include one or more user-actuatable controls or buttons near or adjacent to the display element. The display element may be any type of display, such as a vacuum fluorescent (VF) display, a light emitting diode (LED) display, an electroluminescent (EL) display, a liquid crystal display (LCD), a video screen display or the like, and may be operable to display various information (as discrete characters, icons or the like, or in a multi-pixel manner) to the driver of the vehicle, such as passenger side inflatable restraint (PSIR) information, tire pressure status, and/or the like. The buttons may be for actuating or controlling various accessories or controls or components associated with the vehicle, such as for a compass calibration setting or zone setting, a telematics actuation, a garage door opener, an electronic toll control (such as disclosed in U.S. Pat. No. 6,690,268, which is hereby incorporated herein by reference), and/or other accessories or systems or functions or the like, or may be for switching the display between various functions or modes, without affecting the scope of the present invention. The mirror casing may include appropriate openings, such that the display element is visible through one opening, while the buttons or controls may partially protrude through other corresponding openings when an appropriate circuit board is installed within the mirror casing.

Figure 7:
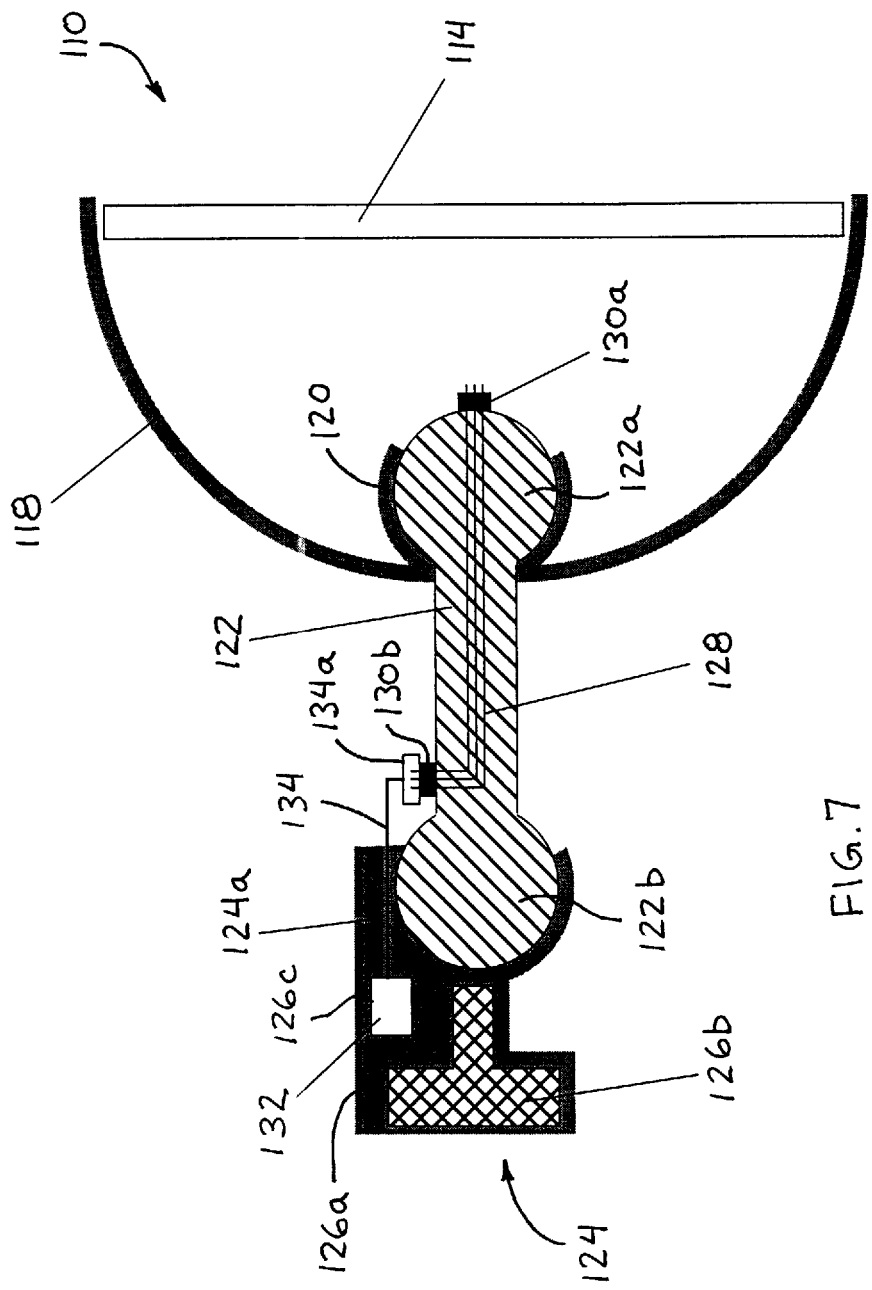
FIG. 7 is a sectional view of another interior rearview mirror assembly and mounting assembly in accordance with the present invention.

Optionally, the mirror assembly and/or a mounting base of the mirror mounting assembly may include or incorporate an electrical accessory or element or circuitry that may be electrically connected to a corresponding electrical accessory or element or circuitry within the mirror casing. For example, and with reference to FIG. 7, a mirror assembly 110 may include an essentially all-polymeric or plastic mounting assembly 112 having a mounting base 124 that houses or contains an electrical element or circuitry or sensor 132, such as a compass sensor, such as a magneto-responsive sensor, such as a magneto-resistive sensor, a magneto-capacitive sensor, a magneto-inductive sensor, a flux-gate sensor or a Hall-effect sensor or the like. The sensor 132 may be positioned at and within the molded base portion 126a so that the sensor is substantially fixedly positioned within the vehicle when the mounting base is attached to the mounting button or structure of the vehicle, such as described in U.S. patent application Ser. No. 11/226,628, filed Sep. 14, 2005 and published Mar. 23, 2006 as U.S. Publication No. US 2006-0061008, which is hereby incorporated herein by reference. The sensor 132 may include a lead or wire or wires 134 with a connector 134a, such as a multi-pin plug or socket or the like, at an end thereof for connecting to a corresponding connector or plug or socket 130b of electrical conductors 130 of support arm 122. The support arm 122 and electrical conductors 128, connectors 130a, 130b, mirror housing or casing 118 and socket 120 of mirror assembly 110 may utilize aspects of the mirror assemblies described in U.S. patent application Ser. No. 11/226,628, filed Sep. 14, 2005 and published Mar. 23, 2006 as U.S. Publication No. US 2006-0061008, which are hereby incorporated herein by reference.

Mounting base 124 may be molded or formed to define the base portion 126a and a socket portion 124a for receiving ball member 122b of support arm 122. The base portion 126a may be molded over and at least partially around a metallic insert 126b. Base portion 126a may be molded or formed with a cavity 126c and/or passageway for receiving the sensor or wire, or may be overmolded over and at least partially around the sensor and/or wire. The wire 134 comprises a flying lead or flexible lead that extends from the base portion 126a to the connector or terminals at the support arm 122, and includes sufficient slack or flexibility to accommodate pivotal movement or articulation of the support arm relative to the socket 124a of mounting base 124. The other connector 130a (at ball member 122a received in socket 120 (which may be formed at the casing or at a toggle member or attachment or back plate of the mirror)) may connect to a corresponding connector at a circuit board or electrical element or the like at the mirror casing, such as to circuitry on a circuit board at the reflective element or the like. The electrical element at or in the mirror casing may include controls or display circuitry and elements that are associated with or incorporated in a compass system and/or display system of the mirror assembly.

The accessory or sensor (or other electrical component or circuitry) thus may be positioned or located at or within the plastic molded mounting base of the mirror assembly. The accessory thus is positioned generally along the longitudinal axis of the mounting arm, and generally between the ball member 122b and the mounting base/mounting button at the windshield when the mirror assembly is installed in a vehicle, and not substantially above or below the mounting base (such as in a pod or gondola or module located above or below the mirror assembly) such as is typically done in known mirror assemblies. By positioning the accessory generally along the longitudinal axis of the support arm or generally along the z-axis (the axis along the vehicle and normal to the cross car or x-axis and the vertical or y-axis), the accessory is located generally between the windshield and the mirror casing and reflective element when the mirror assembly is installed in the vehicle, and does not extend substantially above or below or to either side of the mirror when the mirror assembly is installed in the vehicle. The mounting base thus may house or contain the accessory in a location that does not interfere with the forward field of view of the driver of the vehicle. The mirror assembly of the present invention thus may provide a fixed sensor with double ball movement or articulation, and with reduced interference with the forward field of view by the driver of the vehicle.

Optionally, the electrical accessory or circuitry housed or contained within the mounting base may comprise a compass sensor that is part of a compass system and/or display of the mirror assembly and/or vehicle. Note that the magneto-responsive sensor used with the mirror assembly may comprise a magneto-responsive sensor, such as a magneto-resistive sensor such as the types disclosed in U.S. Pat. Nos. 5,255,442; 5,632,092; 5,802,727; 6,173,501; 6,427,349; and 6,513,252 (which are hereby incorporated herein by reference), or a magneto-inductive sensor, such as described in U.S. Pat. No. 5,878,370 (which is hereby incorporated herein by reference), or a magneto-impedance sensor, such as the types described in PCT Publication No. WO 2004/076971 A2, published Sep. 10, 2004 (which is hereby incorporated herein by reference), or a Hall-effect sensor, such as the types described in U.S. Pat. Nos. 6,278,271; 5,942,895 and 6,184,679 (which are hereby incorporated herein by reference). The sensor circuitry and/or the circuitry in the mirror housing and associated with the sensor may include processing circuitry. For example, a printed circuit board may include processing circuitry which may include compensation methods such as those described in U.S. Pat. Nos. 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; and 6,642,851, which are all hereby incorporated herein by reference. The compass sensor may be incorporated in or associated with a compass system and/or display system for displaying a directional heading of the vehicle to the driver, such as a compass system of the types described in U.S. Pat. Nos. 5,924,212; 4,862,594; 4,937,945; 5,131,154; 5,255,442; and/or 5,632,092, and/or U.S. patent application Ser. No. 10/456,599, filed Jun. 6, 2003, now U.S. Pat. No. 7,004,593; and/or Ser. No. 11/029,695, filed Jan. 5, 2005, now U.S. Pat. No. 7,253,723, and/or PCT Application No. PCT/US2004/015424, filed May 18, 2004 and published Dec. 2, 2004, as International Publication No. WO 2004/103772, and/or U.S. provisional application, Ser. No. 60/636,931, filed Dec. 17, 2004, which are all hereby incorporated herein by reference.

Optionally, the sensor may comprise a two-axis sensor (comprising two magneto-responsive sensor elements disposed at a fixed angle relative to each other, such as, preferably, orthogonally to each other, and disposed in the cavity 126c generally parallel to the floor plane of the vehicle so as to be sensitive to the horizontal component of the Earth's magnetic field), or the sensor may comprise a three-axis sensor (comprising two magneto-responsive sensor elements disposed orthogonally to each other and disposed in the cavity, and a third magneto-responsive sensor element at a right angle (approximately ninety degrees) to the two sensor elements and disposed in the cavity, so that the three-axis sensor is sensitive to the horizontal component and to the vertical component of the Earth's magnetic field), without affecting the scope of the present invention. The sensor may be arranged at a desired angle to provide enhanced sensing in the horizontal directions when the mirror assembly is installed in the vehicle. For example, aspects of constructions such as are disclosed in U.S. Pat. Nos. 6,140,933 and 6,928,366, which are hereby incorporated herein by reference, may be utilized.

Optionally, an integrated automotive "compass-on-a-chip" may be disposed in the cavity of the mounting base and may comprise at least two magneto-responsive sensor elements (preferably Hall effect sensors established on the semiconductor substrate, preferably a silicon substrate, in the same VLSI chip/circuitry manufacturing process, using chip manufacturing processing means as known in the ASIC art), associated A/D and D/A converters, associated microprocessor(s) and memory, associated signal processing and filtering, associated display driver and associated LIN/CAN BUS interface and the like, all (or a sub-set thereof) created or disposed onto a semiconductor substrate, such as a silicon substrate (such as using CMOS technology), and constituting an ASIC chip, which is small (preferably less than approximately a two square centimeter area, more preferably less than approximately a 1.5 square centimeter area, and most preferably less than approximately a one square centimeter area or thereabouts) and readily packagable into the cavity. Thus, power (such as 12 volts or thereabouts, such as from the vehicle power source or the like) may be supplied to the ASIC chip and the ASIC chip may include all or substantially all of the circuitry for operation when the power source is connected to the ASIC chip.

Optionally, and preferably, such a compass-on-a-chip ASIC may also include the hardware and software required to receive an output from a temperature sensor (such as a thermocouple or thermostat that is located external the vehicle cabin in order to sense and monitor the temperature external to the vehicle) and to convert this signal to a reading in degrees Fahrenheit or Celsius, and to provide this reading via an on-chip temperature display driver and/or via a BUS protocol or via an on-chip wireless transmitter or the like to a digital or other type of temperature display so that the driver and/or occupants of the vehicle can view the temperature being measured (such as the temperature external the vehicle and/or the temperature within the vehicle cabin). Thus, for example, a monolithic compass/temp-on-a-chip ASIC may be disposed in the likes of a mirror mount or within the mirror head/housing of an interior rearview mirror assembly, and it may provide both the external temperature readout and a compass direction heading readout to an information display at the mirror head/housing (or elsewhere in the vehicle, such as the instrument panel/cluster or at an overhead console or accessory module or the like). Optionally, such a chip or circuit board or circuitry may also or otherwise comprise EC driver circuitry for controlling/driving an electro-optic or electrochromic reflective element or cell, such as by utilizing aspects of the EC driver-on-a-chip such as described in U.S. patent application Ser. No. 11/201,661, filed Aug. 11, 2005, now U.S. Pat. No. 7,480,149, which is hereby incorporated herein by reference.

Optionally, the compass ASIC chip and/or compass sensor may be disposed at or in an exterior rearview mirror assembly of the vehicle (which typically utilizes a plastic housing). Such a location may locate the compass chip and compass sensor outside of the magnetic anomalies of the vehicle and at a location where the compass sensor may be less susceptible to or less effected by the windshield wipers of the vehicle or other accessories or metal of the vehicle. Optionally, and regardless of whether the compass chip is located behind the mirror reflector element or at the mirror mount or at an exterior mirror assembly of the vehicle or elsewhere in the vehicle, the display associated with the compass chip may be located at the reflector element or elsewhere in the vehicle, such as at the mirror mount or at an accessory module or windshield electronics module or console or the like of the vehicle.

Optionally, the printed circuit board, or the mirror assembly (or the compass module or an accessory module associated with the mirror assembly), may include other accessories, such as an image sensor (such as a video camera, such as a CMOS imaging array sensor, a CCD sensor or the like, such as the types of imaging sensors or cameras disclosed in commonly assigned, U.S. Pat. Nos. 5,550,677; 6,097,023 and 5,796,094, and/or PCT Application No. PCT/US2003/036177, filed Nov. 14, 2003 and published Jun. 3, 2004 as International Publication No. WO 2004/047421, which are hereby incorporated herein by reference), a temperature sensor (such as a contact temperature sensor for measuring the temperature at or of the windshield), an antenna, or any other sensor or device. For example, the mirror assembly may include a forward facing video image sensor or system, which may include or may be associated with an intelligent rain sensor (such as the types disclosed in commonly assigned U.S. Pat. Nos. 6,320,176; 6,353,392 and 6,313,454, which are hereby incorporated herein by reference), an image or vision system (including an imaging sensor, such as a video camera, such as a CMOS imaging array sensor, a CCD sensor or the like, such as the types disclosed in commonly assigned, U.S. Pat. Nos. 5,550,677; 6,097,023 and 5,796,094, and U.S. patent application Ser. No. 10/422,378, filed Apr. 24, 2003, now U.S. Pat. No. 6,946,978, which are hereby incorporated herein by reference), such as an imaging or object detection system or back up aid of the types described in U.S. Pat. Nos. 6,757,109; 6,717,610; 6,590,719; 6,201,642; 5,929,786; and/or 5,786,772, and/or U.S. patent application Ser. No. 10/427,051, filed Apr. 30, 2003, now U.S. Pat. No. 7,038,577; and/or Ser. No. 11/239,980, filed Sep. 30, 2005, now U.S. Pat. No. 7,881,496, and/or U.S. provisional applications, Ser. No. 60/628,709, filed Nov. 17, 2004; Ser. No. 60/614,644, filed Sep. 30, 2004; and/or Ser. No. 60/618,686, filed Oct. 14, 2004, which are hereby incorporated herein by reference, or an intelligent headlamp controller (such as the types described in U.S. Pat. Nos. 5,796,094; 5,715,093; and/or 6,824,281, and/or in U.S. patent application Ser. No. 10/958,087, filed Oct. 4, 2004, now U.S. Pat. No. 7,188,963, and/or U.S. patent application Ser. No. 11/105,757, filed Apr. 14, 2005, now U.S. Pat. No. 7,526,103; and U.S. provisional applications, Ser. No. 60/607,963, filed Sep. 8, 2004; and Ser. No. 60/562,480, filed Apr. 15, 2004, which are hereby incorporated herein by reference), or an intelligent lane departure warning system (such as the types described in U.S. patent application Ser. No. 10/209,173, filed Jul. 31, 2001, now U.S. Pat. No. 6,882,287; and/or Ser. No. 10/427,051, filed Apr. 30, 2003, now U.S. Pat. No. 7,038,577, which are hereby incorporated herein by reference), or indicator/display for a blind spot indicator or object detection system, such as the types described in U.S. provisional application, Ser. No. 60/696,953, filed Jul. 6, 2005; and U.S. patent application Ser. No. 11/226,628, filed Sep. 14, 2005 and published Mar. 23, 2006 as U.S. Publication No. US 2006-0061008, which are hereby incorporated herein by reference, and/or the like. In applications where the mirror assembly includes or is associated with an automatic headlamp control system, it is envisioned that the display of the mirror system may include or provide a high beam/low beam indicator (such as an icon or indicia indicative of the high beams being activated, such as a blue headlamp indicia or the like) to indicate the status of the high beams of the vehicle to the driver or occupant of the vehicle.

Optionally, the mirror assembly or compass or accessory or electronic module of the present invention may include one or more displays, such as a text display, an icon display, a display on demand (DOD) type display (such as may be implemented with a transflective reflective element, such as described in U.S. Pat. Nos. 5,668,663; 5,724,187; and 6,690,268, the entire disclosures of which are hereby incorporated by reference herein), such as a video or touch screen interface display, or a video display screen, such as the types described in PCT Application No. PCT/US03/40611, filed Dec. 19, 2003 and published Jul. 15, 2004 as International Publication No. WO 2004/058540, and/or U.S. patent application Ser. No. 11/284,543, filed Nov. 22, 2005, now U.S. Pat. No. 7,370,983, and/or U.S. provisional applications, Ser. No. 60/630,061, filed Nov. 22, 2004; and Ser. No. 60/667,048, filed Mar. 31, 2005, which are hereby incorporated herein by reference, or the like, and/or one or more sensors or other accessories, such as a biometric imager, such as for fingerprint authentication or the like, an infrared sensor, such as a zonal temperature sensor, such as suitable for an auto climate control, a forward facing image sensor, such as described above, a rearward facing image sensor (such as for biometric imaging (such as for face recognition, iris recognition or the like), seat height or position detection, drowsiness detection, safety/restraints object detection and position, emergency response image capture system, intrusion detection or the like), an electromagnetic field sensor (such as the type disclosed in commonly assigned U.S. Pat. No. 6,768,420, which is hereby incorporated herein by reference).

Optionally, and for a mirror assembly having a slideout or extendable/retractable display, such as a video slideout display or the like (such as the types described in PCT Application No. PCT/US03/40611, filed Dec. 19, 2003 and published Jul. 15, 2004 as International Publication No. WO 2004/058540, and/or U.S. patent application Ser. No. 11/284,543, filed Nov. 22, 2005, now U.S. Pat. No. 7,370,983, and/or U.S. provisional applications, Ser. No. 60/630,061, filed Nov. 22, 2004; and Ser. No. 60/667,048, filed Mar. 31, 2005, which are hereby incorporated herein by reference), the display may be operable or activatable when in its retracted or partially retracted position so as to provide display information, such as directional heading information or temperature information or other vehicle information or the like, that is viewable through the reflective element when the display is at least partially retracted. As described in the above referenced applications, such a slideout display is extended to display information to the driver of the vehicle and may be retracted when such information is not being displayed. When retracted, the display typically is deactivated and located behind the mirror reflector. In such a retracted or partially retracted position, the display element or screen is positioned at least partially at the rear of the mirror reflector element with the display element or screen facing the rear surface of the mirror reflector element.

It is thus envisioned that the display element (such as a video display element or LCD element or the like) may be activated when it is retracted or at least partially retracted, so that the display information or illumination emitted by the display element may be projected through the transflective mirror reflector element for viewing at the mirror reflector element. For example, and for mirror assemblies having a transflective mirror reflector element, the opaque backing of the reflector element may have a window or aperture or display area formed therethrough so that at least a portion of the display element, when activated in its retracted or partially retracted position, is viewable through the transflective mirror reflector at the display area.

In such an embodiment, it is desirable that there be a close or substantial optical coupling between the front surface of the display element or screen (the surface facing generally toward the driver of the vehicle when the mirror assembly is mounted in the vehicle) and the rear surface of the mirror reflector element (the surface facing generally away from the driver of the vehicle when the mirror assembly is mounted in the vehicle). Preferably, the mirror assembly may include an opaquifying or shading cover or baffle element that covers the display area when the slideout display is extended or at least partially extended and not activated to provide display information at the display area. For example, an opaque shading element may move over the window area at the rear of the mirror reflector element to cover/shade/opaquify the window/display area so that the internal components of the mirror assembly are not viewable through the window/display area when the display element is moved at least partially toward its extended position.

Thus, for example, a video slideout interior rearview mirror assembly can be provided that, when the driver selects reverse gear, a back lit TFT LCD screen may extend at the passenger side to display an image of a scene occurring immediately to the rear of the vehicle (such as captured by a rear mounted camera) so that the driver may view the image during a reversing maneuver to assist in reversing the vehicle. Preferably, such a display may include a graphic overlay or other indicia or the like, such as described in U.S. patent application Ser. No. 11/284,543, filed Nov. 22, 2005, now U.S. Pat. No. 7,370,983, to assist the driver in making the reversing maneuver. Upon the disengagement of the reverse gear by the driver, the display slides in or retracts to its stowed position. When the driver is driving the vehicle forward along a road, a compass display is viewable to the driver when he or she looks at the mirror. The compass display may be derived from a compass-on-a-chip sensor that is preferably mounted within a mirror mount or alternatively within the mirror casing or elsewhere in the vehicle. The compass display at the mirror reflector or reflective element (such as a transflective electrochromic reflective element or a transflective prismatic reflective element or the like) is provided by the same TFT LCD display screen or display element that is now stowed behind the reflective element and is seen through the transflective reflective element. Thus, the utility and user appreciation of the slideout display is enhanced because, when the vehicle is reversing, the display can slideout or extend to show the reversing scene and, when the display is stowed, such as during normal driving conditions, the same display element is used to provide an information display at the mirror reflector.

The display and/or accessories may be associated with a communication system, a speaker, a telematics module (which may include a GPS module, a wireless communication module, an human/machine interface (HMI), a display, such as an LED display, a dot matrix display, an alpha numeric display, a video display or the like, and/or a microphone, which may be operable for speech or voice recognition, noise reduction or noise cancellation), a humidity sensor, a remote keyless entry sensor, a tire pressure monitoring system (TPMS), an electronic toll collection sensor, an intelligent headlamp control, user interface controls (such as buttons, switches or the like for controlling various accessories of the vehicle, such as a sunroof, a communication system, lamps, security systems, displays or the like) or any other accessories, sensors, lights, indicators, displays or the like which may be suitable for mounting or positioning at or within the interior rearview mirror assembly or accessory module. The interior rearview mirror assembly and/or compass or accessory module may also provide for glare reduction characteristics of the reflective element of the rearview mirror assembly.

Optionally, the mirror assembly of the present invention may include one or more other accessories at or within the mirror casing, such as one or more electrical or electronic devices or accessories, such as antennas, including global positioning system (GPS) or cellular phone antennas, such as disclosed in U.S. Pat. No. 5,971,552, a communication module, such as disclosed in U.S. Pat. No. 5,798,688, transmitters and/or receivers, such as a garage door opener or the like, a digital network, such as described in U.S. Pat. No. 5,798,575, a memory mirror system, such as disclosed in U.S. Pat. No. 5,796,176, a hands-free phone attachment, a video device for internal cabin surveillance and/or video telephone function, such as disclosed in U.S. Pat. Nos. 5,760,962 and/or 5,877,897; and/or PCT Application No. PCT/US03/40611, filed Dec. 19, 2003 and published Jul. 15, 2004 as International Publication No. WO 2004/058540, and/or U.S. patent application Ser. No. 11/284,543, filed Nov. 22, 2005, now U.S. Pat. No. 7,370,983, and/or U.S. provisional applications, Ser. No. 60/630,061, filed Nov. 22, 2004; and Ser. No. 60/667,048, filed Mar. 31, 2005, a remote keyless entry receiver or system or circuitry and/or a universal garage door opening system or circuitry (such as the types disclosed in U.S. Pat. Nos. 6,396,408; 6,362,771; 5,798,688 and 5,479,155, and/or U.S. patent application Ser. No. 10/770,736, filed Feb. 3, 2004, now U.S. Pat. No. 7,023,322), a remote keyless entry receiver, lights, such as map reading lights or one or more other lights or illumination sources, such as disclosed in U.S. Pat. Nos. 6,690,268; 5,938,321; 5,813,745; 5,820,245; 5,673,994; 5,649,756; 5,178,448; 5,671,996; 4,646,210; 4,733,336; 4,807,096; 6,042,253; and/or 5,669,698, and/or U.S. patent application Ser. No. 10/054,633, filed Jan. 22, 2002, now U.S. Pat. No. 7,195,381, microphones, such as disclosed in U.S. Pat. Nos. 6,243,003; 6,278,377; and/or 6,420,975; and/or PCT Application No. PCT/US03/30877, filed Oct. 1, 2003 and published on Apr. 15, 2004 as International Publication No. WO 2004/032568, speakers, a tire pressure monitoring system, such as the types disclosed in U.S. Pat. Nos. 6,294,989; 6,445,287; and/or 6,472,979, and/or U.S. patent application Ser. No. 11/232,324, filed Sep. 21, 2005, now U.S. Pat. No. 7,423,522, and U.S. provisional application, Ser. No. 60/611,796, filed Sep. 21, 2004, a navigation system, such as described in U.S. Pat. No. 6,477,464, and U.S. patent application Ser. No. 10/456,599, filed Jun. 6, 2003, now U.S. Pat. No. 7,004,593; Ser. No. 10/287,178, filed Nov. 4, 2002, now U.S. Pat. No. 6,678,614; Ser. No. 10/645,762, filed Aug. 20, 2003, now U.S. Pat. No. 7,167,796; and Ser. No. 10/422,378, filed Apr. 24, 2003, now U.S. Pat. No. 6,946,978; and/or PCT Application No. PCT/US03/40611, filed Dec. 19, 2003 and published Jul. 15, 2004 as International Publication No. WO 2004/058540, a seat occupancy detector, a vehicle occupancy detector, such as the types described in U.S. Pat. No. 6,768,420 and/or PCT Application No. PCT/US05/42504, filed Nov. 22, 2005 and published Jun. 1, 2006 as International Publication No. WO 2006/058098; and/or U.S. provisional application, Ser. No. 60/630,364, filed Nov. 22, 2004, a trip computer, an ONSTAR® system and/or the like (with all of the above-referenced patents and patent applications and PCT applications and provisional applications being commonly assigned to Donnelly Corp., and with the disclosures of the referenced patents and patent applications and PCT applications and provisional applications being hereby incorporated herein by reference in their entireties). The accessory or accessories may be positioned at or within the mirror casing and may be included on or integrated in a printed circuit board positioned within the mirror casing, such as along a rear surface of the reflective element or elsewhere within a cavity defined by the casing, without affecting the scope of the present invention.

The interior rearview mirror assembly and/or an associated accessory module may also include user interface controls, such as buttons, switches or the like, displays, indicators, microphones, speakers or the like. Some of these may be provided at or along a display or interface area at or above the mirror. Optionally, the mirror assembly may include a user actuatable input or inputs to activate or deactivate or adjust one or more accessories of the mirror assembly or accessory module or console or of the vehicle. The inputs may be positioned at the mirror casing or bezel portion of the mirror assembly where they may be readily accessible by the driver or occupant of the vehicle. The inputs may comprise push buttons or the like or touch sensitive elements or sensors or proximity sensors or the like that may be selectively touched or depressed or approached to activate/deactivate/adjust the accessory or accessories, as discussed below. The inputs may utilize aspects such as those described in PCT Application No. PCT/US2003/036177, filed Nov. 14, 2003 and published Jun. 3, 2004 as International Publication No. WO 2004/047421, and/or PCT Application No. PCT/US04/015424, filed May 18, 2004 and published Dec. 2, 2004 as PCT Publication No. WO 2004/103772 A2, which are hereby incorporated herein by reference, or may utilize aspects of touch sensitive elements of the types described in U.S. Pat. Nos. 5,594,222; 6,001,486; 6,310,611; 6,320,282; and 6,627,918, and U.S. patent application Ser. No. 09/817,874, filed Mar. 26, 2001, now U.S. Pat. No. 7,224,324, which are hereby incorporated herein by reference, or may comprise proximity sensors of the types described in U.S. Pat. Publication No. 2002/0044065, published Apr. 18, 2002, now U.S. Pat. No. 7,224,324; and/or U.S. patent application Ser. No. 11/284,543, filed Nov. 22, 2005, now U.S. Pat. No. 7,370,983; Ser. No. 10/933,842, filed Sep. 3, 2004, now U.S. Pat. No. 7,249,860; and/or Ser. No. 10/956,749, filed Oct. 1, 2004, now U.S. Pat. No. 7,446,924; and/or PCT Application No. PCT/US03/40611, filed Dec. 19, 2003 and published Jul. 15, 2004 as International Publication No. WO 2004/058540, and/or U.S. provisional applications, Ser. No. 60/630,061, filed Nov. 22, 2004; and Ser. No. 60/667,048, filed Mar. 31, 2005, which are hereby incorporated herein by reference, or may comprise inputs molded within the bezel of the mirror assembly, such as described in U.S. patent application Ser. No. 11/029,695, filed Jan. 5, 2005, now U.S. Pat. No. 7,253,723, and U.S. provisional applications, Ser. No. 60/535,559, filed Jan. 9, 2004; and Ser. No. 60/553,517, filed Mar. 16, 2004, which are hereby incorporated herein by reference, or may comprise membrane type switches, such as described in U.S. patent application Ser. No. 11/140,396, filed May 27, 2005, now U.S. Pat. No. 7,360,932, and U.S. provisional applications, Ser. No. 60/575,904, filed Jun. 1, 2004; and/or Ser. No. 60/624,320, filed Nov. 2, 2004, which are hereby incorporated herein by reference, or other types of switches or buttons or inputs, such as, for example, inputs of the types described in U.S. provisional applications, Ser. No. 60/719,482, filed Sep. 22, 2005; and Ser. No. 60/690,401, filed Jun. 14, 2005, which are hereby incorporated herein by reference, and/or the like, without affecting the scope of the present invention.

The accessory or accessories may be positioned at or within the mirror casing and may be included on or integrated in the printed circuit board positioned within the mirror casing, such as along a rear surface of the reflective element or elsewhere within a cavity defined by the casing, without affecting the scope of the present invention. The user actuatable inputs described above may be actuatable to control and/or adjust the accessories of the mirror assembly/system and/or an overhead console and/or an accessory module/windshield electronics module and/or the vehicle. The connection or link between the controls and the systems or accessories may be provided via vehicle electronic or communication systems and the like, and may be connected via various protocols or nodes, such as Bluetooth™, SCP, UBP, J1850, CAN J2284, Fire Wire 1394, MOST, LIN, FlexRay™, Byte Flight and/or the like, or other vehicle-based or in-vehicle communication links or systems (such as WIFI and/or IRDA) and/or the like, depending on the particular application of the mirror/accessory system and the vehicle. Optionally, the connections or links may be provided via wireless connectivity or links, such as via a wireless communication network or system, such as described in U.S. patent application Ser. No. 10/456,599, filed Jun. 6, 2003, now U.S. Pat. No. 7,004,593, which is hereby incorporated herein by reference, without affecting the scope of the present invention.

Optionally, the interior rearview mirror assembly or an associated accessory module or windshield electronics module or console may include a network bus, such as a CAN bus or a LIN bus, such as disclosed in U.S. Pat. No. 6,291,905, which is hereby incorporated herein by reference. The network bus may be operable to communicate with other systems of the vehicle, such as with accessories or elements of an accessory module, such as an accessory module of the type disclosed in commonly assigned U.S. Pat. Nos. 6,824,281; 6,243,003; 6,278,377 and 6,420,975; U.S. patent application Ser. No. 10/054,633, filed Jan. 22, 2002, now U.S. Pat. No. 7,195,381; U.S. patent application Ser. No. 10/958,087, filed Oct. 4, 2004, now U.S. Pat. No. 7,188,963; and/or International Publication No. WO 01/64481, published Sep. 7, 2001, which are all hereby incorporated herein by reference.

Optionally, the mirror assembly may comprise an electro-optic or electrochromic mirror assembly and may include an electro-optic or electrochromic reflective element. The electrochromic mirror element of the electrochromic mirror assembly may utilize the principles disclosed in commonly assigned U.S. Pat. Nos. 6,690,268; 5,140,455; 5,151,816; 6,178,034; 6,154,306; 6,002,544; 5,567,360; 5,525,264; 5,610,756; 5,406,414; 5,253,109; 5,076,673; 5,073,012; 5,117,346; 5,724,187; 5,668,663; 5,910,854; 5,142,407 and/or 4,712,879, which are hereby incorporated herein by reference, and/or as disclosed in the following publications: N. R. Lynam, "Electrochromic Automotive Day/Night Mirrors", SAE Technical Paper Series 870636 (1987); N. R. Lynam, "Smart Windows for Automobiles", SAE Technical Paper Series 900419 (1990); N. R. Lynam and A. Agrawal, "Automotive Applications of Chromogenic Materials", Large Area Chromogenics: Materials and Devices for Transmittance Control, C. M. Lampert and C. G. Granquist, EDS., Optical Engineering Press, Wash. (1990), which are hereby incorporated by reference herein; and/or as described in U.S. patent application Ser. No. 10/054,633, filed Jan. 22, 2002, now U.S. Pat. No. 7,195,381, which are hereby incorporated herein by reference. The mirror assembly may include one or more other displays, such as the types disclosed in U.S. Pat. Nos. 5,530,240 and/or 6,329,925, which are hereby incorporated herein by reference, and/or display-on-demand transflective type displays, such as the types described in U.S. Pat. Nos. 5,668,663; 5,724,187 and/or 6,690,268, and/or in U.S. patent application Ser. No. 10/054,633, filed Jan. 22, 2002, now U.S. Pat. No. 7,195,381; Ser. No. 11/021,065, filed Dec. 23, 2004, now U.S. Pat. No. 7,255,451; Ser. No. 11/226,628, filed Sep. 14, 2005 and published Mar. 23, 2006 as U.S. Publication No. US 2006-0061008; and/or Ser. No. 10/538,724, filed Jun. 13, 2005 and published Mar. 9, 2006 as U.S. Publication No. US-2006-0050018; Ser. No. 10/528,269, filed Mar. 17, 2005, now U.S. Pat. No. 7,274,501; and/or Ser. No. 10/533,762, filed May 4, 2005, now U.S. Pat. No. 7,184,190, and/or PCT Application No. PCT/US03/29776, filed Sep. 9, 2003 and published Apr. 1, 2004 as International Publication No. WO 2004/026633, which are all hereby incorporated herein by reference, or ultra small information displays, such as are disclosed in U.S. patent application Ser. No. 10/225,851, filed Aug. 22, 2002, now U.S. Pat. No. 6,847,487, the entire disclosure of which is hereby incorporated by reference herein. The thicknesses and materials of the coatings on the substrates, such as on the third surface of the reflective element assembly, may be selected to provide a desired color or tint to the mirror reflective element, such as a blue colored reflector, such as is known in the art and such as described in U.S. Pat. Nos. 5,910,854 and 6,420,036, and in U.S. patent application Ser. No. 10/528,269, filed Mar. 17, 2005, now U.S. Pat. No. 7,274,501, and in PCT Application No. PCT/US03/29776, filed Sep. 9, 2003 and published Apr. 1, 2004 as International Publication No. WO 2004/026633, which are all hereby incorporated herein by reference. The coatings and/or encapsulants and the like may be selected to provide the desired appearance and features for the reflective element assembly, such as utilizing the principles described in U.S. patent application Ser. No. 11/021,065, filed Dec. 23, 2004, now U.S. Pat. No. 7,255,451; and U.S. provisional applications, Ser. No. 60/563,342, filed Apr. 19, 2004; and/or Ser. No. 60/629,926, filed Nov. 22, 2004, which are hereby incorporated herein by reference.

It is further envisioned that the interior rearview mirror assembly may include a transflective one way mirror element, such as disclosed in commonly assigned U.S. patent application Ser. No. 10/054,633, filed Jan. 22, 2002, now U.S. Pat. No. 7,195,381, which is hereby incorporated herein by reference. Preferably, the mirror reflective element (behind which a video display screen may be disposed so that the image displayed is visible by viewing through the mirror reflective element) of the interior mirror assembly comprises a transflective mirror reflector such that the mirror reflective element is significantly transmitting to visible light incident from its rear (i.e. the portion furthest from the driver in the vehicle), with at least about 15 percent transmission of light therethrough preferred, at least about 20 percent transmission of light therethrough more preferred and at least about 25 percent transmission of light therethrough most preferred, while simultaneously, the mirror reflective element is substantially reflective to visible light incident from its front (i.e. the position closest to the driver when the interior mirror assembly is mounted in the vehicle), with at least about 60 percent reflectance of light incident thereon preferred, at least about 70 percent reflectance of light incident thereon more preferred and at least about 75 percent reflectance of light incident thereon most preferred. Preferably, a transflective electrochromic reflective mirror element is used (such as is disclosed in U.S. Pat. Nos. 5,668,663; 5,724,187; and 6,690,268, the entire disclosures of which are hereby incorporated by reference herein) that comprises an electrochromic medium sandwiched between two substrates.

Optionally, the mirror assembly and/or prismatic or electrochromic reflective element may include one or more displays, such as for the accessories or circuitry described herein. The displays may be similar to those described above, or may be of types disclosed in U.S. Pat. Nos. 5,530,240 and/or 6,329,925, which are hereby incorporated herein by reference, and/or may be display-on-demand or transflective type displays, such as the types disclosed in U.S. Pat. Nos. 6,690,298; 5,668,663 and/or 5,724,187, and/or in U.S. patent application Ser. No. 10/054,633, filed Jan. 22, 2002, now U.S. Pat. No. 7,195,381; Ser. No. 11/226,628, filed Sep. 14, 2005 and published Mar. 23, 2006 as U.S. Publication No. US 2006-0061008; and/or Ser. No. 10/993,302, filed Nov. 19, 2004, now U.S. Pat. No. 7,338,177; and/or in U.S. provisional applications, Ser. No. 60/525,952, filed Nov. 26, 2003; Ser. No. 60/717,093, filed Sep. 14, 2005 by Lynam; and/or Ser. No. 60/732,245, filed Nov. 1, 2005, and/or in PCT Application No. PCT/US03/29776, filed Sep. 19, 2003 and published Apr. 1, 2004 as International Publication No. WO 2004/026633, which are all hereby incorporated herein by reference. Optionally, a prismatic reflective element may comprise a display on demand or transflective prismatic element (such as described in PCT Application No. PCT/US03/29776, filed Sep. 19, 2003 and published Apr. 1, 2004 as International Publication No. WO 2004/026633; and/or U.S. patent application Ser. No. 10/993,302, filed Nov. 19, 2004, now U.S. Pat. No. 7,338,177, which are all hereby incorporated herein by reference) so that the displays are viewable through the reflective element, while the display area still functions to substantially reflect light, in order to provide a generally uniform prismatic reflective element even in the areas that have display elements positioned behind the reflective element.

Optionally, the display and any associated user inputs may be associated with various accessories or systems, such as, for example, a tire pressure monitoring system or a passenger air bag status or a garage door opening system or a telematics system or any other accessory or system of the mirror assembly or of the vehicle or of an accessory module or console of the vehicle, such as an accessory module or console of the types described in U.S. Pat. Nos. 6,690,268; 6,672,744; 6,386,742; and 6,124,886, and/or U.S. patent application Ser. No. 10/739,766, filed Dec. 18, 2003, now U.S. Pat. No. 6,877, 888; and/or Ser. No. 10/355,454, filed Jan. 31, 2003, now U.S. Pat. No. 6,824,281, and/or PCT Application No. PCT/US03/03012, filed Jan. 31, 2003 and published Aug. 7, 2003 as International Publication No. WO 03/065084, and/or PCT Application No. PCT/US03/40611, filed Dec. 19, 2003 and published Jul. 15, 2004 as International Publication No. WO 2004/058540, and/or PCT Application No. PCT/US04/15424, filed May 18, 2004 and published Dec. 2, 2004, as International Publication No. WO 2004/103772, which are hereby incorporated herein by reference.

Optionally, the mirror system or interior rearview mirror assembly and/or compass system of the present invention may include electrochromic control circuitry for controlling the reflectivity of an electrochromic mirror. The circuitry may include a rearward viewing glare detector or sensor and a forward viewing and/or downward and/or sideward viewing ambient light detector or sensor, such as described in U.S. Pat. No. 4,793,690, which is hereby incorporated herein by reference, or may include a single sensor, such as described in U.S. Pat. No. 5,193,029, which is hereby incorporated herein by reference. The output of the circuitry may control an outside electrochromic mirror as well as the interior rearview electrochromic mirror. It is further envisioned that the circuitry may control an outside electrochromic mirror, while the interior rearview mirror assembly may be a prismatic mirror, without affecting the scope of the present invention.

The network bus of the interior rearview mirror assembly may then be in communication with the reversing system of the vehicle, such that the interior rearview mirror assembly knows when the vehicle is shifted into reverse. The bus may then be operable to disable the electrochromic dimming of the mirror when the vehicle is in reverse, as is desired and known in the art.

Further, automatic dimming circuitry used in the electrochromic mirror assembly and/or in an accessory module may utilize one or more (typically two) photosensors to detect glaring and/or ambient lighting. Optionally, the mirror assembly (such as for an interior or exterior rearview mirror assembly) may include a photo sensor or light sensor (such as the types described in U.S. Pat. Nos. 6,831,268; 6,742,904; 6,737,629; 4,799,768; and 4,793,690, and U.S. patent application Ser. No. 10/456,599, filed Jun. 6, 2003, now U.S. Pat. No. 7,004,593, which are hereby incorporated herein by reference) at the rear or fourth surface of the reflective element assembly, such that the photo sensor detects light passing through the reflective element assembly. Examples of such configurations are described in U.S. Pat. Nos. 4,793,690; 5,550,677 and 5,193,029, and U.S. patent application Ser. No. 10/456,599, filed Jun. 6, 2003, now U.S. Pat. No. 7,004,593, which are all hereby incorporated herein by reference. For example, a silicon photosensor, such as a TSL235R Light-to-Frequency converter (available from Texas Advanced Optoelectronic Solutions Inc. of Plano, Tex.), may be used as such a photosensor. Such light-to-frequency converters comprise the combination of a silicon photodiode and a current-to-frequency converter on a single monolithic CMOS integrated circuit.

Optionally, a silicon based optical sensor may provide a non-linear response for the electro-optic or electrochromic reflective element dimming circuitry. Optionally, an infrared (IR) filtering thin film may be deposited on the sensor (or may be disposed in front of the sensor) to filter or attenuate infrared radiation at the photo sensor. Optionally, the sensor may be mounted at the rear of the reflective element assembly and may be mounted at a black plastic surface mount that has a clear window, such that light leakage from non-intended light sources is reduced and such that the environmental properties of the sensor and mounting package are substantially enhanced.

The interior rearview mirror assembly may include the bezel portion and the casing, such as described above, or the mirror assembly may comprise other types of casings or bezel portions or the like, such as described in U.S. Pat. Nos. 6,439, 755; 4,826,289; and 6,501,387; and/or PCT Application No. PCT/US2004/015424, filed May 18, 2004 and published Dec. 2, 2004, as International Publication No. WO 2004/103772; and/or U.S. patent application Ser. No. 10/933,842, filed Sep. 3, 2004, now U.S. Pat. No. 7,249,860; and/or Ser. No. 10/993,302, filed Nov. 19, 2004, now U.S. Pat. No. 7,338, 177, which are all hereby incorporated herein by reference, without affecting the scope of the present invention. For example, the mirror assembly may comprise a flush or frameless or bezelless reflective element, such as the types described in PCT Application No. PCT/US2004/015424, filed May 18, 2004 and published Dec. 2, 2004, as International Publication No. WO 2004/103772; PCT Application No. PCT/US03/35381, filed Nov. 5, 2003 and published May 21, 2004 as International Publication No. WO 2004/042457; and/or in U.S. patent application Ser. No. 11/140,396, filed May 27, 2005, now U.S. Pat. No. 7,360,932; Ser. No. 11/226, 628, filed Sep. 14, 2005 and published Mar. 23, 2006 as U.S. Publication No. US 2006-0061008; Ser. No. 11/021,065, filed Dec. 23, 2004, now U.S. Pat. No. 7,255,451; Ser. No. 10/528,269, filed Mar. 17, 2005, now U.S. Pat. No. 7,274, 501; Ser. No. 10/533,762, filed May 4, 2005, now U.S. Pat. No. 7,184,190; and/or Ser. No. 10/538,724, filed Jun. 13, 2005 and published Mar. 9, 2006 as U.S. Publication No. US-2006-0050018; and/or in U.S. provisional applications, Ser. No. 60/563,342, filed Apr. 19, 2004; Ser. No. 60/629,926, filed Nov. 22, 2004; Ser. No. 60/624,320, filed Nov. 2, 2004; Ser. No. 60/681,250, filed May 16, 2005; Ser. No. 60/690, 400, filed Jun. 14, 2005; Ser. No. 60/695,149, filed Jun. 29, 2005; and/or Ser. No. 60/730,334, filed Oct. 26, 2005, which are all hereby incorporated herein by reference.

Therefore, the present invention provides a mirror and compass system that positions the compass sensors within the movable head portion of the mirror assembly in a manner that reduces the effects of mirror adjustment on the sensor performance. The compass system may adjust processing in response to known movements of the mirror head to compensate for such known movements. The compass system of the present invention may distinguish between deviations, signatures or patterns indicative of magnetic anomalies or stray magnetic fields or the like generated external to the vehicle (such as by metal bridges, subway lines, cellular telephone towers, large metal structures and the like), and deviations, signatures or patterns indicative of mirror adjustments by the driver (as the driver may grasp and move the mirror head/reflective element to adjust his or her field of view rearward through the rear window of the vehicle), and may enter the calibration mode when a mirror adjustment is detected and distinguished or recognized. The compass system may enter an aggressive calibration mode to calibrate the sensors when the mirror has been adjusted by a user. The commencement of the aggressive calibration mode may be effected by the type of adjustment, vehicle speed, time elapsed since activation of the vehicle ignition or other activating or triggering event or the like.

Changes and modifications in the specifically described embodiments can be carried out without departing from the principles of the present invention, which is intended to be limited only by the scope of the appended claims as interpreted according to the principles of patent law.

The invention claimed is:

1. An interior rearview mirror system for a vehicle, said interior rearview mirror system comprising:
   an interior rearview mirror assembly comprising a mirror casing and a reflective element;
   wherein said reflective element, when said interior rearview mirror assembly is normally mounted in a vehicle equipped with said interior rearview mirror system and is adjusted to a viewing orientation, provides a field of view rearward of the equipped vehicle to a driver of the equipped vehicle;
   wherein a mounting structure mounts said interior rearview mirror assembly to an interior portion of the equipped vehicle, and wherein said mirror casing is adjustable by the driver of the equipped vehicle relative to the interior portion of the equipped vehicle via at least one pivot element of said mounting structure to adjust the rearward field of view of said reflective element when said interior rearview mirror assembly is normally mounted in the equipped vehicle;
   wherein said interior rearview mirror assembly comprises compass circuitry and wherein said compass circuitry comprises a three-axis sensor and associated circuitry;
   wherein at least a portion of said compass circuitry is established on a semiconductor substrate using CMOS technology;
   wherein said three-axis sensor comprises magnetoresponsive sensing elements and wherein said magnetoresponsive sensing elements comprise first and second magnetoresponsive sensing elements disposed generally orthogonally to each other and a third magnetoresponsive sensing element disposed generally orthogonally to said first and second magnetoresponsive sensing elements;
   wherein said magnetoresponsive sensing elements are disposed in said mirror casing and move in tandem with said mirror casing and said reflective element when said mirror casing is adjusted by the driver of the equipped vehicle relative to the interior portion of the equipped vehicle;
   wherein processing of an algorithm by a microprocessor of said interior rearview mirror system determines a directional heading of the equipped vehicle responsive to a sensing of a magnetic field by said magnetoresponsive sensing elements and automatically compensates for a deviating magnetic field; and
   wherein an information display of the equipped vehicle displays the directional heading of the equipped vehicle.

2. The interior rearview mirror system of claim 1, wherein said associated circuitry comprises at least one of (i) an A/D converter, (ii) a D/A converter and (iii) signal processing circuitry.

3. The interior rearview mirror system of claim 2, wherein said associated circuitry comprises at least one of (i) memory, (ii) signal filtering circuitry, (iii) a display driver and (iv) a vehicle bus interface.

4. The interior rearview mirror system of claim 3, wherein said associated circuitry comprises said microprocessor.

5. The interior rearview mirror system of claim 1, wherein said associated circuitry comprises at least two of (i) an A/D converter, (ii) a D/A converter, (iii) signal processing circuitry, (iv) memory, (v) signal filtering circuitry, (vi) a display driver and (vii) a vehicle bus interface.

6. The interior rearview mirror system of claim 1, wherein said magnetoresponsive sensing elements are established on said semiconductor substrate.

7. The interior rearview mirror system of claim 1, wherein said magnetoresponsive sensing elements and said associated circuitry are established on said semiconductor substrate using CMOS technology.

8. The interior rearview mirror system of claim 7, wherein said semiconductor substrate comprises a silicon substrate.

9. The interior rearview mirror system of claim 1, wherein said compass circuitry is supported by said reflective element.

10. The interior rearview mirror system of claim 1, wherein an algorithm processed by said microprocessor discerns between a change in said sensing by said magnetoresponsive sensing elements that is indicative of an adjustment of said mirror casing by the driver of the equipped vehicle and a change in said sensing by said magnetoresponsive sensing elements that is indicative of a change in vehicle direction, and causes said interior rearview mirror system to enter a rapid compensating mode when the change in said sensing by said magnetoresponsive sensing elements is indicative of an adjustment of said mirror casing by the driver of the equipped vehicle.

11. The interior rearview mirror system of claim 1, wherein electrical wiring for said compass circuitry passes through said at least one pivot element of said mounting structure.

12. The interior rearview mirror system of claim 11, wherein said at least one pivot element comprises two pivot elements that are part of a double pivot mounting structure, and wherein said electrical wiring passes through both of said pivot elements of said double pivot mounting structure.

13. The interior rearview mirror system of claim 11, wherein the interior portion of the equipped vehicle comprises a mounting button attached at an interior surface of a windshield of the equipped vehicle and wherein said mounting structure comprises a mount for mounting said interior rearview mirror assembly to the mounting button attached at the interior surface of the windshield of the equipped vehicle.

14. The interior rearview mirror system of claim 1, wherein said magnetoresponsive sensing elements are oriented in a manner that reduces the effect of an adjustment of said mirror casing on the output of said magnetoresponsive sensing elements.

15. The interior rearview mirror system of claim 1, wherein said compass circuitry is operable to receive an output from a temperature sensor and to determine a temperature reading and to display the temperature reading on said information display.

16. The interior rearview mirror system of claim 1, wherein said compass circuitry further comprises a temperature sensor and wherein said temperature sensor is commonly established with said magnetoresponsive sensing elements and said associated circuitry on said semiconductor substrate.

17. The interior rearview mirror system of claim 1, wherein said reflective element comprises a variable reflectance electro-optic reflective element and wherein said compass circuitry controls, at least in part, the reflectance of said electro-optic reflective element.

18. The interior rearview mirror system of claim 1, wherein said magnetoresponsive sensing elements comprise Hall effect magnetoresponsive sensing elements.

19. The interior rearview mirror system of claim 1, wherein said interior rearview mirror system enters an initial rapid compensating mode in response to an ignition cycle of the equipped vehicle to achieve at least an approximate compensation for a deviating magnetic field of the equipped vehicle, and wherein said interior rearview mirror system automatically exits said rapid compensating mode and enters a less aggressive calibration mode that distinguishes the Earth's magnetic field from magnetic anomalies and non-abrupt changes in the vehicle magnetic signature, and wherein said interior rearview mirror system automatically exits said rapid compensating mode after a predetermined period of time has elapsed since the ignition cycle.

20. The interior rearview mirror system of claim 1, wherein said interior rearview mirror system operates in an automatic compensation mode to achieve at least an approximate compensation for a deviating magnetic field of the equipped vehicle and wherein the automatic compensation does not require the equipped vehicle to turn through a 360 degree circle to compensate for a deviating magnetic field of the equipped vehicle.

21. The interior rearview mirror system of claim 1, wherein said information display comprises at least one of (a) a vacuum fluorescent display, (b) a light emitting diode display, (c) an electroluminescent display, (d) a liquid crystal display, (e) a backlit thin film transistor liquid crystal display and (f) a video screen display.

22. The interior rearview mirror system of claim 1, wherein, with said interior rearview mirror assembly normally mounted in the equipped vehicle and with said reflective element providing a field of view rearward of the equipped vehicle to the driver of the equipped vehicle, said first and second magnetoresponsive sensing elements are arranged generally horizontally and said third magnetoresponsive sensing element is arranged generally vertically.

23. The interior rearview mirror system of claim 1, wherein said interior rearview mirror assembly comprises said information display.

24. An interior rearview mirror system for a vehicle, said interior rearview mirror system comprising:
an interior rearview mirror assembly comprising a mirror casing and a reflective element;
wherein said reflective element, when said interior rearview mirror assembly is normally mounted in a vehicle equipped with said interior rearview mirror system and is adjusted to a viewing orientation, provides a field of view rearward of the equipped vehicle to a driver of the equipped vehicle;
wherein a mounting structure mounts said interior rearview mirror assembly to an interior portion of the equipped vehicle, and wherein said mirror casing is adjustable by the driver of the equipped vehicle relative to the interior portion of the equipped vehicle via a pivot element of said mounting structure to adjust the rearward field of view of said reflective element when said interior rearview mirror assembly is normally mounted in the equipped vehicle;
wherein said interior rearview mirror assembly comprises compass circuitry and wherein said compass circuitry comprises a multi-axis sensor and associated circuitry;
wherein said associated circuitry comprises at least one of (i) an A/D converter, (ii) a D/A converter, (iii) signal processing circuitry, (iv) memory, (v) signal filtering circuitry, (vi) a display driver and (vii) a vehicle bus interface;
wherein at least a portion of said compass circuitry is established on a semiconductor substrate using CMOS technology;
wherein electrical wiring for said compass circuitry passes through said pivot element of said mounting structure;
wherein said multi-axis sensor comprises magnetoresponsive sensing elements and wherein said magnetoresponsive sensing elements comprise at least first and second magnetoresponsive sensing elements; and
wherein processing of an algorithm by a microprocessor of said interior rearview mirror system determines a directional heading of the equipped vehicle responsive to a sensing of a magnetic field by said magnetoresponsive sensing elements and automatically compensates for a deviating magnetic field.

25. The interior rearview mirror system of claim 24, wherein said magnetoresponsive sensing elements comprise a third magnetoresponsive sensing element, and wherein said first and second magnetoresponsive sensing elements are disposed generally orthogonally to each other and said third magnetoresponsive sensing element is disposed generally orthogonally to said first and second magnetoresponsive sensing elements.

26. The interior rearview mirror system of claim 24, wherein at least one of (i) said magnetoresponsive sensing elements are established on said semiconductor substrate, (ii) said magnetoresponsive sensing elements and said associated circuitry are established on said semiconductor substrate using CMOS technology, and (iii) said semiconductor substrate comprises a silicon substrate.

27. The interior rearview mirror system of claim 24, wherein said magnetoresponsive sensing elements are disposed in said mirror casing and move in tandem with said mirror casing and said reflective element when said mirror casing is adjusted by the driver of the equipped vehicle relative to the interior portion of the equipped vehicle, and wherein said compass circuitry is supported by said reflective element.

28. The interior rearview mirror system of claim 27, wherein an algorithm processed by said microprocessor discerns between a change in said sensing by said magnetoresponsive sensing elements that is indicative of an adjustment of said mirror casing by the driver of the equipped vehicle and a change in said sensing by said magnetoresponsive sensing elements that is indicative of a change in vehicle direction, and causes said interior rearview mirror system to enter a rapid compensating mode when the change in said sensing by said magnetoresponsive sensing elements is indicative of an adjustment of said mirror casing by the driver of the equipped vehicle.

29. The interior rearview mirror system of claim 24, wherein at least one of (a) electrical wiring passes through said pivot element and (b) said mounting structure comprises two pivot elements that are part of a double pivot mounting structure and wherein said electrical wiring passes through both of said pivot elements of said double pivot mounting structure.

30. The interior rearview mirror system of claim 24, wherein at least one of (i) said compass circuitry is operable to receive an output from a temperature sensor and to determine a temperature reading and to display the temperature reading on said information display, (ii) said compass circuitry further comprises a temperature sensor and wherein said temperature sensor is commonly established with said magnetoresponsive sensing elements and said associated circuitry on said semiconductor substrate, (iii) said reflective element comprises a variable reflectance electro-optic reflective element and (iv) said reflective element comprises a variable reflectance electro-optic reflective element and said compass circuitry controls, at least in part, the reflectance of said electro-optic reflective element.

31. The interior rearview mirror system of claim 24, wherein said interior rearview mirror system enters an initial rapid compensating mode in response to an ignition cycle of the equipped vehicle to achieve at least an approximate compensation for a deviating magnetic field of the equipped vehicle, and wherein said interior rearview mirror system automatically exits said rapid compensating mode and enters a less aggressive calibration mode that distinguishes the Earth's magnetic field from magnetic anomalies and non-abrupt changes in the vehicle magnetic signature, and wherein said interior rearview mirror system automatically exits said rapid compensating mode after a predetermined period of time has elapsed since the ignition cycle.

32. The interior rearview mirror system of claim 24, wherein said interior rearview mirror system operates in an automatic compensation mode to achieve at least an approximate compensation for a deviating magnetic field of the equipped vehicle and wherein the automatic compensation does not require the equipped vehicle to turn through a 360 degree circle to compensate for a deviating magnetic field of the equipped vehicle.

33. The interior rearview mirror system of claim 24, wherein an information display of the equipped vehicle displays the directional heading of the equipped vehicle, and wherein said information display comprises at least one of (a) a vacuum fluorescent display, (b) a light emitting diode display, (c) an electroluminescent display, (d) a liquid crystal display, (e) a backlit thin film transistor liquid crystal display and (f) a video screen display.

34. The interior rearview mirror system of claim 33, wherein said interior rearview mirror assembly comprises said information display.

35. An interior rearview mirror system for a vehicle, said interior rearview mirror system comprising:

an interior rearview mirror assembly comprising a mirror casing and a reflective element;

wherein said reflective element, when said interior rearview mirror assembly is normally mounted in a vehicle equipped with said interior rearview mirror system and is adjusted to a viewing orientation, provides a field of view rearward of the equipped vehicle to a driver of the equipped vehicle;

wherein a mounting structure mounts said interior rearview mirror assembly to an interior portion of the equipped vehicle, and wherein said mirror casing is adjustable by the driver of the equipped vehicle relative to the interior portion of the equipped vehicle via at least one pivot element of said mounting structure to adjust the rearward field of view of said reflective element when said interior rearview mirror assembly is normally mounted in the equipped vehicle;

wherein said interior rearview mirror assembly comprises compass circuitry and wherein said compass circuitry comprises a multi-axis sensor and associated circuitry;

wherein at least a portion of said compass circuitry is established on a semiconductor substrate using CMOS technology;

wherein said multi-axis sensor comprises magnetoresponsive sensing elements and wherein said magnetoresponsive sensing elements comprise at least first and second magnetoresponsive sensing elements;

wherein processing of an algorithm by a microprocessor of said interior rearview mirror system determines a directional heading of the equipped vehicle responsive to a sensing of a magnetic field by said magnetoresponsive sensing elements and automatically compensates for a deviating magnetic field;

wherein an information display of the equipped vehicle displays the directional heading of the equipped vehicle; and wherein said interior rearview mirror assembly comprises a vehicle bus interface.

36. The interior rearview mirror system of claim 35, wherein said associated circuitry comprises at least one of (i) an A/D converter, (ii) a D/A converter, (iii) signal processing circuitry, (iv) memory, (v) signal filtering circuitry, (vi) a display driver and (vii) said vehicle bus interface.

37. The interior rearview mirror system of claim 35, wherein, with said interior rearview mirror assembly normally mounted in the equipped vehicle and with said reflective element providing a field of view rearward of the equipped vehicle to the driver of the equipped vehicle, said first and second magnetoresponsive sensing elements are arranged generally horizontally.

38. The interior rearview mirror system of claim 37, wherein said first and second magnetoresponsive sensing elements are disposed generally orthogonally to each other.

39. The interior rearview mirror system of claim 38, wherein said magnetoresponsive sensing elements comprise a third magnetoresponsive sensing element disposed generally orthogonally to said first and second magnetoresponsive sensing elements, and wherein, with said interior rearview mirror assembly normally mounted in the equipped vehicle and with said reflective element providing a field of view rearward of the equipped vehicle to the driver of the equipped vehicle, said third magnetoresponsive sensing element is arranged generally vertically.

40. The interior rearview mirror system of claim 35, wherein said magnetoresponsive sensing elements are disposed in said mirror casing and move in tandem with said mirror casing and said reflective element when said mirror casing is adjusted by the driver of the equipped vehicle relative to the interior portion of the equipped vehicle.

41. The interior rearview mirror system of claim 40, wherein said magnetoresponsive sensing elements are oriented in a manner that reduces the effect of an adjustment of said mirror casing on the output of said magnetoresponsive sensing elements.

42. The interior rearview mirror system of claim 35, wherein said compass circuitry further comprises a temperature sensor and wherein said temperature sensor is commonly established with said magnetoresponsive sensing elements and said associated circuitry on said semiconductor substrate.

43. The interior rearview mirror system of claim 35, wherein said reflective element comprises a variable reflectance electro-optic reflective element and wherein said compass circuitry controls, at least in part, the reflectance of said electro-optic reflective element.

44. The interior rearview mirror system of claim 35, wherein said interior rearview mirror assembly comprises said information display.

45. An interior rearview mirror system for a vehicle, said interior rearview mirror system comprising:

an interior rearview mirror assembly comprising a mirror casing and a reflective element;

wherein said reflective element, when said interior rearview mirror assembly is normally mounted in a vehicle equipped with said interior rearview mirror system and is adjusted to a viewing orientation, provides a field of view rearward of the equipped vehicle to a driver of the equipped vehicle;

wherein a mounting structure mounts said interior rearview mirror assembly to an interior portion of the equipped vehicle, and wherein said mirror casing is adjustable by the driver of the equipped vehicle relative to the interior portion of the equipped vehicle via at least one pivot element of said mounting structure to adjust the rearward field of view of said reflective element when said interior rearview mirror assembly is normally mounted in the equipped vehicle;

wherein said interior rearview mirror assembly comprises compass circuitry and wherein said compass circuitry comprises a multi-axis sensor and associated circuitry;

wherein at least a portion of said compass circuitry is established on a semiconductor substrate using CMOS technology;

wherein said multi-axis sensor comprises magnetoresponsive sensing elements and wherein said magnetoresponsive sensing elements comprise at least first and second magnetoresponsive sensing elements;

wherein processing of an algorithm by a microprocessor of said interior rearview mirror system determines a directional heading of the equipped vehicle responsive to a sensing of a magnetic field by said magnetoresponsive sensing elements and automatically compensates for a deviating magnetic field;

wherein said reflective element comprises a variable reflectance electro-optic reflective element;

wherein said interior rearview mirror assembly comprises a vehicle bus interface; and wherein said associated circuitry comprises at least one of (i) an A/D converter, (ii) a D/A converter, (iii) signal processing circuitry, (iv) memory, (v) signal filtering circuitry, (vi) a display driver.

46. The interior rearview mirror system of claim 45, wherein said compass circuitry controls, at least in part, the reflectance of said electro-optic reflective element.

47. The interior rearview mirror system of claim 45, wherein said magnetoresponsive sensing elements are disposed in said mirror casing and move in tandem with said mirror casing and said reflective element when said mirror casing is adjusted by the driver of the equipped vehicle relative to the interior portion of the equipped vehicle.

48. The interior rearview mirror system of claim 47, wherein said magnetoresponsive sensing elements are oriented in a manner that reduces the effect of an adjustment of said mirror casing on the output of said magnetoresponsive sensing elements.

49. The interior rearview mirror system of claim 45, wherein said first and second magnetoresponsive sensing elements are disposed generally orthogonally to each other, and wherein said magnetoresponsive sensing elements comprise a third magnetoresponsive sensing element disposed generally orthogonally to said first and second magnetoresponsive sensing elements.

50. The interior rearview mirror system of claim 45, wherein an information display of said interior rearview mirror assembly displays the directional heading of the equipped vehicle.

* * * * *

UNITED STATES PATENT AND TRADEMARK OFFICE
CERTIFICATE OF CORRECTION

PATENT NO. : 8,465,163 B2
APPLICATION NO. : 13/646959
DATED : June 18, 2013
INVENTOR(S) : Rodney K. Blank et al.

It is certified that error appears in the above-identified patent and that said Letters Patent is hereby corrected as shown below:

In the Specifications
Column 12
Line 62, "mirror" should be --minor--

Signed and Sealed this
Twenty-fourth Day of December, 2013

Margaret A. Focarino
*Commissioner for Patents of the United States Patent and Trademark Office*